United States Patent

Kanai et al.

[19]

[11] Patent Number: 5,862,403
[45] Date of Patent: Jan. 19, 1999

[54] CONTINUOUS DATA SERVER APPARATUS AND DATA TRANSFER SCHEME ENABLING MULTIPLE SIMULTANEOUS DATA ACCESSES

[75] Inventors: Tatsunori Kanai; Shigehiro Asano, both of Kanagawa-ken; Takeshi Aikawa, Tokyo; Shinya Amano, Kanagawa-ken, all of Japan

[73] Assignee: Kabushiki Kaisha Toshiba, Kawasaki, Japan

[21] Appl. No.: 603,759

[22] Filed: Feb. 16, 1996

[30] Foreign Application Priority Data

| Feb. 17, 1995 | [JP] | Japan | 7-029749 |
|---|---|---|---|
| Sep. 14, 1995 | [JP] | Japan | 7-236999 |
| Sep. 29, 1995 | [JP] | Japan | 7-253293 |
| Dec. 4, 1995 | [JP] | Japan | 7-315578 |

[51] Int. Cl.$^6$ .................................................. G06F 15/02
[52] U.S. Cl. ............................................................ 395/826
[58] Field of Search ..................................... 395/821–823, 395/825–826, 311, 376, 182.03, 182.04

[56] References Cited

U.S. PATENT DOCUMENTS

| 5,127,088 | 6/1992 | Takaki | 711/112 |
|---|---|---|---|
| 5,185,876 | 2/1993 | Nguyen et al. | 395/841 |
| 5,206,939 | 4/1993 | Yanai et al. | 711/4 |
| 5,386,548 | 1/1995 | Ngyuyen et al. | 395/872 |
| 5,398,158 | 3/1995 | Fisher et al. | 361/685 |
| 5,459,856 | 10/1995 | Inoue | 395/183.18 |
| 5,651,132 | 7/1997 | Honda et al. | 395/182.04 |

FOREIGN PATENT DOCUMENTS

| 0 578 139 | 1/1994 | European Pat. Off. . |
|---|---|---|
| 3-292525 | 12/1991 | Japan . |
| 2 271 462 | 4/1994 | United Kingdom . |
| WO 93/14455 | 7/1993 | WIPO . |

OTHER PUBLICATIONS

Patent Abstracts of Japan, vol. 8, No. 23, Jan. 31, 1984, JP–58–178458, Oct. 19, 1983.

Electrical Design News, vol. 36, No. 12, pp. 141–143, Jun. 6, 1991, Michael Anderson, "Raid 5 Architecture Provides Economical Failsafe Disk Storage".

*Primary Examiner*—Moustafa M. Meky
*Attorney, Agent, or Firm*—Oblon, Spivak, McClelland, Maier & Neustadt, P.C.

[57] ABSTRACT

A continuous data server apparatus incorporating a plurality of buffer memory units for storing the continuous data read out by the data memory control units and to be given to the communication control unit, at least one buffer memory unit being provided dedicatedly for each combination of one data memory control unit group formed by at least one data memory control unit and one communication control unit group formed by at least one communication control unit. The apparatus may further incorporate a plurality of calculation units connected in series, where each calculation unit is connected between corresponding one data memory control unit group and at least one buffer memory unit, and carrying out a prescribed calculation processing. The continuous data can be arranged over a plurality of data memory control units in word units, such that the data memory control units read out the continuous data in block units, the buffer memory units store the continuous data in block units, and the communication control unit transfers the continuous data obtained by reading out data the buffer memory units sequentially in word units.

54 Claims, 52 Drawing Sheets

ADDRESS SPACE VIEWED FROM DATA MEMORY DEVICE i

ADDRESS SPACE VIEWED FROM COMMUNICATION CONTROL DEVICE j

| CASE | (1) | (2) | (3) | | (4) | (5) | | |
|---|---|---|---|---|---|---|---|---|
| ERROR_X | 1 | 0 | 0 | 1 | 0 | 0 | 1 | 1 |
| HITANY | 1 | 0 | 1 | 1 | 1 | 0 | 0 | 0 |
| DECODE_X | 1 | 0 | 0 | 0 | 1 | 1 | 0 | 1 |
| SWITCHING SIDE | A | A | B | * | * | B | A | * |

*: IMPOSSIBLE CASE

|  | X=0 | X=1 | X=2 | X=3 | X=4 |
|---|---|---|---|---|---|
| UPOE_X | 0 | 0 | 1 | 1 | 1 |
| DISKOE_X | 0 | 0 | 0 | 0 | 0 |
| DNOE_X | 1 | 0 | 0 | 0 | 0 |
| MEMOE_X | 0 | 1 | 0 | 0 | 0 |
| MEMEN_X | 0 | 0 | 0 | 0 | 0 |
| BUFINSEL_X | — | 0 | — | — | — |
| UPDIS_X | — | 1 | — | — | — |

— :don't care

|          | X=0 | X=1 | X=2 | X=3 | X=4 |
|----------|-----|-----|-----|-----|-----|
| UPOE_X   | 0   | 0   | 0   | 0   | 1   |
| DISKOE_X | 0   | 0   | 0   | 0   | 0   |
| DNOE_X   | 1   | 1   | 1   | 0   | 0   |
| MEMOE_X  | 0   | 0   | 0   | 1   | 1   |
| MEMEN_X  | 1   | 1   | 1   | —   | 0   |
| BUFINSEL_X | — | —   | —   | 0   | 0   |
| UPDIS_X  | —   | —   | —   | 1   | 0   |

— :don't care

|  | X=0 | X=1 | X=2 | X=3 | X=4 |
|---|---|---|---|---|---|
| UPOE_X | 0 | 0 | 0 | 0 | 0 |
| DISKOE_X | 0 | 0 | 0 | 0 | 0 |
| DNOE_X | 0 | 0 | 0 | 0 | 0 |
| MEMOE_X | 1 | 1 | 1 | 1 | 1 |
| MEMEN_X | — | — | — | — | — |
| BUFINSEL_X | 1 | 1 | 1 | 1 | 1 |
| UPDIS_X | — | — | — | — | — |

— :don't care

|  | X=0 | X=1 | X=2 | X=3 | X=4 |
|---|---|---|---|---|---|
| UPOE_X | 0 | 0 | 1 | 1 | 1 |
| DISKOE_X | 0 | 0 | 0 | 0 | 0 |
| DNOE_X | 1 | 0 | 0 | 0 | 0 |
| MEMOE_X | 0 | 1 | 0 | 0 | 0 |
| MEMEN_X | 1 | — | 1 | 1 | 1 |
| BUFINSEL_X | — | 0 | — | — | — |
| UPDIS_X | — | 1 | — | — | — |

— :don't care

|  | X=0 | X=1 | X=2 | X=3 | X=4 |
|---|---|---|---|---|---|
| UPOE_X | 0 | 0 | 0 | 0 | 0 |
| DISKOE_X | 0 | 1 | 0 | 0 | 0 |
| DNOE_X | 0 | 0 | 0 | 0 | 0 |
| MEMOE_X | 0 | 0 | 0 | 0 | 0 |
| MEMEN_X | — | 1 | — | — | — |
| BUFINSEL_X | — | 0 | — | — | — |
| UPDIS_X | — | 1 | — | — | — |

— :don't care

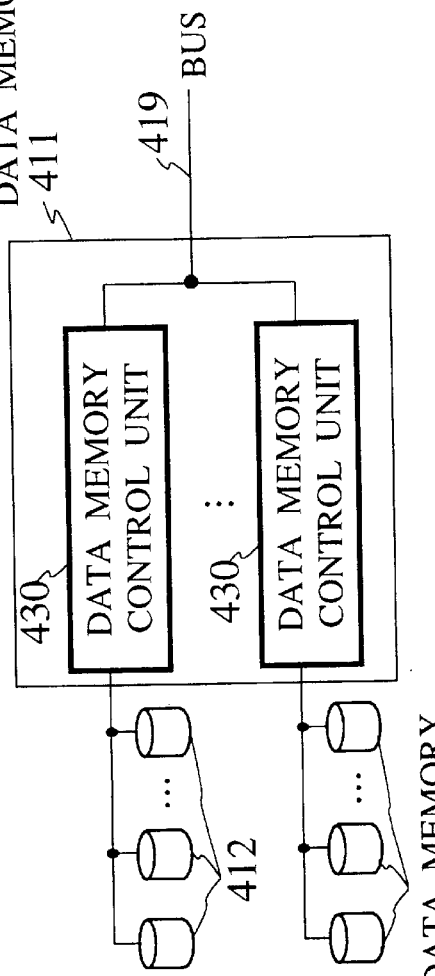
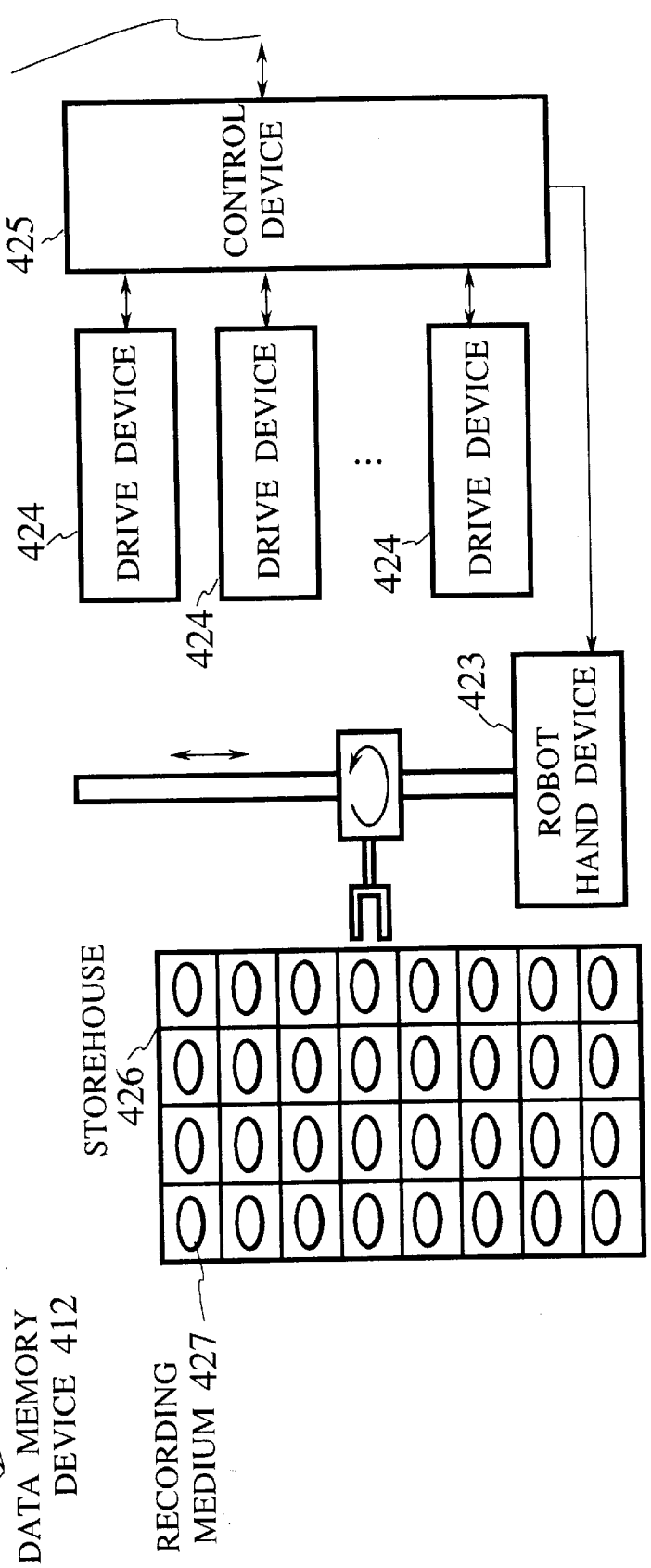
FIG.63
FIG.64

CONTINUOUS DATA SERVER APPARATUS AND DATA TRANSFER SCHEME ENABLING MULTIPLE SIMULTANEOUS DATA ACCESSES

BACKGROUND OF THE INVENTION

1. Field of the Invention

The present invention relates to a continuous data server apparatus and a data transfer scheme for realizing services of continuous data such as video data and speech data by responding to a plurality of access requests for the continuous data simultaneously, and making parallel accesses to a plurality of disk devices.

2. Description of the Background Art

A continuous data server apparatus for handling continuous data such as video data and speech data has functions for reading out the continuous data stored in memory devices, and transferring the data continuously in real time while synchronizing in time with terminal devices. Such a continuous data server apparatus is used in fields such as a video-on-demand in which video data for a plurality of movies, etc. are stored and an arbitrary movie is transferred according to a request from a terminal, and an on-line shopping in which information on commercial products is provided in video data through a network.

In such applications, the continuous data server apparatus will receive requests from a plurality of users at random, and therefore the continuous data server apparatus is required to have a capability to transfer respectively different continuous data to many different users simultaneously.

Now, various examples of such a conventional continuous data server apparatus will be described in detail.

An exemplary conventional continuous data server apparatus has a configuration as shown in FIG. 1.

In this conventional continuous data server apparatus of FIG. 1, an access request for the continuous data issued by a user or an application program will be sent through an inter-process communication, a communication via a network, etc. This access request is then notified from one of communication control devices 706 through a bus 720 to a central control device 710, and admitted by the central control device 710. The central control device 710 then notifies the reading of the requested continuous data to relevant data memory control devices 704, and these data memory control devices 704 read out the specified continuous data from data memory devices 702 and write them into a buffer memory device 708. The central control device 710 then commands the transfer of the data on the buffer memory device 708 to one of the communication control devices 706, and this communication control device 706 transfers the continuous data toward a transfer destination specified in the access request.

The central control device 710 basically comprises a CPU and a memory device, similarly as an electronic computer. The central control device 710 may be equipped with a communication control function for the purpose of notifying the access request, so that the access request from a user or an application program is notified by the communication control function of the central control device 710 rather than by the communication control device 706.

The data memory devices 702 for storing the continuous data are usually provided in forms of disk devices. For this disk device, a magnetic disk device is used in most cases, but there is also a case of using an optical disk or an opto-magnetic disk device, etc. Apart from the disk device, there is also a case of using a semiconductor memory device such as RAM or EEPROM for the data memory devices 702.

Now, in this conventional continuous data server apparatus of FIG. 1, which uses disk devices as the data memory devices 702, for example, there are cases in which accesses from many users are concentrated simultaneously to different portions of the continuous data stored in a particular disk device. For instance, this corresponds to a situation in which a particular video data is contained in a certain magnetic disk as the continuous data, and this particular video data is to be watched by many users at timings displaced from each other by one minute.

In such a case, in this conventional continuous data server apparatus of FIG. 1, the access speed of the disk becomes a bottleneck, and there is an inconvenience that it becomes impossible to transfer the data in real time to all the users. For example, in a case of dealing with video data, assuming that the continuous data are to be transferred at a rate of 1.5 Mbit/sec on average to a terminal of one user and that a magnetic disk device storing this video data can read out data at a rate of 2 MByte/sec at most, it would only be possible to realize a capability for transferring data from one magnetic disk device to ten users simultaneously at most.

As a technique for resolving such a problem associated with the disk device, a technique called striping is known. The striping is a technique for increasing an overall data transfer capability (total bandwidth) by using a plurality of disk devices, while making it possible for more numerous users to make accesses simultaneously to the identical continuous data by storing each one continuous data in division into a plurality of disk devices. By carrying out the striping, it becomes possible to construct a memory device with a wide bandwidth which can deal even with the worst possible case in which a plurality of users make accesses to different portions of the identical continuous data almost simultaneously.

In a case of using this striping technique with respect to n sets of disk devices, it is possible to take the exclusive OR of the data stored in these n sets of disk devices as a parity and store this parity in an (n+1)-th disk device, such that any data lost by a malfunction of one disk device among these (n+1) disk devices can be recovered by calculating the exclusive OR of the data in the remaining disk devices. This is a technique known as RAID (Redundant Arrays of Inexpensive Disks).

However, even when one central control device 710 is connected with numerous disk devices as shown in FIG. 1 so as to enhance the bandwidth by means of the striping, a number of users that can make accesses simultaneously will be limited by the transfer rate of the bus 720 associated with the central control device 710.

For example, in a case of using a PCI (Peripheral Component Interconnect) bus having a transfer capability of 133 MByte/sec, when the access speed for one piece of continuous data is assumed to be 1.5 MBit/sec, the data transfer will occupy total 3 Mbit/sec of the data transfer capability (bandwidth) of the bus 720 including 1.5 Mbit/sec used in transferring from the disk devices 702 to the buffer memory devices 708 per one piece of continuous data and 1.5 Mbit/sec used in transferring from the buffer memory devices 708 to the communication control device 706 per one piece of continuous data. Therefore, even if it is assumed that the bus is operated at 100% efficiency, it is going to be capable of making accesses to only up to 354 pieces of continuous data simultaneously. In practice, the bus will never be operated at 100% efficiency, so that a number of users that can make accesses simultaneously will be reduced further.

Thus, in this type of conventional continuous data server apparatus, there has been a problem that a number of users that can make accesses to the continuous data simultaneously in a single continuous data server apparatus is limited by the bandwidth of the data path such as the bus constituting the continuous data server apparatus.

For this reason, in order to realize the simultaneous accesses for so many users that cannot be realized by a single system of a conventional continuous data server apparatus, it is possible to consider a configuration shown in FIG. 2 in which a plurality of computers, each functioning as the continuous data server apparatus shown in FIG. 1, are provided in parallel. In this configuration of FIG. 2, the continuous data are stored by applying the striping among the data memory devices 802 connected to one continuous data server computer 800 (but the striping among the data memory devices 802 connected to different continuous data server computers 800 is not used in this example).

In this configuration of FIG. 2, a computer for overall control 801 receives the access requests for all the continuous data, and notifies each access request to the relevant continuous data server computer 800 having the requested continuous data. Then, the central control device (not shown) provided in the continuous data server computer 800 to which the access request is notified will control the transfer of the continuous data. According to this system of FIG. 2, it is possible to easily increase a number of users that can make accesses to the continuous data simultaneously by providing additional continuous data server computers 800.

However, unless a copy of every continuous data is provided in each group of the data memory devices 802 associated with each one of a plurality of the continuous data server computers 800, it will be impossible to deal with a case in which all the users make accesses to the different portions of the identical continuous data. Consequently, there has been a drawback in that it requires a considerable cost in providing copies of all the continuous data in all groups of the data memory devices 802 associated with many continuous data server computers 800.

Thus, in this type of conventional continuous data server apparatus, there has been a problem that a large cost is required for the data memory devices.

As another scheme for increasing a number of users that can make accesses simultaneously, which does not require copies of all the continuous data in many continuous data server apparatuses, there is a scheme using a configuration as shown in FIG. 3 in which data path from the data memory devices 902 to the communication control devices 906 is multiplexed by utilizing a massively parallel computer in which a plurality of central control devices (CPU) 910 and 911 are connected by a switch (coupling path) 921 with a large data transfer capability (bandwidth).

In this configuration of FIG. 3, memory devices 908 and 909 associated with the respective central control devices 910 and 911 are used as the buffer memory devices. Here, it is necessary for the switch 921 connecting between the central control devices 910 and 911 to be capable of handling the data transfer between the central control device 910 having an arbitrary data memory control device 904 and the central control device 911 having an arbitrary communication control device 906. For this reason, a multi-stage network such as the crossbar switch, the hypercube, or the ATM (Asynchronous Transfer Mode) network will be used for this switch 921.

However, in this continuous data server apparatus of FIG. 3, the data can be transferred from a plurality of central control devices 910 having the data memory control devices 904 to a single central control device 911 having a single communication control device 906, so that there is a need to provide a function of arbitration. Consequently, there has been a drawback in that the hardware of the crossbar switch or the ATM network, etc. constituting the coupling path 921 becomes complicated, and this also requires a considerable cost.

Thus, in this type of conventional continuous data server apparatus, there has been a problem that the hardware of the switch becomes complicated, and a large cost is requires for this switch.

On the other hand, there is another conventional continuous data server apparatus which has a configuration as shown in FIG. 4.

In this conventional continuous data server apparatus of FIG. 4, an access request for the continuous data issued by a user or an application program will be sent by means of an inter-process communication, a communication via a network, etc. to a central control device 610. The central control device 610 then notifies the reading of the requested continuous data to relevant data memory control devices 611, and these data memory control devices 611 read out the specified continuous data from data memory devices 612 and write them into a main memory device 613. The central control device 610 then commands the transfer of the data on the main memory device 613 to one of communication control devices 614, and this communication control device 614 transfers the continuous data toward a transfer destination specified in the access request. In a case the specified continuous data do not exist on the data memory devices 612, the specified continuous data are read out from an archiving device 615.

Similarly as in a case of FIG. 1, the data memory devices 612 for storing the continuous data are usually provided in forms of disk devices. For this disk device, a magnetic disk device is used in most cases, but there is also a case of using an optical disk or an opto-magnetic disk device, etc. Apart from the disk device, there is also a case of using a semiconductor memory device such as RAM or EEPROM for the data memory devices 612.

This conventional continuous data server apparatus of FIG. 4 is based on the known fact that it is possible to construct a system with a good cost performance by storing the continuous data in different types of memory devices according to their utilization frequencies.

Namely, the data with higher utilization frequencies are stored in data memory devices such as magnetic disk devices which require a relatively high recording cost per capacity but which enable a high speed access. Here, the access speed indicates a time required for a data cue search since the data request is received until the transfer of that data starts. By means of the on-line connection of these data memory devices, the data cue search time can be shortened.

It is also possible to use the data memory devices such as semiconductor memories which require an even higher recording cost but which enable an even faster access for those data which have particularly high utilization frequencies.

On the other hand, the data with lower utilization frequencies are recorded and managed by the archiving device. This archiving device is formed by memory devices such as magnetic tapes, optical disks, or opto-magnetic disks, which require a relatively low recording cost per capacity but which enable only a rather slow access. This type of memory device usually uses a tape or disk for recording the data which is removable from a drive. Namely, it has a structure in which the recording medium can be taken out from a drive for reading or writing the data. For this reason, the recording cost per capacity required in this type of memory device is only a cost of the recording medium itself, which is low compared with the magnetic disk device, etc. in which the recording medium is irremovable. However, in this type of memory device, when the data request is received, it is necessary to load an appropriate recording medium having the requested data onto a drive, so that the access speed is low for this type of memory device.

Thus, in this continuous data server apparatus of FIG. 4, the continuous data with high access frequencies are stored in the data memory devices 612 such as the magnetic disk devices, while the continuous data with low access frequencies are stored in the archiving device 615 such as the optical disks. When a request for the continuous data which are not stored in the magnetic disk devices is received, the requested continuous data are read out from the archiving device 615 to the data memory device 612.

Here, the continuous data read out from the archiving device 615 to the data memory device 612 can be transferred to the user either while the reading continues, or after the reading is completed. In the former scheme, a time required since the request from the user is received until the transfer of the continuous data starts is shorter, but the use of the visual search mode such as the fast forward mode will be restricted. In contrast, in the latter scheme, the time required since the request from the user is received until the transfer of the continuous data starts is longer, but the visual search mode such as the fast forward mode can be used freely because the continuous data are completely entered into the data memory device 612 by the time of the data transfer.

However, in this conventional continuous data server apparatus of FIG. 4, in a case of transferring the continuous data between the archiving device 615 and the data memory device 612, the continuous data will be temporarily written into the main memory device 613, so that there is a problem that a memory region of the main memory device 613 that is otherwise available for the transfer of the continuous data will be reduced in such a case.

In addition, in a case of transferring the continuous data between the archiving device 615 and the data memory device 612, the bus will be occupied at a time of transferring the continuous data between the archiving device 615 and the main memory device 613 as well as at a time of transferring the continuous data between the main memory device 613 and the data memory device 612, so that there is also a problem that a time for which the bus is otherwise available for the transfer of the continuous data will be reduced.

As a consequence, there is a problem that a number of continuous data (a number of streams) that can be transferred will be lowered while the continuous data are transferred between the archiving device 615 and the data memory device 612.

Moreover, for the same reason, there is also a problem that, when the continuous data read out from the archiving device 615 are to be written into a particular data memory device 612, a number of continuous data that can be read out from other data memory devices 612 and transferred will be limited.

In particular, in a case of applying the RAID technique to the data memory devices 612, there is a problem that a number of streams that can be transferred will be reduced after an occurrence of a malfunction of the data memory device, as it will become necessary to carry out the operation to repair the malfunctioned data memory device and write the data to be stored in that data memory device from the archiving device 615, while carrying out the operation to recover the continuous data stored in the malfunctioning data memory device by using the parity of the RAID technique and transfer the recovered continuous data.

SUMMARY OF THE INVENTION

It is therefore an object of the present invention to provide a continuous data server apparatus and a continuous data transfer scheme which are capable of responding to simultaneous accesses to the continuous data from so many users which exceed the capability of a single conventional continuous data server apparatus, without causing an increase of cost.

It is another object of the present invention to provide an apparatus having connection ports for a plurality of disk devices, which is capable of realizing a recovery of the lost data due to a malfunction of a connected disk device by means of a compact hardware configuration.

It is another object of the present invention to provide a continuous data server apparatus and a continuous data transfer scheme which are capable of transferring the continuous data without reducing a number of continuous data that can be transferred simultaneously, even in a case of carrying out the reading or writing with respect to the archiving device.

According to one aspect of the present invention there is provided a continuous data server apparatus for transferring continuous data stored in data memory media, comprising: a plurality of data memory control units for reading out desired continuous data from the data memory media; at least one communication control unit for transferring the desired continuous data to a communication path; and a plurality of buffer memory units for storing the desired continuous data read out by the data memory control units and to be transferred by the communication control unit, at least one buffer memory unit being provided dedicatedly in correspondence to each combination of one data memory control unit and one communication control unit.

According to another aspect of the present invention there is provided a continuous data server apparatus for transferring continuous data stored in data memory media, comprising: a plurality of data memory control units for reading out desired continuous data from the data memory media; at least one communication control unit for transferring the desired continuous data to a communication path; and a plurality of buffer memory units for storing the desired continuous data read out by the data memory control units and to be given to the communication control unit, at least one buffer memory unit being provided dedicatedly for each combination of one data memory control unit group formed by at least one data memory control unit and one communication control unit group formed by at least one communication control unit.

According to another aspect of the present invention there is provided a method for transferring continuous data stored in data memory media to a requested transfer destination in a continuous data server apparatus having a plurality of data memory control units for reading out desired continuous data from the data memory media and at least one communication control unit for transferring the desired continuous data read out from the data memory media to a communication path connected to the requested transfer destination, the method comprising the steps of: receiving an access request for the desired continuous data from an external of the continuous data server apparatus; selecting data memory control units connected with the data memory media which store the desired continuous data, and the communication control unit accommodating the communication path; controlling the selected data memory control units to read out the desired continuous data stored in the data memory media, and write the desired continuous data read out from the data memory media into corresponding buffer memory units, at least one buffer memory unit being provided dedicatedly in correspondence to each combination of one data memory control unit and one communication control unit; and controlling the selected communication control unit to read out the desired continuous data stored in the buffer memory units, and transfer the desired continuous data read out from the buffer memory units to the communication path.

According to another aspect of the present invention there is provided an apparatus for making accesses in parallel to a plurality of disk devices, comprising: a plurality of disk control units for reading out desired data from the disk devices; a plurality of buffer memory units, provided in correspondence to said plurality of disk control units, for storing the desired data read out by the disk control units; and a plurality of calculation units connected in series, each calculation unit having four terminals, being connected between corresponding one disk control unit and one buffer memory unit, and carrying out a prescribed calculation processing according to input from prescribed one or more of said four terminals and outputting a calculation result to one of more of remaining terminals.

According to another aspect of the present invention there is provided an apparatus for making accesses in parallel to a plurality of disk devices, comprising: a plurality of connection ports connected with said plurality of disk devices; a plurality of buffer memory units, provided in correspondence to said plurality of connection ports, for storing the data to be inputted/outputted to/from the connection ports; and a plurality of calculation units connected in series, each calculation unit having four terminals of an upper stage side terminal, a lower stage side terminal, a buffer memory unit side terminal, and a disk device side terminal, being connected between corresponding one connection port and one buffer memory unit, and realizing any one of: a first function for carrying out a prescribed one of an exclusive OR calculation and an exclusive AND calculation according to data entered from the buffer memory unit side terminal and data entered from the upper stage side terminal, and outputting a calculation result to the lower stage side terminal, a second function for outputting data entered from the upper stage side terminal to the lower stage side terminal, and a third function for outputting data entered from the disk device side terminal to the buffer memory unit side terminal.

According to another aspect of the present invention there is provided an apparatus for making accesses in parallel to a plurality of disk devices, comprising: a plurality of connection ports connected with said plurality of disk devices; a plurality of buffer memory units, provided in correspondence to said plurality of connection ports, for storing the data to be inputted/outputted to/from the connection ports; and a plurality of calculation units connected in series, each calculation unit having four terminals of an upper stage side terminal, a lower stage side terminal, a buffer memory unit side terminal, and a disk device side terminal, being connected between corresponding one connection port and one buffer memory unit, and realizing any one of: a first function for carrying out a prescribed one of an exclusive OR calculation and an exclusive AND calculation according to data entered from the upper stage side terminal and data entered from the lower stage side terminal, and outputting a calculation result to the buffer memory unit side terminal, a second function for outputting data entered from the lower stage side terminal to the buffer memory unit side terminal and the upper stage side terminal, a third function for carrying out said prescribed one of an exclusive OR calculation and an exclusive AND calculation according to data entered from the buffer memory unit side terminal and the data entered from the upper stage side terminal, and outputting a calculation result to the lower stage side terminal, a fourth function for carrying out said prescribed one of an exclusive OR calculation and an exclusive AND calculation according to data entered from the buffer memory unit side terminal and the data entered from the lower stage side terminal, and outputting a calculation result to the upper stage side terminal, a fifth function for outputting data entered from the upper stage side terminal to the lower stage side terminal, a sixth function for outputting data entered from the lower stage side terminal to the upper stage side terminal, a seventh function for outputting data entered from the disk device side terminal to the buffer memory unit side terminal, and an eighth function for outputting data entered from the buffer memory unit side terminal to the disk device side terminal.

According to another aspect of the present invention there is provided a continuous data server apparatus for making accesses in parallel to a plurality of disk devices, comprising: a plurality of disk control units for reading out desired continuous data from the disk devices; and a plurality of buffer memory units, provided in correspondence to said plurality of disk control units, for storing the desired continuous data read out by the disk control units; wherein the continuous data stored in the disk devices are arranged over said plurality of disk control units in word units, the disk control units read out the desired continuous data in block units, the buffer memory units stores the desired continuous data in block units, and the desired continuous data are obtained by reading out data from the buffer memory units sequentially in word units.

According to another aspect of the present invention there is provided a continuous data server apparatus for transferring continuous data between data memory media storing first continuous data and an archiving device storing second continuous data, from which desired continuous data are readable, the apparatus comprising; a plurality of data memory control units for reading/writing the continuous data from/to the data memory media; and a plurality of buffer memory units for temporarily storing the continuous data to be transferred between the archiving device and the data memory control units, at least one buffer memory unit being provided dedicatedly in correspondence to each combination of one data memory control unit and the archiving device.

According to another aspect of the present invention there is provided a method for transferring continuous data between data memory media storing first continuous data and an archiving device for storing second continuous data, from which desired continuous data are readable, in a continuous data server apparatus having a plurality of data memory control units for reading/writing the continuous data from/to the data memory media, the method comprising the steps of: receiving an access request with respect to the archiving device for desired continuous data; selecting one data memory control unit connected with the data memory media relevant to the desired continuous data; and transferring the desired continuous data between the archiving device and said one data memory control unit by temporarily storing the desired continuous data in at least one buffer memory unit provided dedicatedly in correspondence to a combination of said one data memory control unit and the archiving device.

Other features and advantages of the present invention will become apparent from the following description taken in conjunction with the accompanying drawings.

BRIEF DESCRIPTION OF THE DRAWINGS

FIG. 63 is a schematic block diagram of a data memory control device that can be used in the continuous data server apparatus of FIG. 61.

FIG. 64 is a schematic block diagram of an archiving device used in the continuous data server apparatus of FIG. 61.

DETAILED DESCRIPTION OF THE PREFERRED EMBODIMENTS

Referring now to FIG. 5 to FIG. 29, the first embodiment of the continuous data server apparatus realizing the continuous data transfer scheme according to the present invention will be described in detail.

Figure 1:
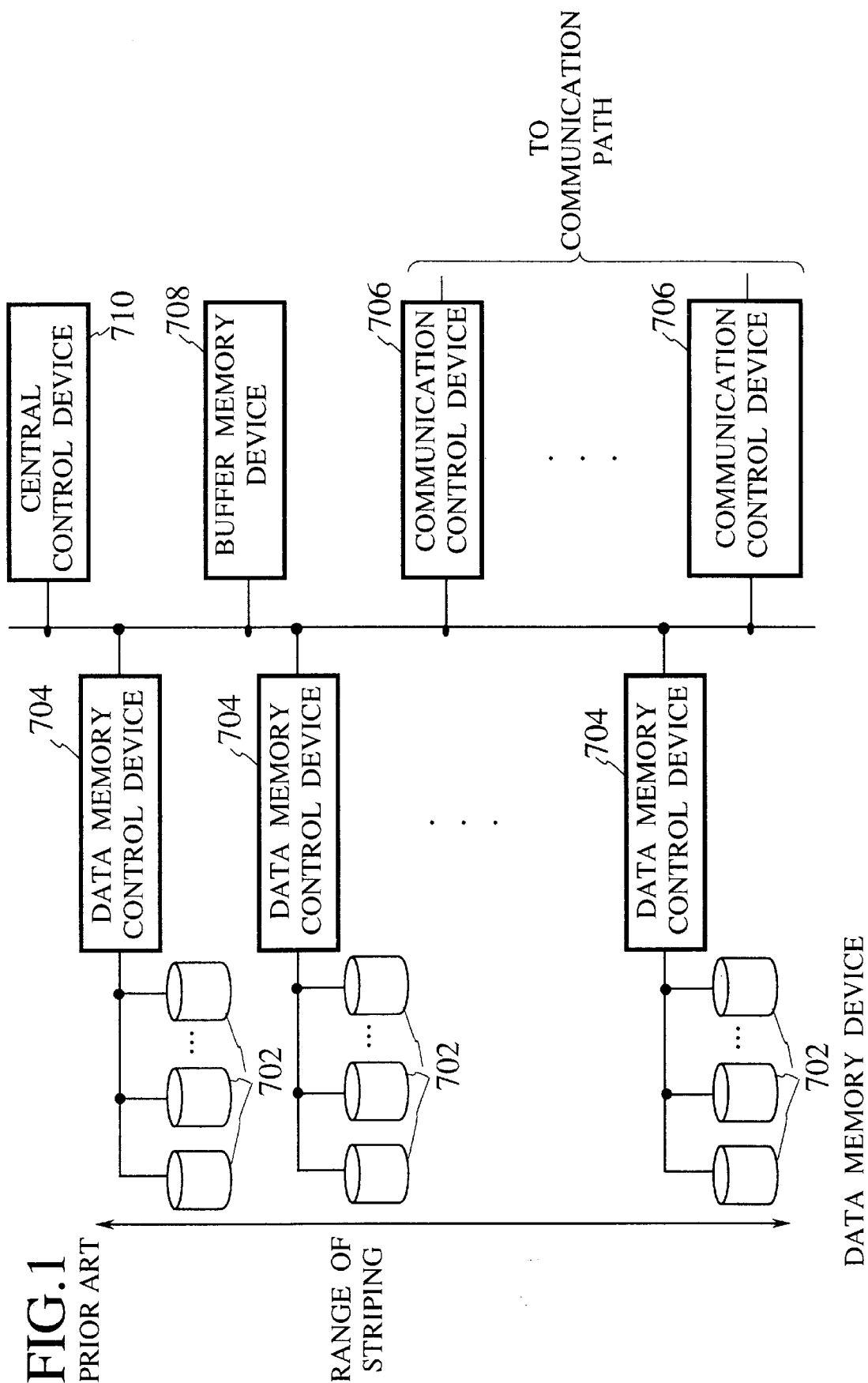
FIG. 1 is a block diagram of one conventional continuous data server apparatus.
Figure 2:
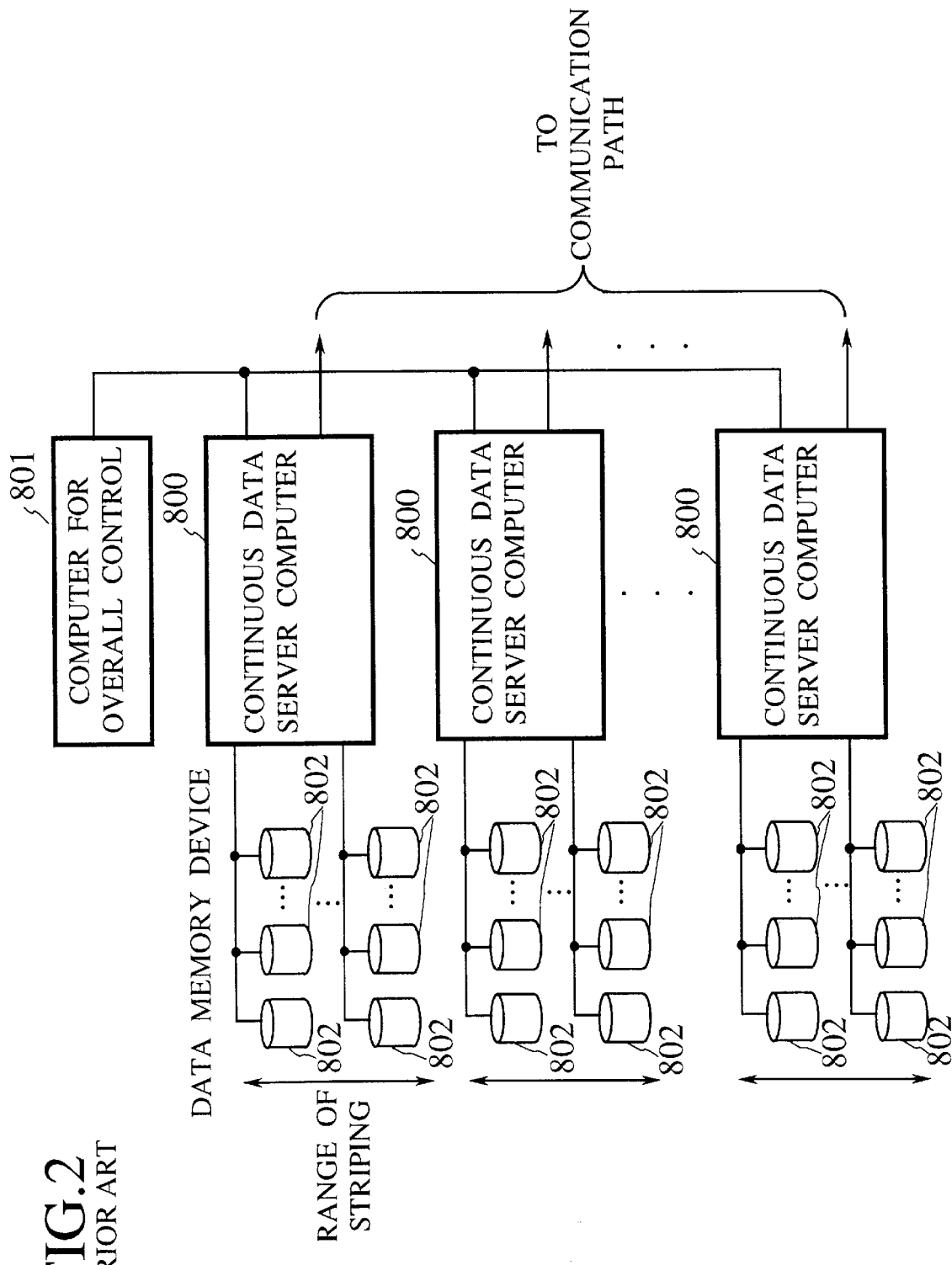
FIG. 2 is a block diagram of another conventional continuous data server apparatus.
Figure 3:
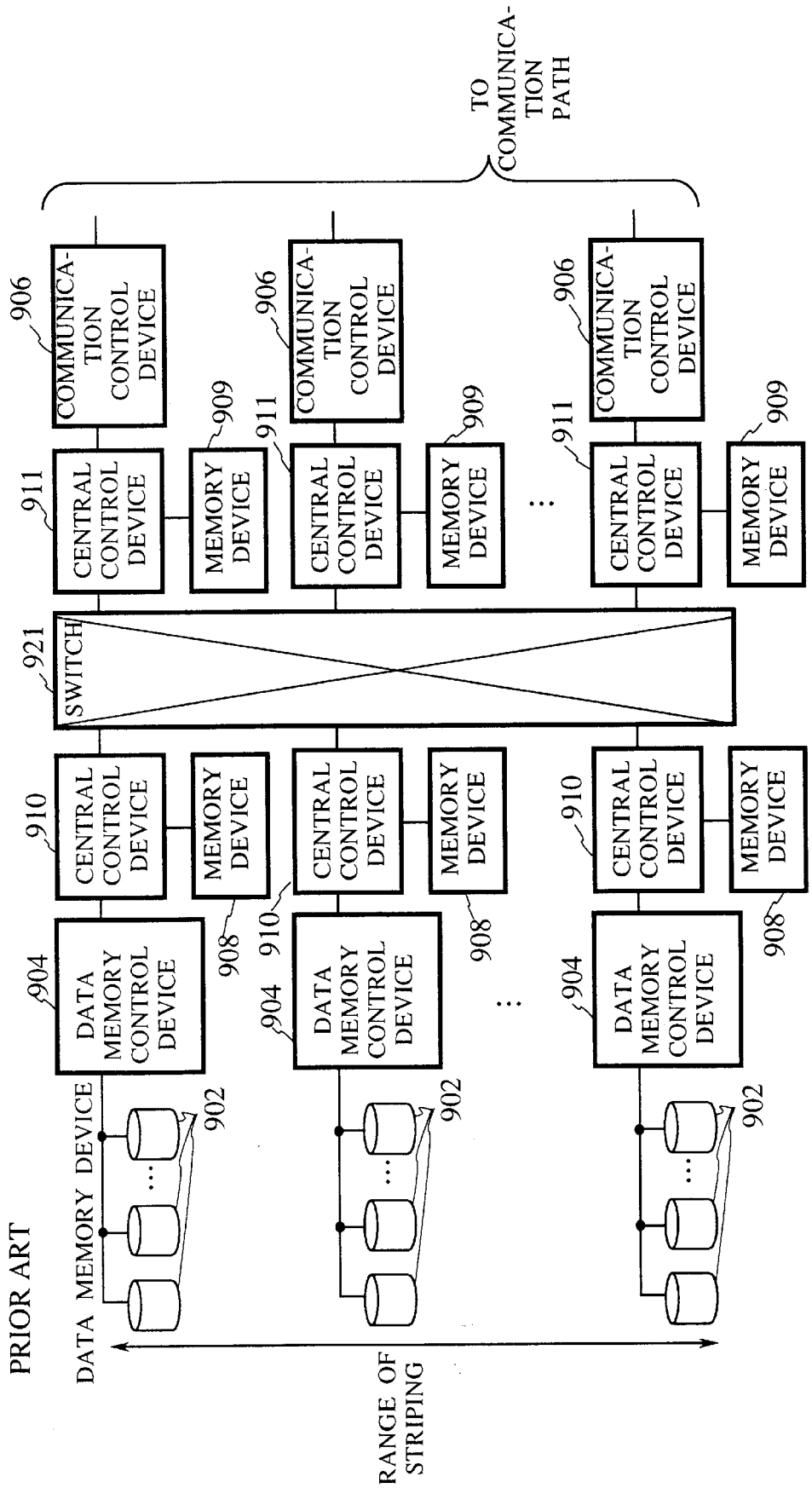
FIG. 3 is a block diagram of another conventional continuous data server apparatus.
Figure 4:
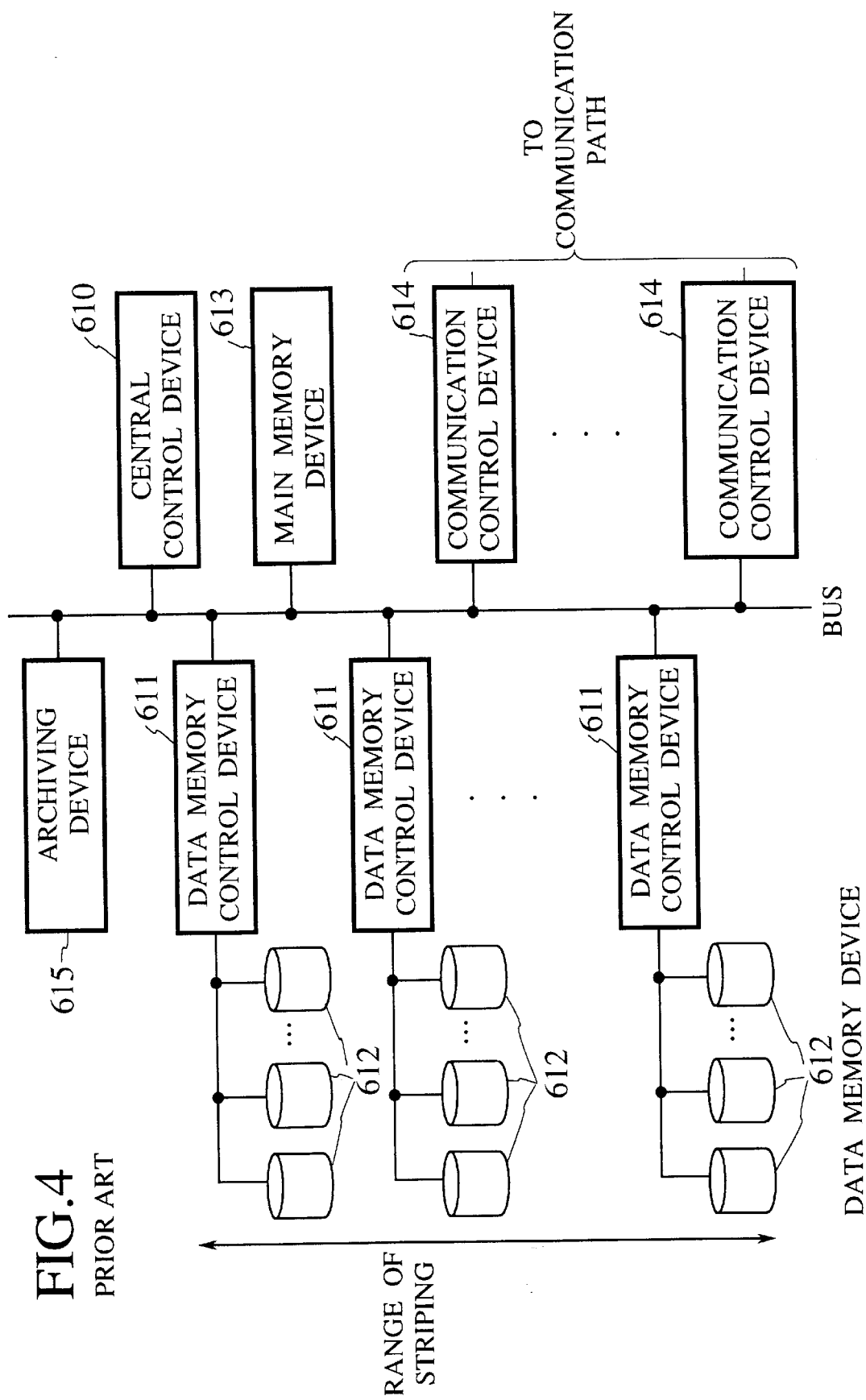
FIG. 4 is a block diagram of another conventional continuous data server apparatus.
Figure 5:
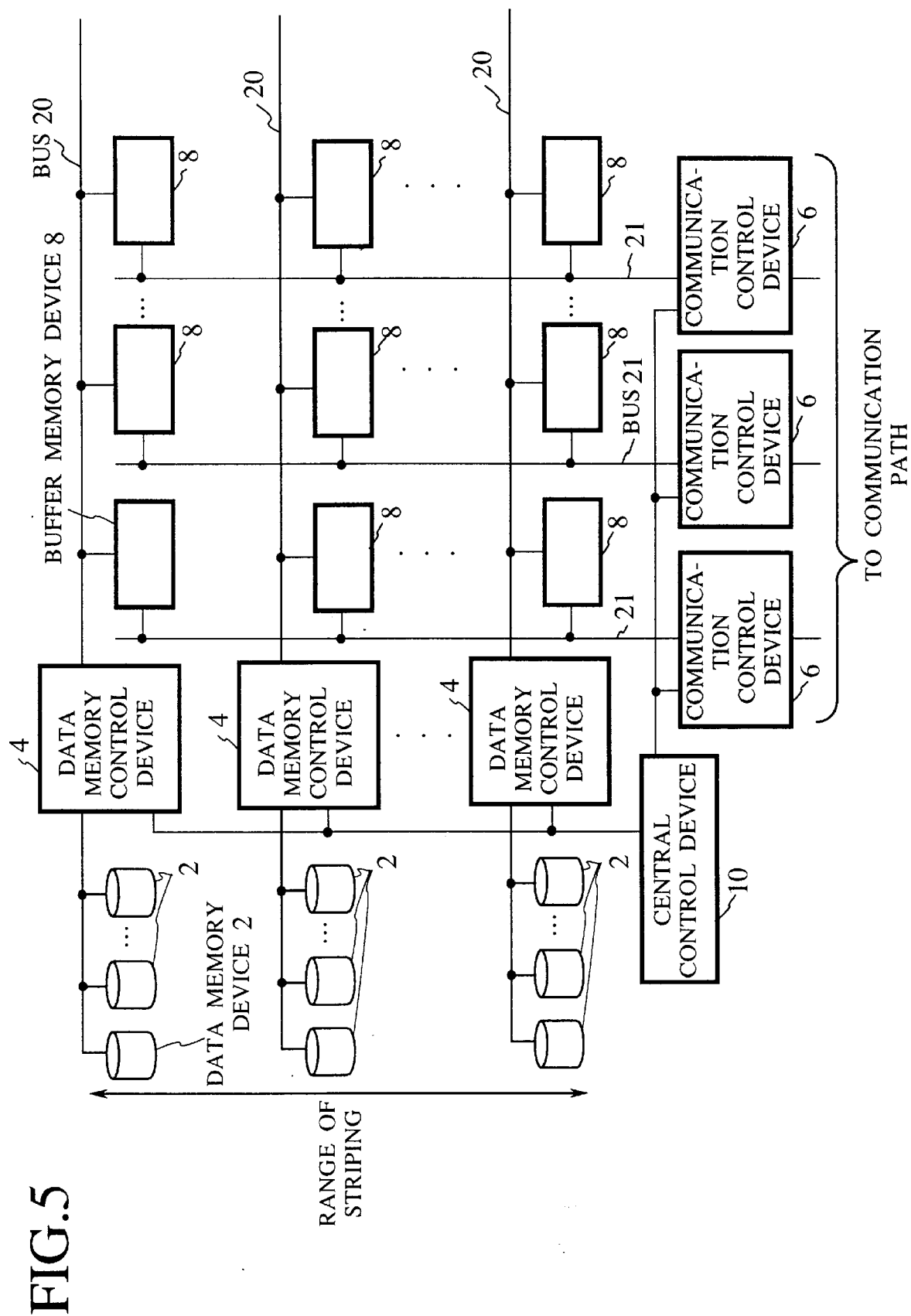
FIG. 5 is a block diagram of the first embodiment of a continuous data server apparatus according to the present invention.

In this first embodiment, the continuous data server apparatus has a configuration as shown in FIG. 5, which comprises: n (n is an integer greater than or equal to 1) sets of data memory control devices 4 (4-1 to 4-n in the figure); a plurality of data memory devices 2, a prescribed number of which are connected to each one of the data memory control devices 4; m (m is an integer greater than or equal to 1) sets of communication control devices 6 (6-1 to 6-m in the figure); n×m sets of buffer memory devices 8, each of which is connected to one data memory control device 4 via a bus 20 and one communication control device 6 via a bus 21 such that m sets of buffer memory devices 8 are connected to each data memory control device 4 and n sets of buffer memory devices 8 are connected to each communication control device 6; and a central control device 10 connected with all the data memory control devices 4 and the communication control devices 6.

Note that the data memory devices 2 may not necessarily be integral components of the continuous data server apparatus, and can be supplemented by the user according to the need.

The data memory devices 2 are memory devices for storing the continuous data such as video data and speech data, for which disk devices such as magnetic disk devices, optical disk devices, or opto-magnetic disk devices can be used. Besides the disk devices, various memory devices including the semiconductor memory devices such as RAM, EEPROM, etc. may also be used for the data memory devices 2. In the following, the data memory devices refer to any of these various data memory media in general.

The continuous data stored in the data memory devices 2 are data having a structure in which continuous bits or bytes are arranged. The continuous data are preferably stored and managed in units of groups such as blocks.

Each data memory control devices 4 is connected with a prescribed number of data memory devices 2, and according to the control of the central control device 10, it reads out the continuous data stored in the data memory devices 2 and write them into the specified addresses of the specified buffer memory devices 8.

In a case of using magnetic disk devices as the data memory devices 2, the data memory control devices 4 can be realized by disk controllers. In a case where the magnetic disk devices are those having SCSI (Small Computer System Interface), the data in the disks can be read out by providing SCSI controllers in the data memory control devices 4.

In general, a plurality of data memory devices 2 formed by the magnetic disk devices, etc. can be connected to the data memory control devices 4 formed by the disk controllers, etc. For example, in a case of using SCSI interfaces, seven sets of disk devices can be connected to one piece of SCSI cable. Also, a plurality of data memory control devices 4 can be connected to the central control device 10. By having a plurality of data memory control devices 4 formed by the disk controllers, etc., many data memory devices 2 that cannot be connected by a single data memory control device 4 alone can be connected to a single central control device 10.

Here, there is no need to equalize a number of the data memory devices 2 connected to every data memory control device 4, and a number of the data memory devices 2 connected to each data memory control device 4 can be set up suitably.

In this first embodiment, the well known technique of striping is applicable. In a case of applying the striping, the continuous data may be distributed over all of the data memory control devices 4 as indicated in FIG. 5, or the continuous data may be distributed over a part of the data memory control devices 4.

Each buffer memory device 8 is a memory device for temporarily storing the continuous data transferred from the data memory control device 4, and it can be constructed from a two port memory, a VRAM, etc., as will be described in detail later.

One (or possibly more) of the buffer memory devices 8 is provided for every combination of the data memory control device 4 and the communication control device 6 and connected thereto as shown in FIG. 5, according to the present invention.

In this configuration of FIG. 5, the dedicated buffer memory device 8 for use in the exchange of data among each data memory control device 4 and each communication control device 6 can be provided exclusively for every combination, and both the data path between the data memory control device 4 and the buffer memory device 8 and the data path between the buffer memory device 8 and the communication control device 6 are multiplexed, so that the data transfer capability of these data paths can be increased.

In addition, even when the buses having the data transfer capability (bandwidth) similar to the conventional ones are used as the buses 20 and 21 defining the respective data paths, the data transfer capability between the data memory control device 4 and the communication control device 6 can be improved drastically, so that it requires no increase of cost for the purpose of improving the data transfer capability using expensive buses or switch having a larger data transfer capability (bandwidth) as in a conventional case.

Note that, in FIG. 5, each one of the buses 20 and 21 is provided independently from the other buses, dedicatedly for each of the data memory control devices 4 and the communication control devices 6, but any plurality of the buses 20 and 21 shown in FIG. 5 may be provided in a unified form.

The communication control device 6 reads out the continuous data from the specified addresses of the specified buffer memory devices 8 and transfers them to a communication path such as a network or a coaxial cable of CATV (cable television). For the communication control devices 6, the ATM (Asynchronous Transfer Mode) network, the Ethernet, the FDDI (Fiber Distributed Data Interface), etc. can be utilized.

The central control device 10 is a device for coordinating the control of the system as a whole, and constructed from a CPU and a memory device similarly as an electronic computer, for example, where its functions can be realized by executing a program describing the control of the system as a whole on the CPU. It may be equipped with a communication device such as a network interface for notifying the access request according to the need. Thus, the central control device may receive the access requests either directly from the external of the apparatus, or through the communication control device 6.

The central control device 10 is managing, or capable of knowing, all the information in the system such as the specification of each continuous data stored in the system, the arrangement state of each continuous data on the data memory devices 2, the communication path that can be connected by each communication control device 6, etc., in order to control the system as a whole. As the specification of the continuous data, besides the information for identifying each continuous data such as the continuous data name or ID code, a total data length of each continuous data, a total number of blocks in a case where the continuous data comprises a plurality of blocks, etc. can be specified.

In outline, the central control device 10 admits the access request for the continuous data from a user or an application program that is notified by means of a communication via a network, an inter-process communication, or a procedure calling, etc., checks the data memory control device 4 and the communication control device 6 to be used in order to respond to that request, and issues to them commands for the operations necessary in transferring the requested continuous data from the communication path toward the specified transfer destination. To the data memory control device 4, the central control device 10 commands which continuous data stored in which data memory device 2 are to be transferred to which addresses of which buffer memory device 8, and to the communication control device 6, the central control device 10 commands which continuous data located at which addresses of which buffer memory device 8 are to be transmitted via the communication path to where.

Next, the flow of the operations of the continuous data server apparatus of this first embodiment will be described. Here, in order to simplify the explanation, it will be described for a concrete exemplary configuration as shown in FIG. 6 in which 8 sets of the data memory devices 2-1 to 2-8, 4 sets of the data memory control devices 4-1 to 4-4, 8 sets of the buffer memory devices 8-1 to 8-8, and 2 sets of the communication control devices 6-1 to 6-2 are provided.

The continuous data stored in the data memory devices 2 are data having a structure in which continuous bits or bytes are arranged. The continuous data are divided into several blocks, such as 16 blocks B1 to B16 as shown in FIG. 7 for example, and stored in the respective data memory devices 2-1 to 2-8 in an arrangement as indicated in FIG. 6. Namely, the 16 blocks B1 to B16 are stored in such a manner that B1 and B9 are in the data memory device 2-1, B2 and B10 are in the data memory device 2-2, . . . , and B8 and B16 are in the data memory device 2-8. This scheme for storing the continuous data is called the striping as already mentioned above, which is known as the technique for enabling many users to make accesses simultaneously to the identical data.

In a case of dividing the continuous data into a plurality of blocks in order to carry out the striping, there are various schemes regarding a manner of choosing a unit of division, such as a scheme for dividing the continuous data in a unit of certain size, a scheme in which a unit of certain size for dividing the continuous data is set to be a size equal to a unit of reading of the disk device used for the data memory device 2, a scheme in which the continuous data such as speech data or video data are divided in a unit corresponding to a certain playback time of speech data or video data, and a scheme in which the continuous data are in a data structure of MPEG (Motion Picture Experts Group) and divided at a border meaningful for the data structure of MPEG such as GOP (Group of Pictures).

Figure 6:
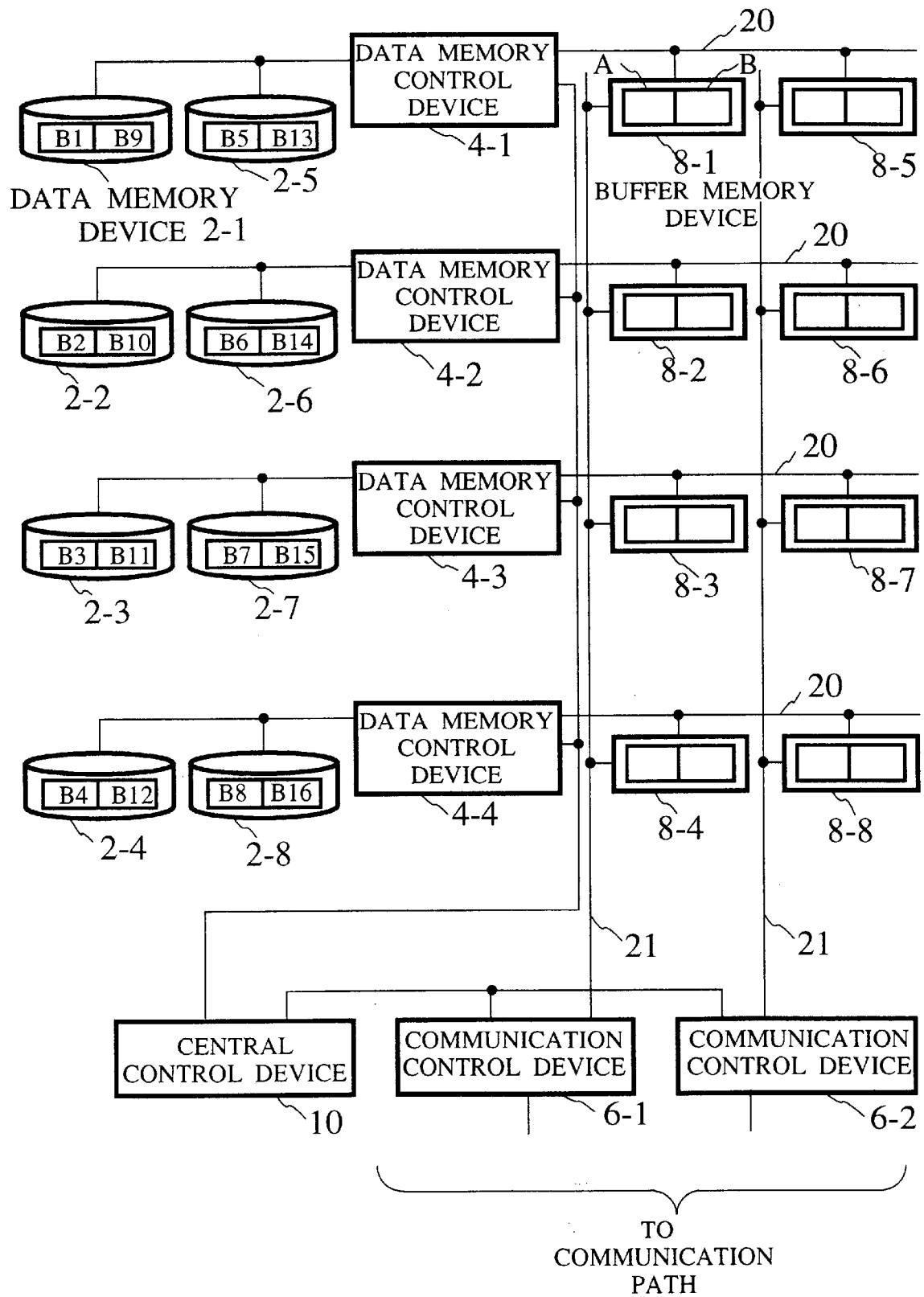
FIG. 6 is a block diagram of the continuous data server apparatus of FIG. 5 for an exemplary case.
Figure 7:
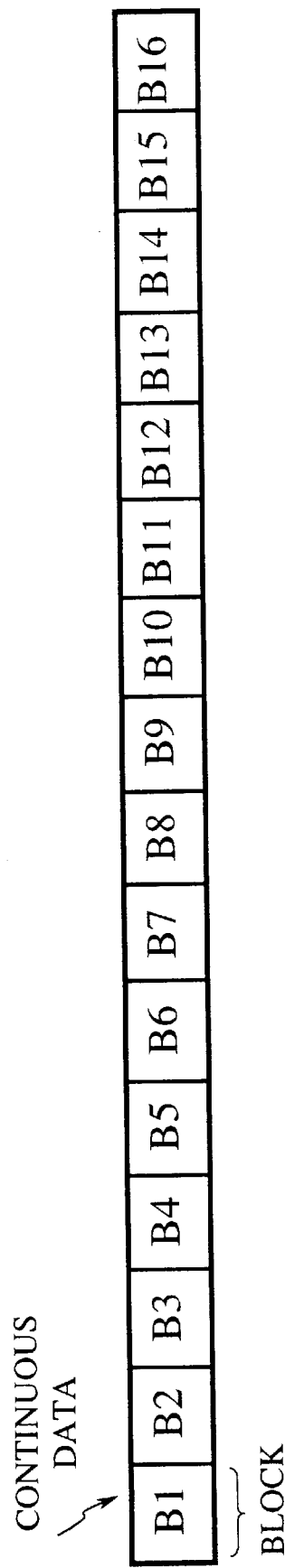
FIG. 7 is a diagram showing a structure of the continuous data used in the continuous data server apparatus of FIG. 5.

Note that FIG. 6 shows an exemplary case for storing one continuous data shown in FIG. 7 by carrying out the striping on the data memory devices 2, but in practice, a plurality of continuous data can be stored in block units in the data memory devices 2 of the continuous data server apparatus, in a manner similar to that shown in FIG. 6.

Now, the operation in an exemplary case where the access request for the continuous data of FIG. 7 is given to the continuous data server apparatus in a configuration of FIG. 6 via the network, etc., and this request is notified to the central control device 10, will be described for the access request for one continuous data. The operation of the central control device 10 in this case is carried out according to the flow chart of FIG. 8 as follows.

Note here that a group of blocks to be handled simultaneously such as blocks B1, B2, B3 and B4 will be referred to as a block group. Also, two buffer regions provided in each of the buffer memory devices 8-1 to 8-8, which are to be used as the double buffer, will be referred to as a buffer A and a buffer B as indicated in FIG. 6.

First, the central control device 10 commands the data memory control devices 4-1 to 4-4 to read the top block group of the continuous data requested by an access request into the buffer A of the buffer memory devices 8-1 to 8-4 (step S1). Namely, to the data memory control devices 4-1 to 4-4, the central control device 10 commands to read out the respective top blocks B1, B2, B3 and B4 and write them into the specified addresses (buffer A) of the buffer memory devices 8-1 to 8-4.

Figure 9:
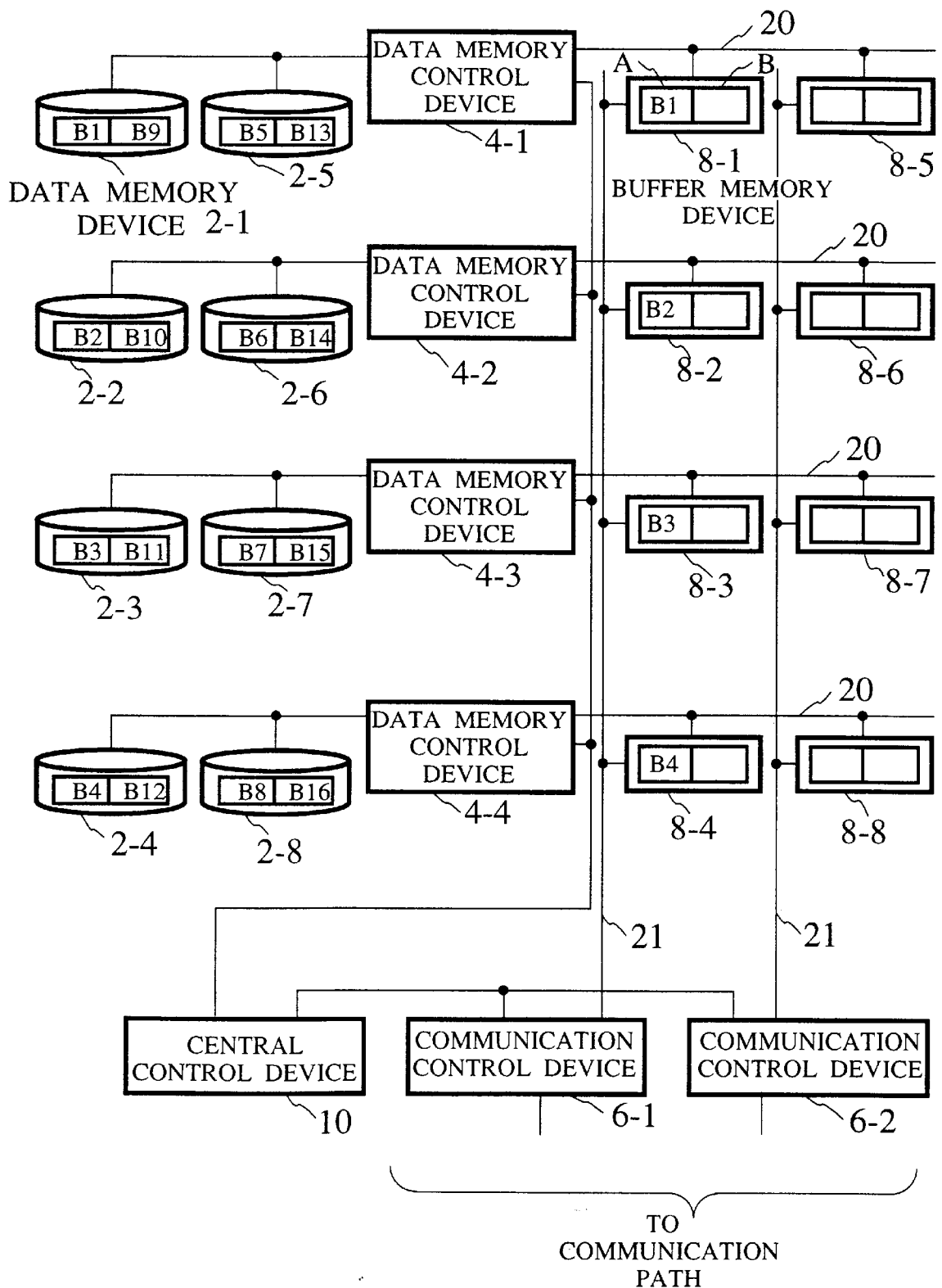
FIG. 9 is a block diagram of the continuous data server apparatus of FIG. 6 showing a state at one stage of the operation according to FIG. 8.

When this reading of the blocks B1 to B4 into the buffer A by the respective data memory control devices 4-1 to 4-4 is completed (step S2 Yes), the blocks B1, B2, B3 and B4 of the continuous data are written into the buffer memory devices 8-1 to 8-4, respectively, as indicated in FIG. 9.

When the blocks B1, B2, B3 and B4 are written into the buffer memory devices 8-1 to 8-4, the central control device 10 issues a command to transfer the blocks B1 to B4 written in the buffer memory devices 8-1 to 8-4 in an order, to the communication control device 6-1 (step S3).

The communication control device 6-1 then transmits the data written in the specified buffer memory devices 8-1 to 8-4 to the specified transfer destination. In a case where the communication control device 6 is a network such as the Ethernet, the content of the block is transferred to the specified address in a form of a packet. In a case where the communication control device 6 is the like of the cable television's coaxial cable, the specified data are transferred in an order at a predetermined transfer rate.

Next, while the communication control device 6-1 is transferring the blocks B1, B2, B3 and B4 in an order, the central control device 10 commands the data memory control devices 4-1 to 4-4 to read out the respective next blocks B5, B6, B7 and B8 and write them into the specified addresses (buffer B) of the buffer memory devices 8-1 to 8-4 which are different from the previously specified ones (step S4).

Figure 10:
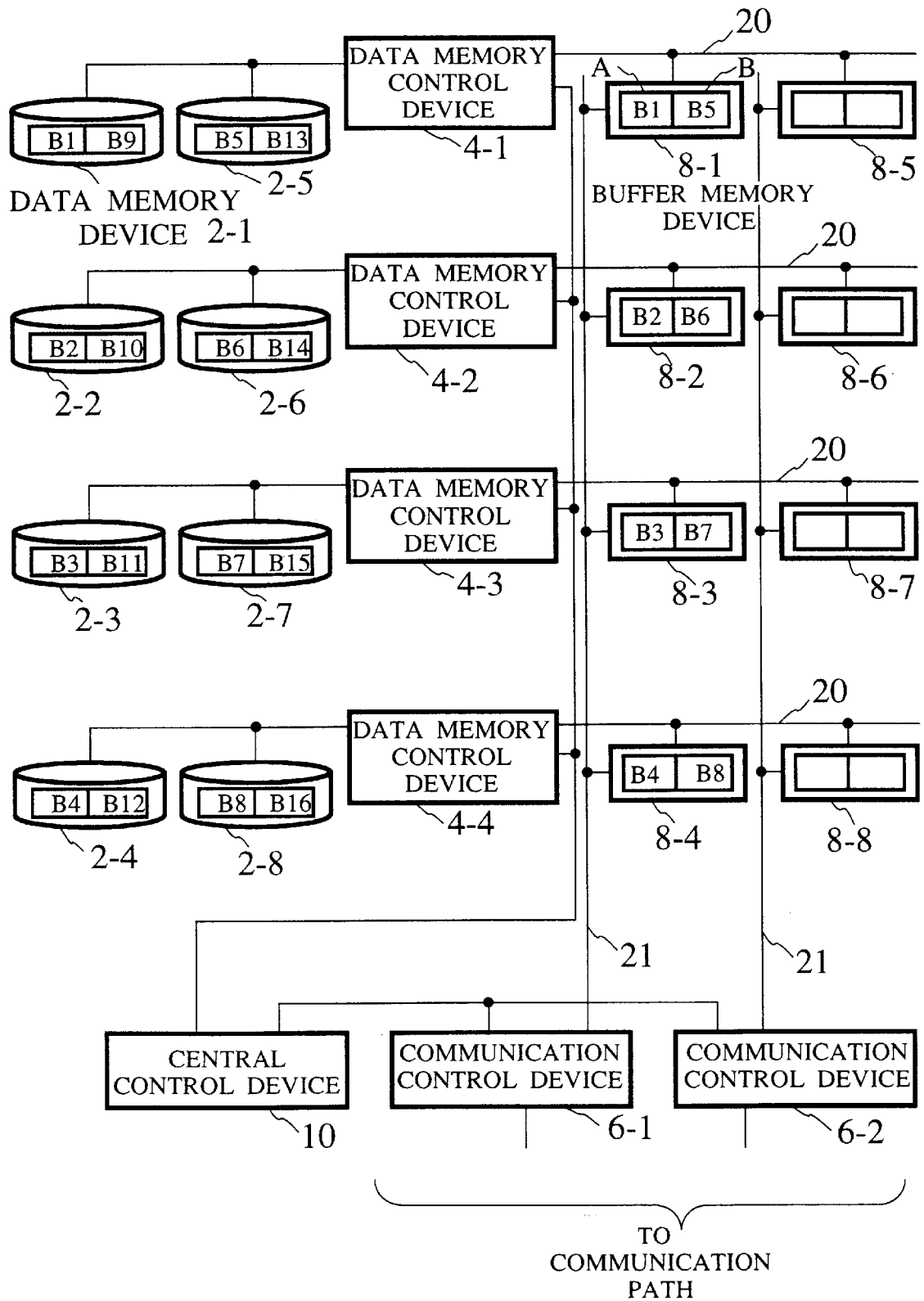
FIG. 10 is a block diagram of the continuous data server apparatus of FIG. 6 showing a state at another stage of the operation according to FIG. 8.

When this reading of the blocks B5 to B8 into the buffer B by the respective data memory control devices 4-1 to 4-4 is completed (step S6 Yes), the contents of the respect buffer memory devices 8-1 to 8-4 become as indicated in FIG. 10.

On the other hand, when the transfer of the blocks B1, B2, B3 and B4 from the buffer A by the communication control device 6-1 is completed (step S5 Yes), the central control device 10 issues a command to transfer the next block group, blocks B5 to B8, in an order from the buffer B of the buffer memory devices 8-1 to 8-4, to the communication control device 6-1 (step S7).

While the communication control device 6-1 is transferring the blocks B5, B6, B7 and B8, the central control device 10 commands the data memory control devices 4-1 to 4-4 to read the respective next blocks B9, B10, B11 and B12 into the buffer A of the buffer memory devices 8-1 to 8-4 (step S8).

Figure 11:
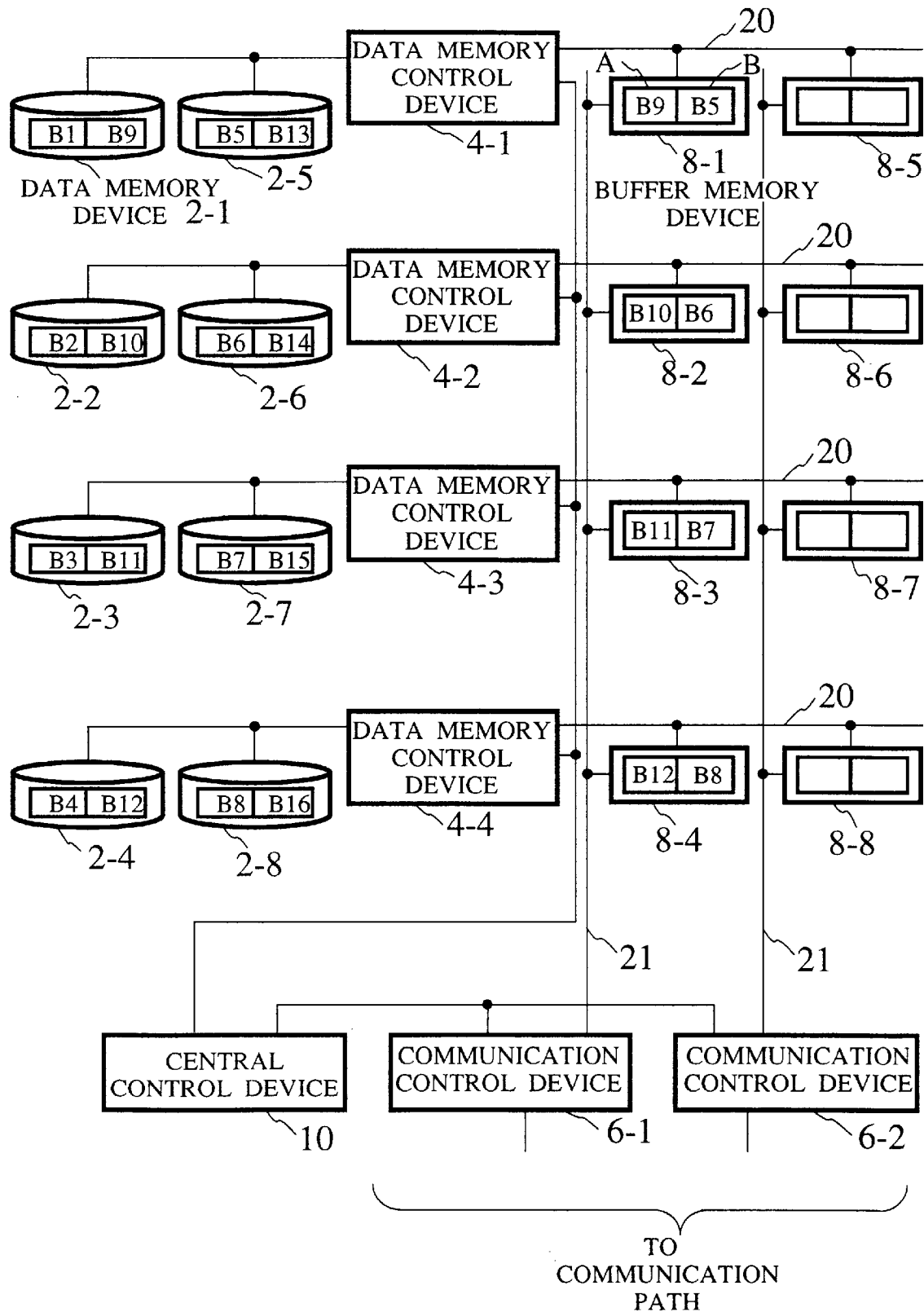
FIG. 11 is a block diagram of the continuous data server apparatus of FIG. 6 showing a state at another stage of the operation according to FIG. 8.

When this reading of the blocks B9 to B12 into the buffer A by the respective data memory control devices 4-1 to 4-4 is completed, the contents of the buffer memory devices 8-1 to 8-4 become as indicated in FIG. 11.

Then, after the transfer of the blocks B5, B6, B7 and B8 from the buffer B by the communication control device 6-1 is completed (step S9 Yes), the operation as described above is repeatedly carried out until the transfer of the continuous data is completed.

Figure 8:
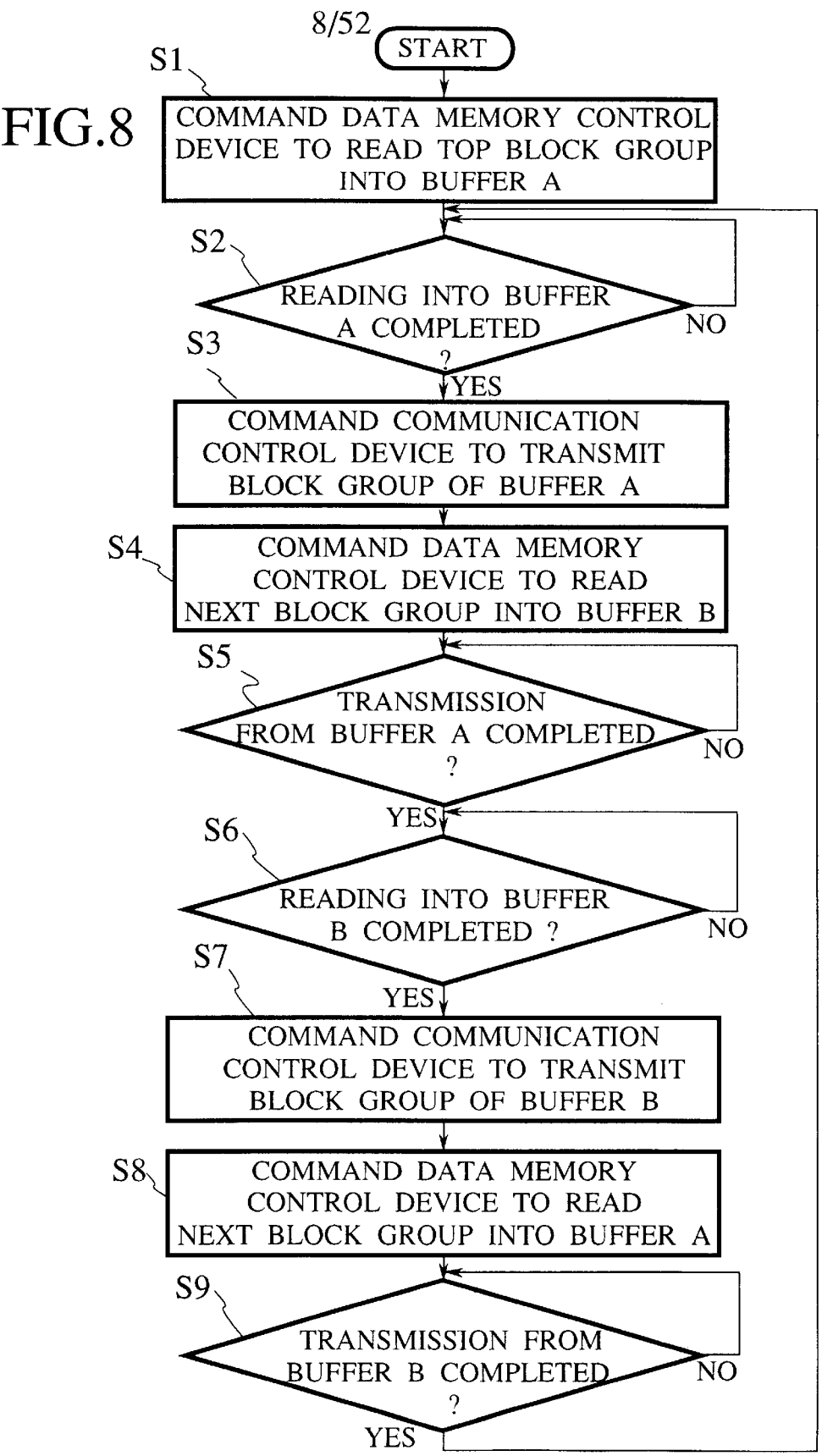
FIG. 8 is a flow chart for the operation of a central control device in the continuous data server apparatus of FIG. 6.

Note that, in the flow chart of FIG. 8 described above, the steps S5 and S6 are interchangeable.

In the above, in order to simplify the explanation, the operation has been described for a simplified case of responding to a request from one user in which one data memory control device 4 carries out only the read out of one continuous data, one buffer memory device 8 stores only blocks of one continuous data, and one communication control device 6 carries out only the transfer of one continuous data. However, the continuous data server apparatus of this first embodiment is capable of responding to the requests from a plurality of users simultaneously, and such a generalized operation can be realized easily by making the central control device 10 to control the overall data flow such that one data memory control device 4 can carry out the reading of a plurality of continuous data simultaneously, one communication control device 6 can be responsible for the transfer of the blocks of a plurality of continuous data simultaneously, or each buffer memory device 8 can store the blocks of a plurality of continuous data simultaneously.

Next, the buffer management scheme in this first embodiment will be described.

Figure 12:
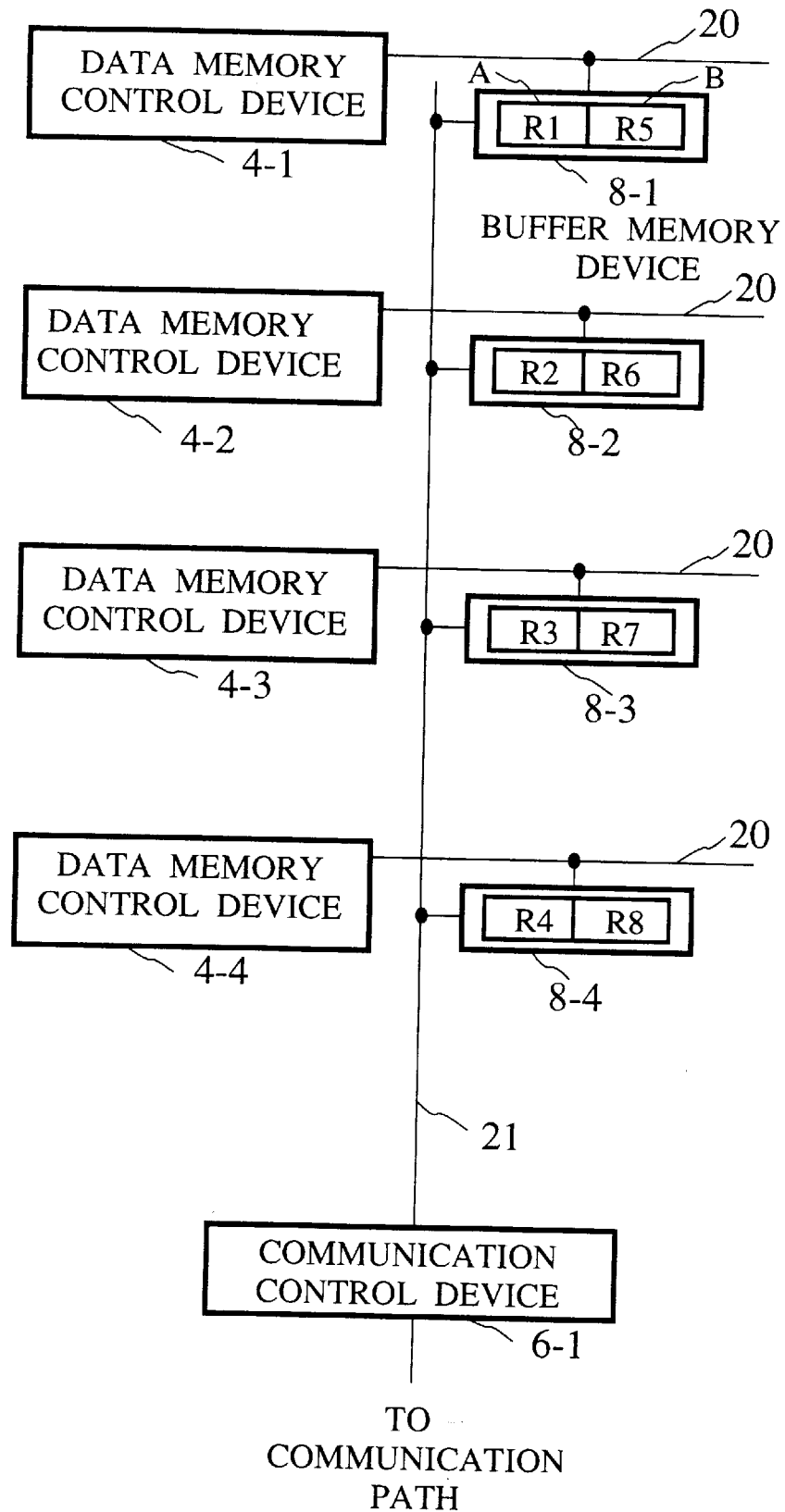
FIG. 12 is a partial block diagram of the continuous data server apparatus of FIG. 6 showing a buffer management scheme used in the first embodiment.

In the continuous data server apparatus of FIG. 6, for the buffer memory device 8 between the data memory control device 4 and the communication control device 6, the management scheme as shown in FIG. 12 is used. Namely, in FIG. 12, while the communication control device 6-1 reads out and transfers data from regions R1, R2, R3 and R4 on the A side of the buffer memory devices 8-1 to 8-4, the data memory control devices 4-1 to 4-4 write data into regions R5, R6, R7 and R8 on the B side of the buffer memory devices 8-1 to 8-4. When the communication control device 6-1 completes the transfer of data in the regions R1, R2, R3 and R4 on the A side of the buffer memory devices 8-1 to 8-4, the roles of the regions R1, R2, R3 and R4 and the regions R5, R6, R7 and R8 on the buffer memory devices 8-1 to 8-4 are switched, so that the data memory control devices 4-1 to 4-4 write data into the regions R1, R2, R3 and R4 on the A side of the buffer memory devices 8-1 to 8-4, and the communication control device 6-1 reads out and transfers data from the regions R5, R6, R7 and R8 on the B side of the buffer memory devices 8-1 to 8-4.

This buffer management scheme is effective in a case of applying the RAID technique among the data memory control devices 4-1 to 4-4. The RAID technique is a technique for enabling the handling of a malfunction of the disk device by utilizing the striping technique. Namely, in the RAID technique, when the striping is applied to n sets of disk devices, the exclusive OR of data stored in these n sets of disks is obtained and stored as a parity in the (n+1)-th disk. In this manner, even when one of these n+1sets of disk devices becomes malfunctioning, it becomes possible to recover the lost data due to the malfunctioning disk device by calculating the exclusive OR of the data of the other disk devices.

Figure 13:
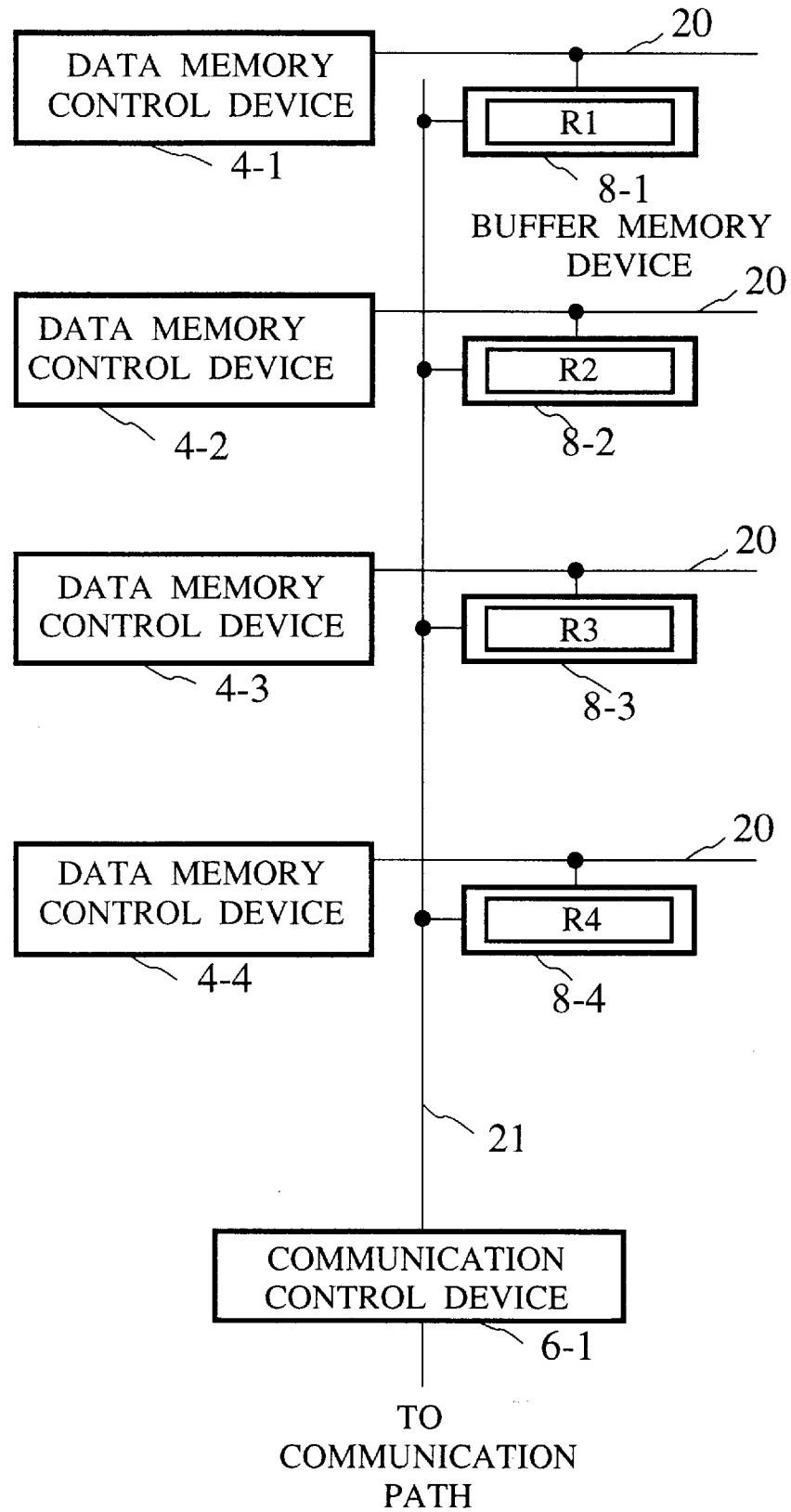
FIG. 13 is a partial block diagram of the continuous data server apparatus of FIG. 6 showing a simpler buffer management scheme that can be used in the first embodiment.

On the other hand, in a case of not using the RAID among a plurality of data memory control devices 4, it is also possible to use a simpler buffer management scheme as shown in FIG. 13. Namely, while the communication control device 6-1 is carrying out the transfer of data from the region R1 on the buffer memory device 8-1, the data memory control device 4-2 carries out the reading of data on the region R2 of the buffer memory device 8-2. Also, while the communication control device 6-1 is carrying out the transfer of data from the region R2 on the buffer memory device 8-2, the data memory control device 4-3 carries out the reading of data on the region R3 of the buffer memory device 8-3. Similarly, while the communication control device 6-1 is carrying out the transfer of data from the region R3 on the buffer memory device 8-3, the data memory control device 4-4 carries out the reading of data on the region R4 of the buffer memory device 8-4. Such an operation will be repeatedly carried out in a similar manner subsequently according to this buffer management scheme.

Figure 14:
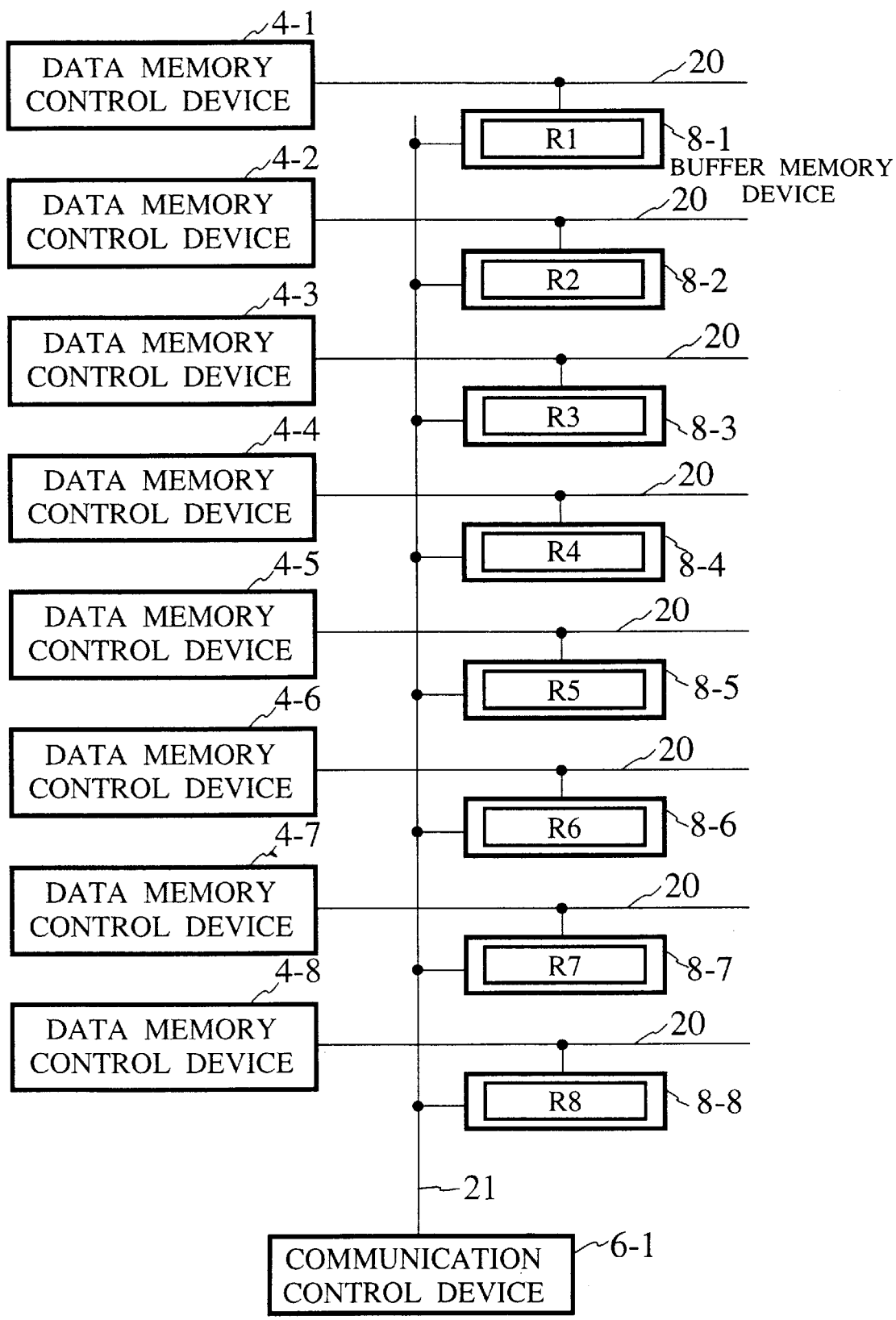
FIG. 14 is a partial block diagram of the continuous data server apparatus of FIG. 6 showing another buffer management scheme that can be used in the first embodiment.

Also, in a case of using the RAID, it is also possible to use the buffer management scheme as shown in FIG. 14. In FIG. 14, it is assumed that the data memory control devices 4-1 to 4-4 form one group for RAID, and in addition, the data memory devices 4-5 to 4-8 form another group for RAID. In this case, while the communication control device 6-1 is transferring data from the regions R1, R2, R3 and R4 of the buffer memory devices 8-1 to 8-4, the data memory control devices 4-5 to 4-8 carry out the reading of data into the regions R5, R6, R7 and R8 of the buffer memory devices 8-5 to 8-8. When the transfer of the data from the regions R1, R2, R3 and R4 is completed, on the contrary, while the communication control device 6-1 is transferring data from the regions R5, R6, R7 and R8 of the buffer memory devices 8-5 to 8-8, the data memory devices 4-1 to 4-4 carry out the reading of data into the regions R1, R2, R3 and R4 of the buffer memory devices 8-1 to 8-4.

As described above, in the continuous data server apparatus of this first embodiment, for every pair of the data memory control device and the communication control device, the buffer memory device dedicated for the data exchange between them is provided, so that it is possible to raise the level of multiplexing for the data path between the data memory control device and the buffer memory device as well as for the data path between the buffer memory device and the communication control device, and it becomes possible to increase a number of users that can simultaneously make accesses the continuous data.

It is more effective to connect each data memory control device and each communication control device only with the buffer memory devices for which there is a need to make accesses from them, as it becomes possible for each data path to use the bus exclusively.

Conventionally, in a case of trying to obtain the similar data transfer capability as this first embodiment, it has been necessary to store the identical continuous data in many data memory devices, or to use the expensive switch or network such as the crossbar switch or ATM, so that it has been very costly. On the other hand, according to this first embodiment, only the buffer memory devices are to be connected in a matrix shape with respect to the data memory control devices and the communication control devices, so that there is no need for a specialized switch or network, and there is also no need to have copies of the continuous data in many data memory devices.

Also, in a case of connecting a plurality of data memory control devices and the buffer memory devices using the crossbar switch as in the conventional case, there has been a need for a circuit to arbitrate the simultaneous writings to the buffer memory device from a plurality of data memory control devices, but in this first embodiment, the buffer memory devices realize that function, so that there is no need to provide an arbitration circuit.

For these reasons, according to this first embodiment, it is possible to construct the continuous data server apparatus for carrying out the transfer of many continuous data simultaneously at a less cost compared with the conventional case.

In addition, each buffer memory device is connected with one data memory control device and one communication control device, so that there is an advantage that the arbitration for the accesses to the buffer memory device becomes very simple.

Moreover, in a case of storing the continuous data by striping them over the data memory devices managed by a plurality of data memory control devices, there is a need to gather the continuous data applied with the striping to one communication control device via the buffer memory devices. In this regard, in the continuous data server apparatus of this first embodiment, the buffer memory device not only functions as a simple buffer memory but also as the crossbar switch for connecting between the data memory control device and the communication control device.

Next, an exemplary configuration in which the continuous data server apparatus of FIG. 5 is expanded will be described with reference to FIG. 15.

The configuration of FIG. 5 described above is a configuration in which only one set of data memory control device 4 is connected to the bus 20 connecting m sets of buffer memory devices 8 and the data memory control device 4, and only one set of communication control device 6 is connected to the bus 21 connecting n sets of buffer memory devices 8 and the communication control device 6, but the present invention is also applicable to a case in which the bus 20 is shared by a plurality of data memory control devices 4 or a case in which the bus 21 is shared by a plurality of communication control devices 6. It is also possible to use a configuration shown in FIG. 15 in which the bus 20 is shared by a plurality of data memory control devices 4 while the bus 21 is shared by a plurality of communication control devices 6. In other words, in this configuration of FIG. 15, a plurality of data memory control devices 4 form a data memory control unit 4A, and each data memory control unit 4A is connected to the bus 20 connecting m sets of buffer memory devices 8 and the data memory control devices 4 of this data memory control unit 4A, so that the m sets of buffer memory devices 8 are provided in correspondence to each data memory control unit 4A in analogy to the configuration of FIG. 5.

Figure 15:
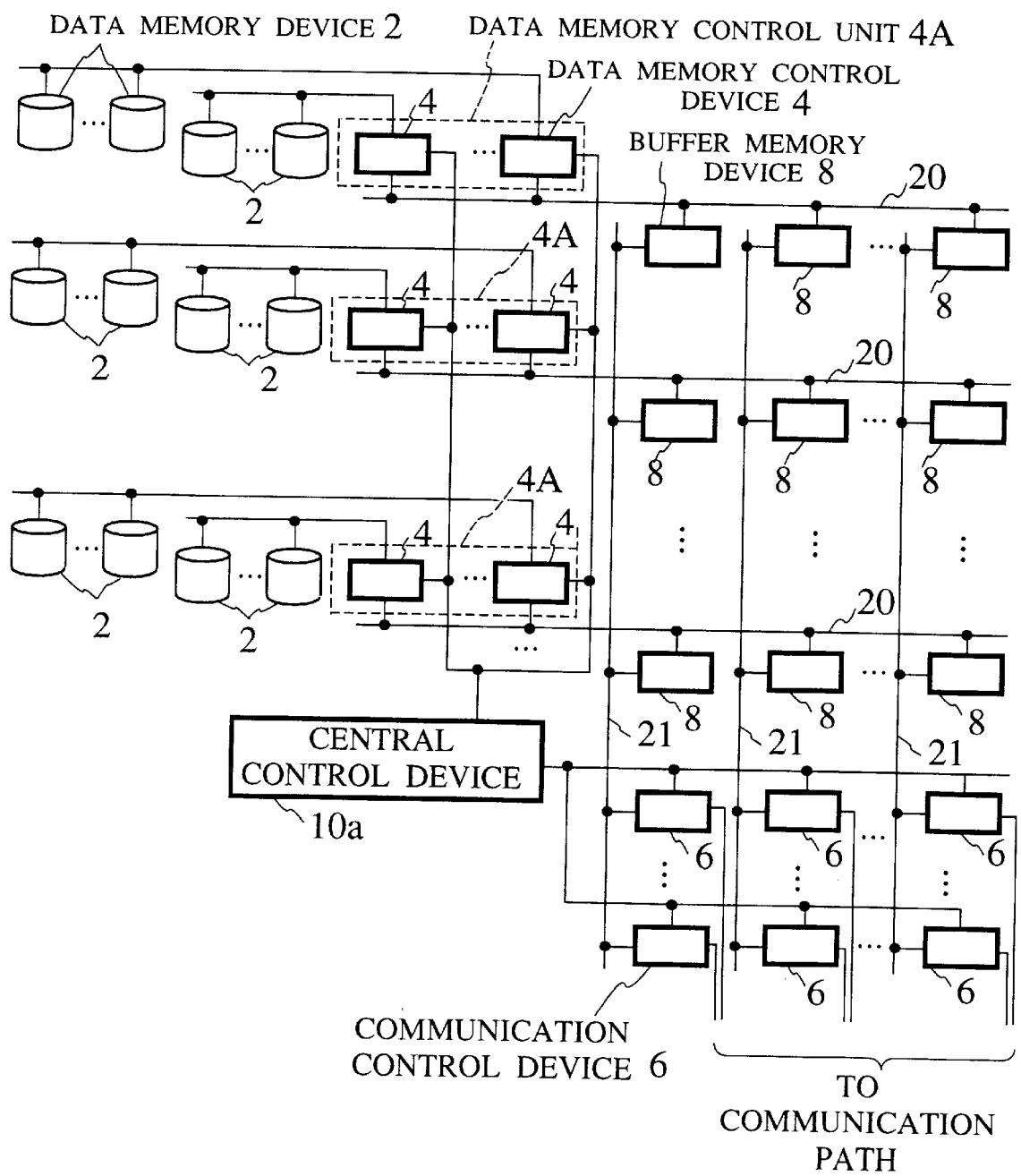
FIG. 15 is a block diagram of an expanded configuration for the first embodiment of a continuous data server apparatus according to the present invention.

Note that, in FIG. 15, the same manner of sharing is used for all the buses, but it is also possible to suitably set up a number of data memory control devices 4 or communication control devices 6 to be connected for each bus. Also, the buffer memory device 8 to be used exclusively by n sets of memory control devices 4 and m sets of communication control devices 6 and the buffer memory device 8 to be used exclusively by l sets of memory control devices 4 (l≠n) and k sets of communication control devices 6 (k≠m) may be mixedly present.

In this exemplary configuration of FIG. 15, the central control device 10a has the similar function as the central control device 10 in the configuration of FIG. 5 described above. The bus 20 has a function for carrying out the arbitration in a case of an occurrence of a conflict of accesses among the data memory control devices 4 connected to this bus 20. The bus 21 has a function for carrying out the arbitration in a case of an occurrence of a conflict of accesses among the communication control devices 6 connected to this bus 21.

Next, another exemplary configuration in which the continuous data server apparatus of FIG. 15 is further expanded will be described with reference to FIG. 16.

Figure 16:
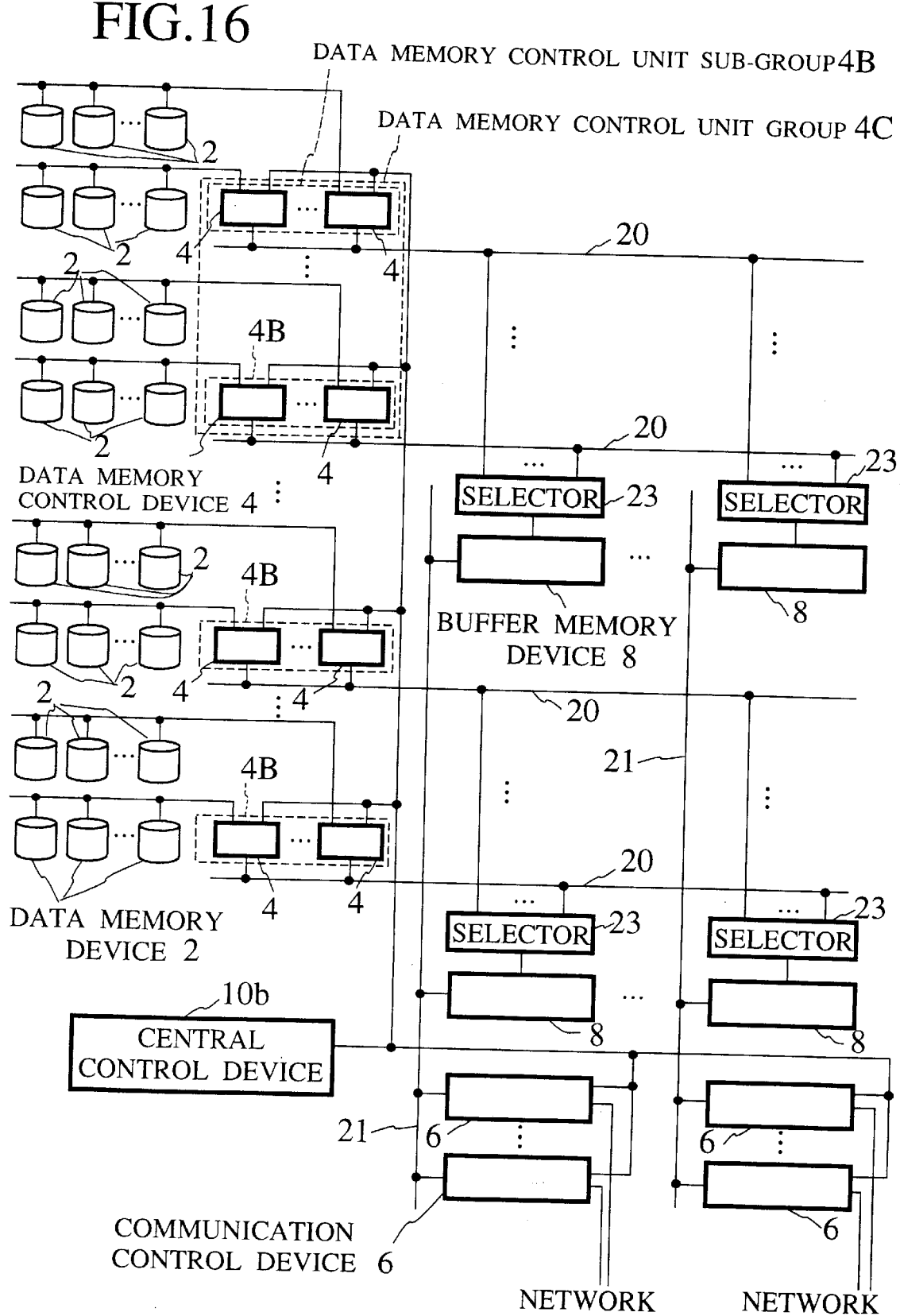
FIG. 16 is a block diagram of a further expanded configuration for the first embodiment of a continuous data server apparatus according to the present invention.

In this continuous data server apparatus of FIG. 16, a plurality of buses 20 for connecting the data memory control devices 4 and the buffer memory devices 8 are bundled together, and these buses 20 are connected to each buffer memory control device 8 via a selector 23. The selector 23 has a function for connecting one bus 20 selectively to the buffer memory device 8 at a given moment, in order to arbitrate the access requests for the buffer memory device 8 from a plurality of buses 20 connected with the data memory control devices 4. By means of this, it is possible for a plurality of buses 20 connected with the data memory control devices 4 to share one buffer memory device 8. In other words, in this configuration of FIG. 16, a plurality of data memory control devices 4 form a data memory control unit sub-group 4B while a plurality of data memory control unit sub-group 4B form a data memory control unit group 4C where each data memory control unit sub-group 4B is connected to each bus 20 connecting m sets of buffer memory devices 8 and the data memory control devices 4 of each data memory control unit sub-group 4B, so that the m sets of buffer memory devices 8 are provided in correspondence to each data memory control unit group 4C in analogy to the configuration of FIG. 5.

The buffer region on the buffer memory device 8 can be used in circulation by sharing among a plurality of streams, or can be used by fixedly allocating the buffer region to each stream. In a case of using the buffer region in circulation among different streams, there is a need for the scheduling such that a time from a start to an end of the use of the buffer region by each stream does not overlap among the streams, but this scheduling becomes very simple in a case where one stream can occupy the same buffer region. For this reason, from a point of view of the buffer management, it is preferable to use the buffer region on the buffer memory device 8 in circulation among the same streams. However, in order to realize this, whenever a number of the buses 20 connecting the data memory control devices 4 and the buffer memory devices 8 is increased, it is necessary to increase a capacity of the buffer memory device 8 proportionally. In view of this fact, it is possible to prevent an increase of a capacity of the buffer memory device 8 by sharing the buffer memory device 8 among a plurality of buses 20 as shown in FIG. 16.

Note here that only one set of the communication control device 6 may be connected to the data path 21, or the data path 21 may be shared by a plurality of communication control devices 6 as shown in FIG. 16. Similarly, only one set of data memory control device 4 may be connected to the data path 20, or the data path 20 may be shared by a plurality of data memory control devices 4 as shown in FIG. 16. Also, the buffer memory device 8 to be used exclusively by n sets of data memory control devices 4 and m sets of communication control devices 6 and the buffer memory device 8 to be used exclusively by l sets of memory control devices 4 (l≠n) and k sets of communication control devices 6 (k≠m) may be mixedly present.

In this exemplary configuration of FIG. 16, the central control device 10b has the similar function as the central control device 10 in the configuration of FIG. 5 described above.

Next, a detailed configuration of the buffer memory device 8 suitable for the continuous data server apparatus of this first embodiment will be described.

The buffer memory device 8 is a memory which has a port to be used for the data writing by the data memory control device 4 and a port to be used for the data reading by the communication control device 6.

For this buffer memory device 8, a two port memory can be used. For example, as shown in FIG. 17, the two port memory 30 has terminals for specifying address and data for the writing by the data memory control device 4 and a control terminal for writing, chip selection, etc. if necessary, as well as terminals for specifying address and data for the reading by the communication control device 6 and a control terminal for chip selection, etc. if necessary.

Figure 17:
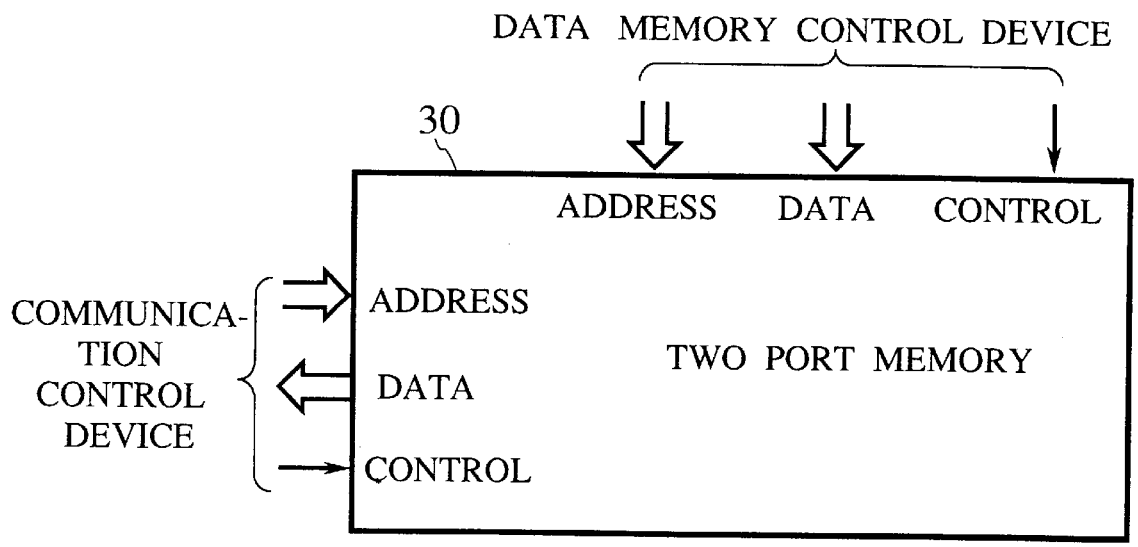
FIG. 17 is a schematic diagram of a two port memory that can be used for a buffer memory device in the continuous data server apparatus of the first embodiment.

This two port memory 30 is a memory which has a write port and a read port, so that the widely used two port memory having two read and write ports can be utilized by using one port for the write only and another port for read only, so as to realize the function equivalent to the two port memory 30 of FIG. 17 easily. Besides that, a variety of other methods for constructing this two port memory 30 are available.

Figure 18:
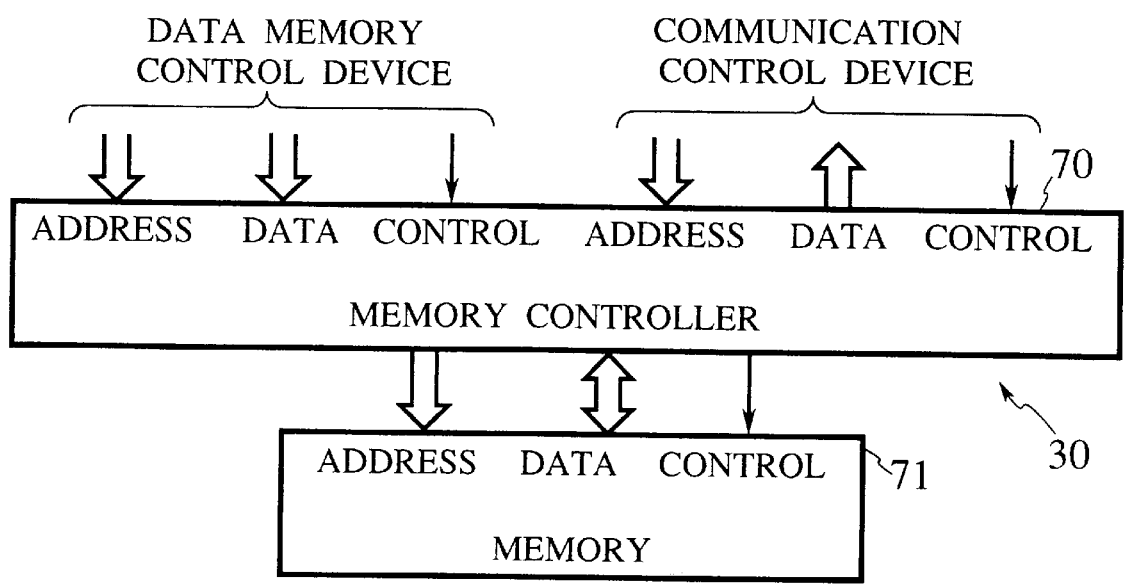
FIG. 18 is a schematic diagram showing one scheme for constructing the two port memory of FIG. 17.

For example, FIG. 18 shows a scheme for constructing the two port memory 30 using a usual one port memory. Either one of the write request from the data memory control device and the read request from the communication control device is specified to a memory 71 by the arbitration by a memory controller 70 such as FPGA (Field Programmable Gate Array). In a case where two access requests are in conflict, one of them will be kept awaiting.

Figure 19:
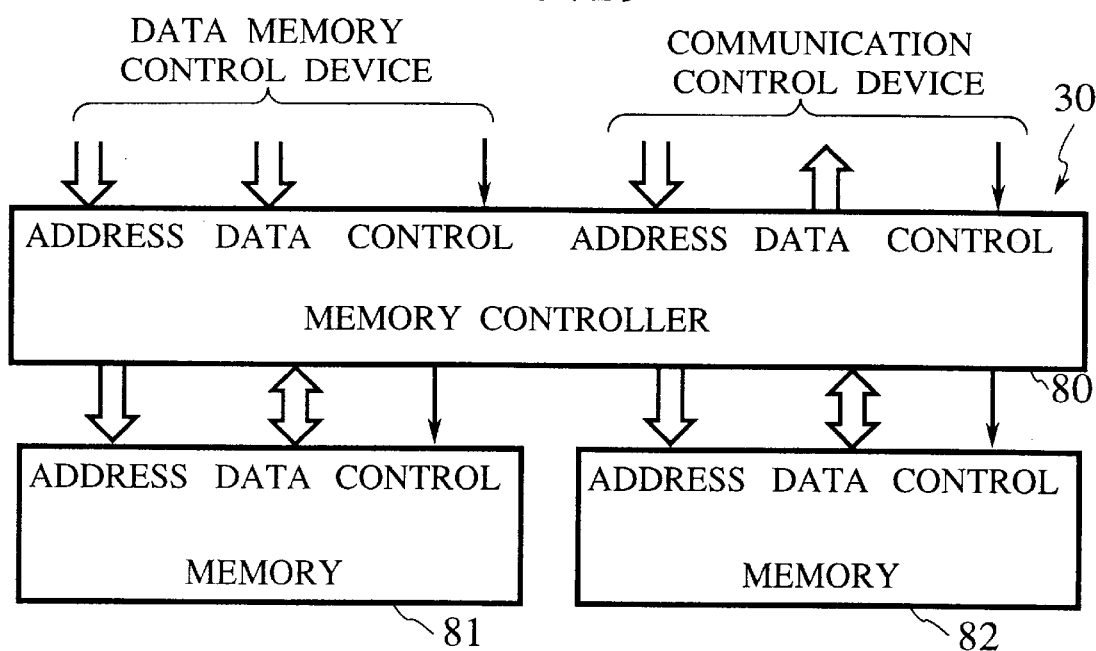
FIG. 19 is a schematic diagram showing another scheme for constructing the two port memory of FIG. 17.

FIG. 19 shows a scheme for constructing the two port memory 30 using two usual one port memories, where basically similarly as an example of FIG. 18, either one of the write request from the data memory control device and the read request from the communication control device is specified to a memory 81 and a memory 82 by the arbitration by a memory controller 80 such as FPGA. This scheme is also similar to the previous scheme in that, in a case where two access requests are in conflict, one of them will be kept awaiting. However, two memories 81 and 82 are used in this scheme so that even when one of them is in use, an access request to another one of them is acceptable and the accesses can be made simultaneously, so that it is possible to reduce a probability for one of them to be kept awaiting due to the conflict between two simultaneously occurred access requests.

It should be obvious that, in the two port memory 30 as shown in FIG. 17, FIG. 18 or FIG. 19, the speed of reading or writing can be improved by using a structure with multiple banks and interleaving the data, just as in a case of the usual memory.

Now, an exemplary configuration using the above described two port memory 30 as the buffer memory device of the continuous data server apparatus will be described with reference to FIG. 20. In this FIG. 20, however, the data memory devices 2 and the central control device 10 are omitted. A symbol $M_{i,j}$ (i=1 to n, j=1 to m) written within a block of the two port memory 30 in FIG. 20 indicates that this two port memory 30 is connected exclusively to the data memory control device 4-i and the communication control device 6-j.

Figure 21:
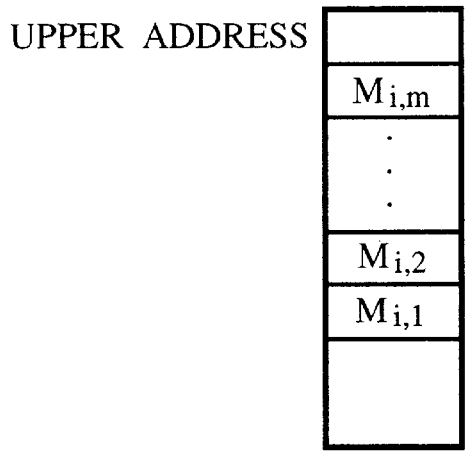
FIG. 21 is a diagram showing an address space viewed from a data memory device in the exemplary configuration of FIG. 20.

From the data memory control device 4-i, the writing with respect to the buffer memory devices $M_{i,1}, M_{i,2}, \ldots, M_{i,m}$ can be made. At this point, the address space viewed from the data memory device 4-i can be configured as shown in FIG. 21, for example, such that $M_{i,1}, M_{i,2}, \ldots, M_{i,m}$ will be mapped to appropriate addresses.

Figure 22:
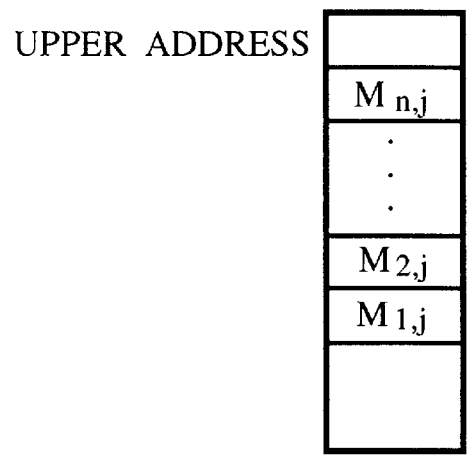
FIG. 22 is a diagram showing an address space viewed from a communication control device in the exemplary configuration of FIG. 20.

On the other hand, from the communication control device 6-j, the reading with respect to the buffer memory devices $M_{i,j}, M_{2,j}, \ldots, M_{n,j}$ can be made. At this point, the address space viewed from the communication control device j can be configured as shown in FIG. 22, for example, such that $M_{1,j}, M_{2,j}, \ldots, M_{n,j}$ will be mapped to appropriate addresses.

Figure 23:
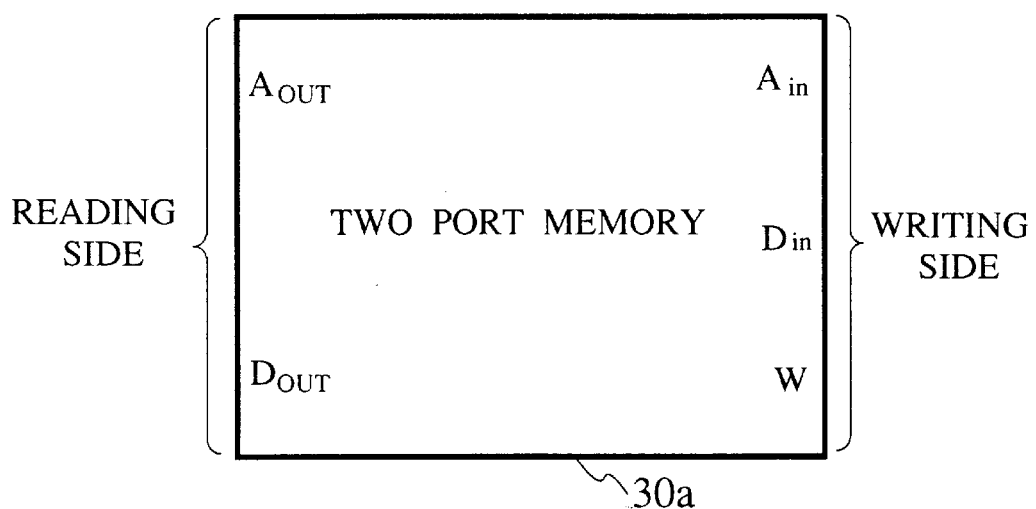
FIG. 23 is a schematic diagram of another two port memory that can be used for a buffer memory device in the continuous data server apparatus of the first embodiment.

Next, a scheme for constructing the buffer memory device in a case of using the two port memory 30a as shown in FIG. 23 will be described in detail.

The two port memory 30a of FIG. 23 has an address terminal Ain, a data terminal Din and a write signal terminal W for the writing from the data memory control device 4, as well as an address terminal Aout and a data terminal Dout for the reading from the communication control device 6. Each of the terminals Ain, Din, Aout and Dout has a width of a plurality of bits in practice.

Figure 20:
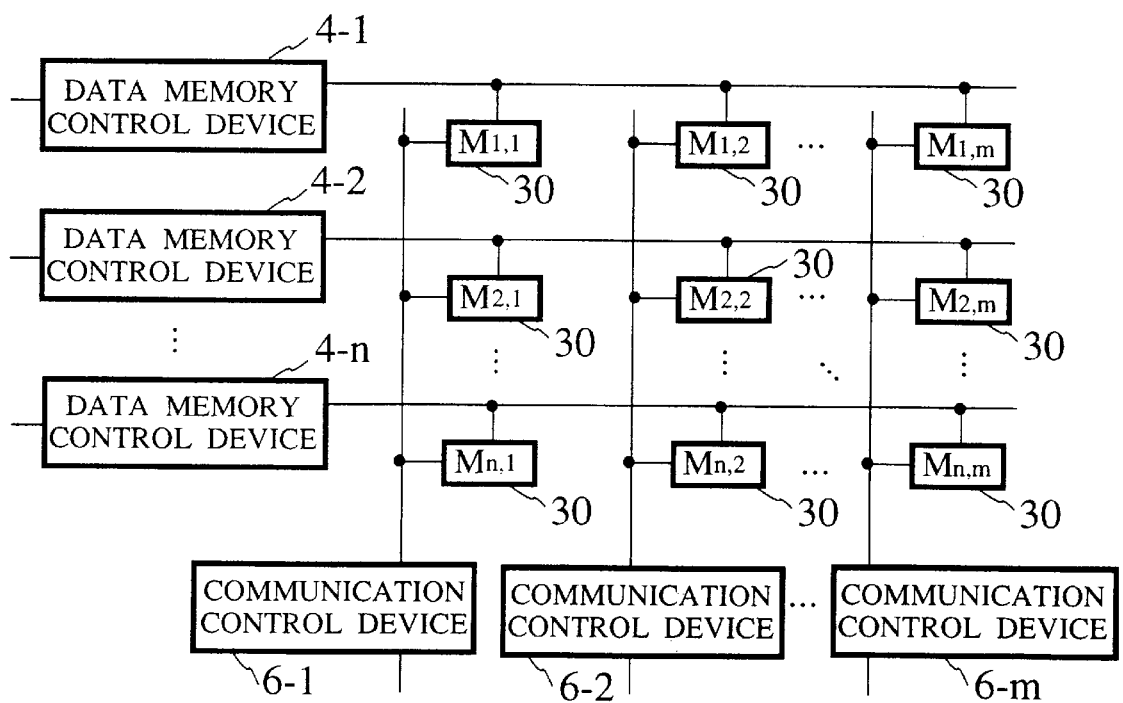
FIG. 20 is a partial block diagram of the continuous data server apparatus of FIG. 5 showing an exemplary configuration in a case of using the two port memory of FIG. 17.
Figure 24:
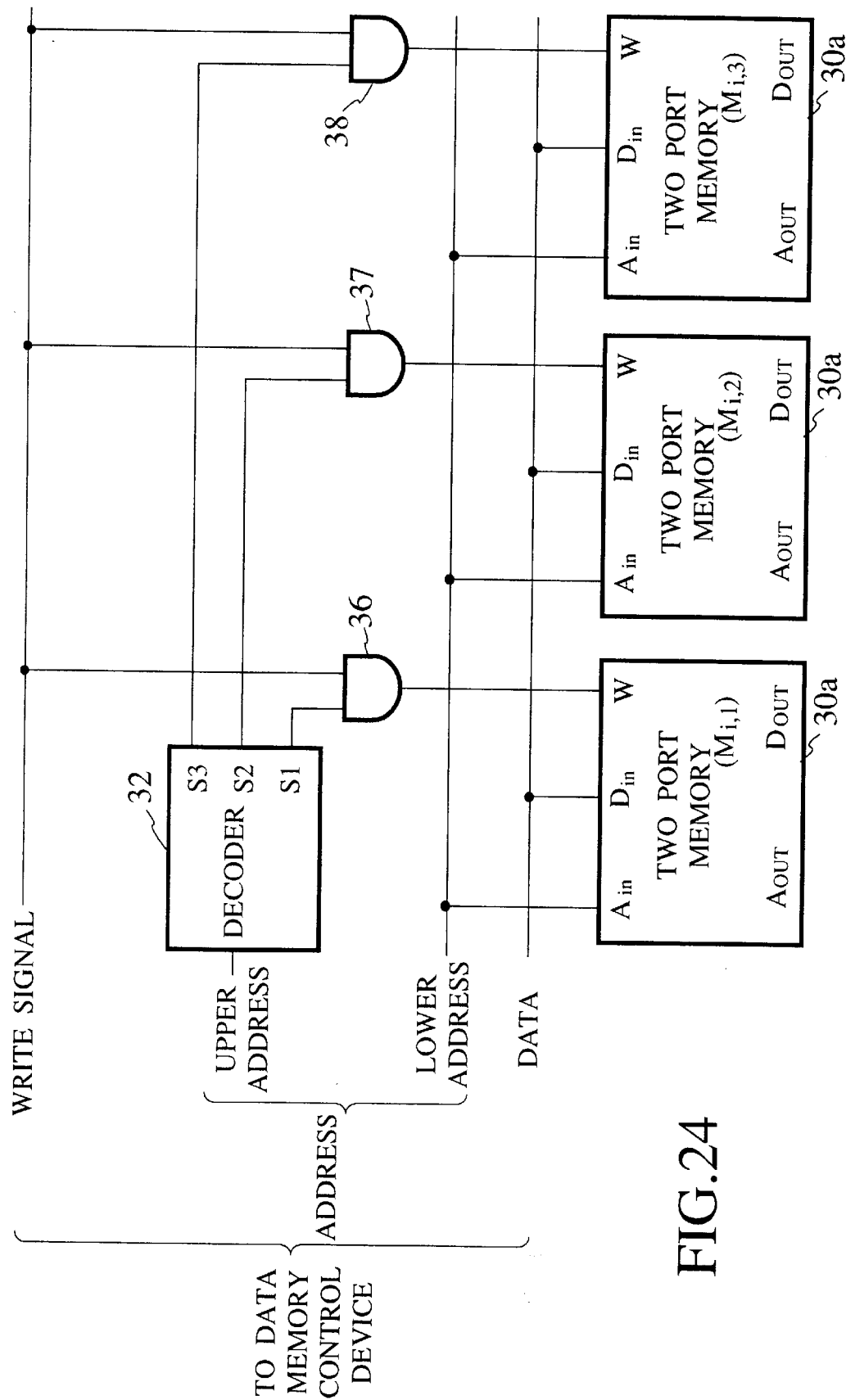
FIG. 24 is a partial block diagram of the continuous data server apparatus of FIG. 5 showing an exemplary connection of a data memory control device and buffer memory devices in a case of using the two port memory of FIG. 23.

An exemplary connection of the data memory control device and the buffer memory devices for this case is shown in FIG. 24, which is effectively an extract of a portion of the configuration of FIG. 20 described above.

In FIG. 24, the buffer memory device formed by the two port memory 30a of FIG. 23 is used, and the two port memories $M_{i,1}, M_{i,2}$ and $M_{i,3}$ are those provided with respect to the respective pairs of the data memory control device 4-i (not shown) and three communication control devices 6-1, 6-2 and 6-3 (not shown). In FIG. 24, a decoder 32 and three AND circuits 36, 37 and 38 in correspondence to three two port memories 30a are also provided.

In this configuration of FIG. 24, the upper address is decoded by the decoder 32 while the two port memories $M_{i,1}, M_{i,2}$ and $M_{i,3}$ are set in correspondence to different addresses, and only when a write signal is set active for an address to which each of the two port memories $M_{i,1}, M_{i,2}$ and $M_{i,3}$ is mapped, the W terminal of the corresponding two port memory 30a becomes active and the writing is carried out at that two port memory 30a.

Figure 25:
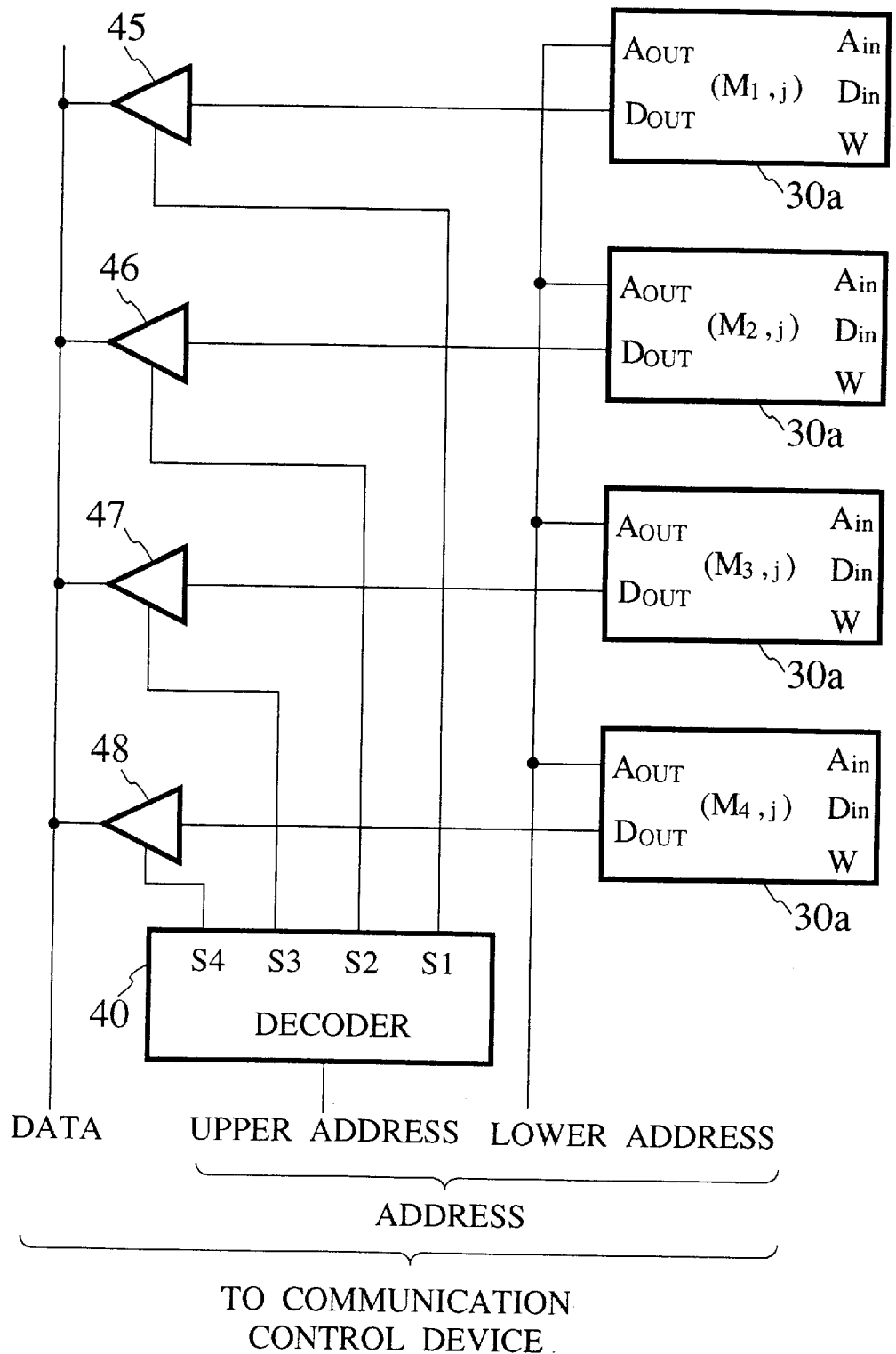
FIG. 25 is a partial block diagram of the continuous data server apparatus of FIG. 5 showing an exemplary connection of a communication control device and buffer memory devices in a case of using the two port memory of FIG. 23.

On the other hand, an exemplary connection of the communication control device and the buffer memory devices for this case is shown in FIG. 25. which is also effectively an extract of a portion of the configuration of FIG. 20 described above.

In FIG. 25, the buffer memory device formed by the two port memory 30a of FIG. 23 is used, and the two port memories $M_{i,j}, M_{2,j}, M_{3,j}$ and $M_{4,j}$ are those provided with respect to the respective pairs of four data memory control devices 4-1, 4-2, 4-3 and 4-4 (not shown) and the communication control devices 6-j (not shown). In FIG. 25, a decoder 40 and four gate circuits 45. 46. 47 and 48 in correspondence to four two port memories 30a are also provided.

In this configuration of FIG. 25, the upper address is decoded by the decoder 40, and when an address to which each of the two port memories $M_{i,j}, M_{2,j}, M_{3,j}$ and $M_{4,j}$ is mapped is selected, the data from that two port memory 30a are sent to the communication control device 6-j.

In a case of applying the RAID technique to the continuous data server apparatus with the configuration as described above, the calculation of the parity can be carried out automatically by devising the connection of the communication control device and the buffer memory devices. An example of a connection scheme for realizing such an automatic parity calculation will now be described with reference to FIG. 26.

Figure 26:
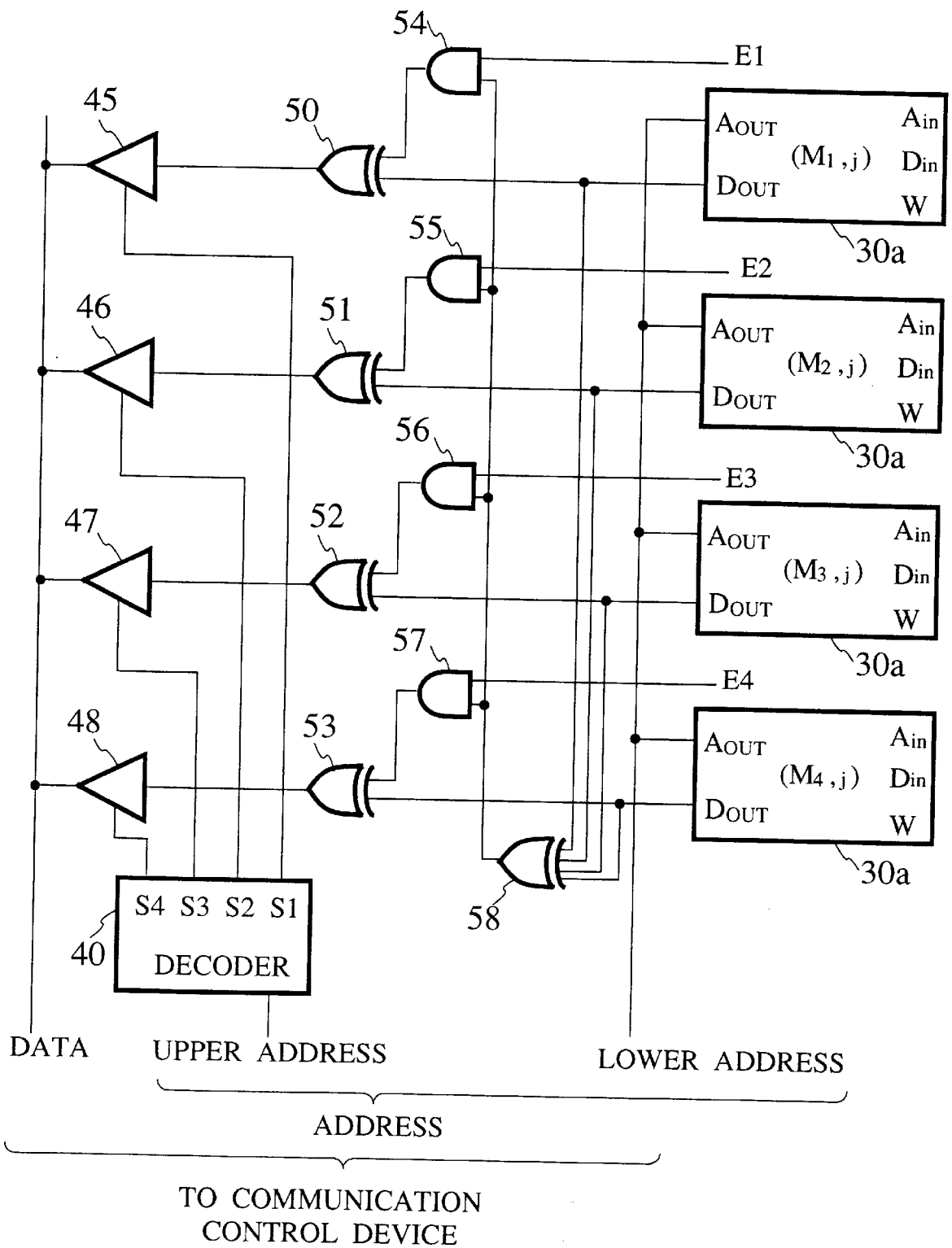
FIG. 26 is a partial block diagram of the continuous data server apparatus of FIG. 5 showing another exemplary connection of a communication control device and buffer memory devices in a case of using the two port memory of FIG. 23.

This connection scheme of FIG. 26 uses a very simple configuration in which only exclusive OR circuits 50 to 53 with two inputs, AND circuits 54 to 57, and an exclusive OR circuit 58 with four inputs are additionally provided in the configuration of FIG. 25. Here, blocks B1, B2, B3 and B4 are written into the two port memories $M_{1,j}, M_{2,j}, M_{3,j}$ and $M_{4,j}$, and the data in one of them is assumed to be the parity. For example, it is assumed that the data in the block B4 is the parity, so that the content of B4 is the exclusive OR of the data in the other blocks B1, B2 and B3.

Now, suppose that signals E1, E2, E3 and E4 are trouble occurrence detection signals indicating that data are not correct due to the malfunction of the respective data memory control devices 4-1 to 4-4 or the data memory devices 2 connected with them. These trouble occurrence detection signals E1, E2, E3 and E4 can be realized by various schemes, including a scheme in which a corresponding signal is made active when the central control device 10 detects an occurrence of the trouble in any of the data memory devices 2 or the data memory control devices 4, a scheme in which each data memory control device 4 itself makes the trouble occurrence detection signal active when it is judged that it cannot operate correctly, and a scheme in which the writing from the data memory control device 4 to the buffer memory device 8 is monitored and whenever there is no writing since the previous reading or over a certain period of time it is judged that the trouble has occurred so that the trouble occurrence detection signal is made active.

In the configuration of FIG. 26, in a case where all the trouble occurrence detection signals E1, E2, E3 and E4 are not active, the output data from the two port memories are given as they are (that is, in an order of B1 to B3 by omitting B4 which is the parity) to the communication control device 6-j just as in a case of FIG. 25. However, in a case where the trouble occurrence detection signal corresponding to one two port memory to be read ($M_{i,j}$, for example) is active, the exclusive OR of the data of all the other two port memories ($M_{2,j}, M_{3,j}$ and $M_{4,j}$, for example) are given to the communication control device 6-j as the data of the two port memory to be read. In other words, at this stage, the incorrect data is recovered by using the parity.

Note that this simple parity can cope only with a case in which one trouble has occurred at one time, but it should be apparent that, by using the coding scheme having a higher level error correction capability, it is also possible to cope even with a case in which a plurality of errors are present simultaneously.

Next, an exemplary configuration in which VRAM is used for the buffer memory device will be described with references to FIG. 27 and FIG. 28.

Figure 27:
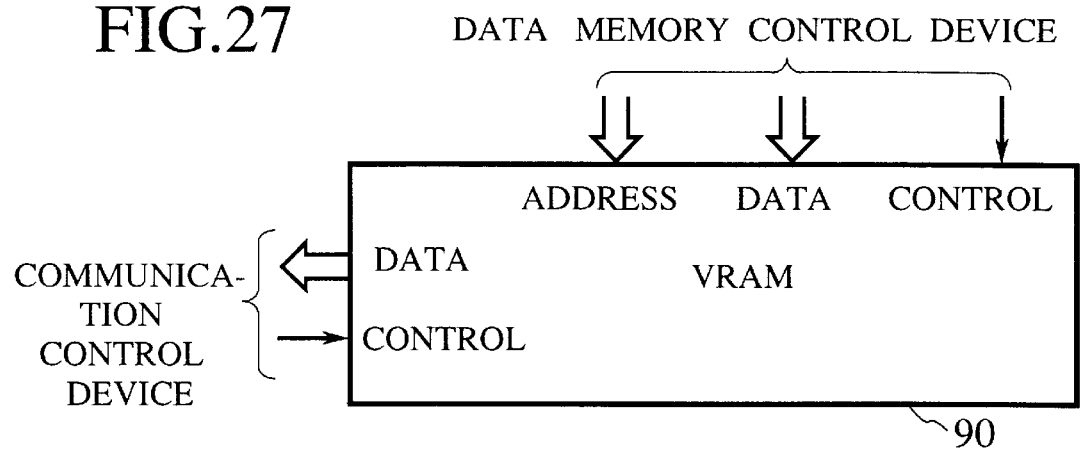
FIG. 27 is a schematic diagram of a VRAM that can be used for a buffer memory device in the continuous data server apparatus of the first embodiment.

Namely, for the buffer memory device to be used in the continuous data server apparatus of this first embodiment, it is also possible to use a memory element called VRAM as shown in FIG. 27. This VRAM 90 is a two port memory having a parallel write port and a serial read port. There is also a type of VRAM in which the reading can also be made by the parallel port. As shown in FIG. 27, this VRAM 90 is used in such a manner that the parallel port is used for the writing from the data memory control device 4 and the serial port is used for the reading from the communication control device 6.

Figure 28:
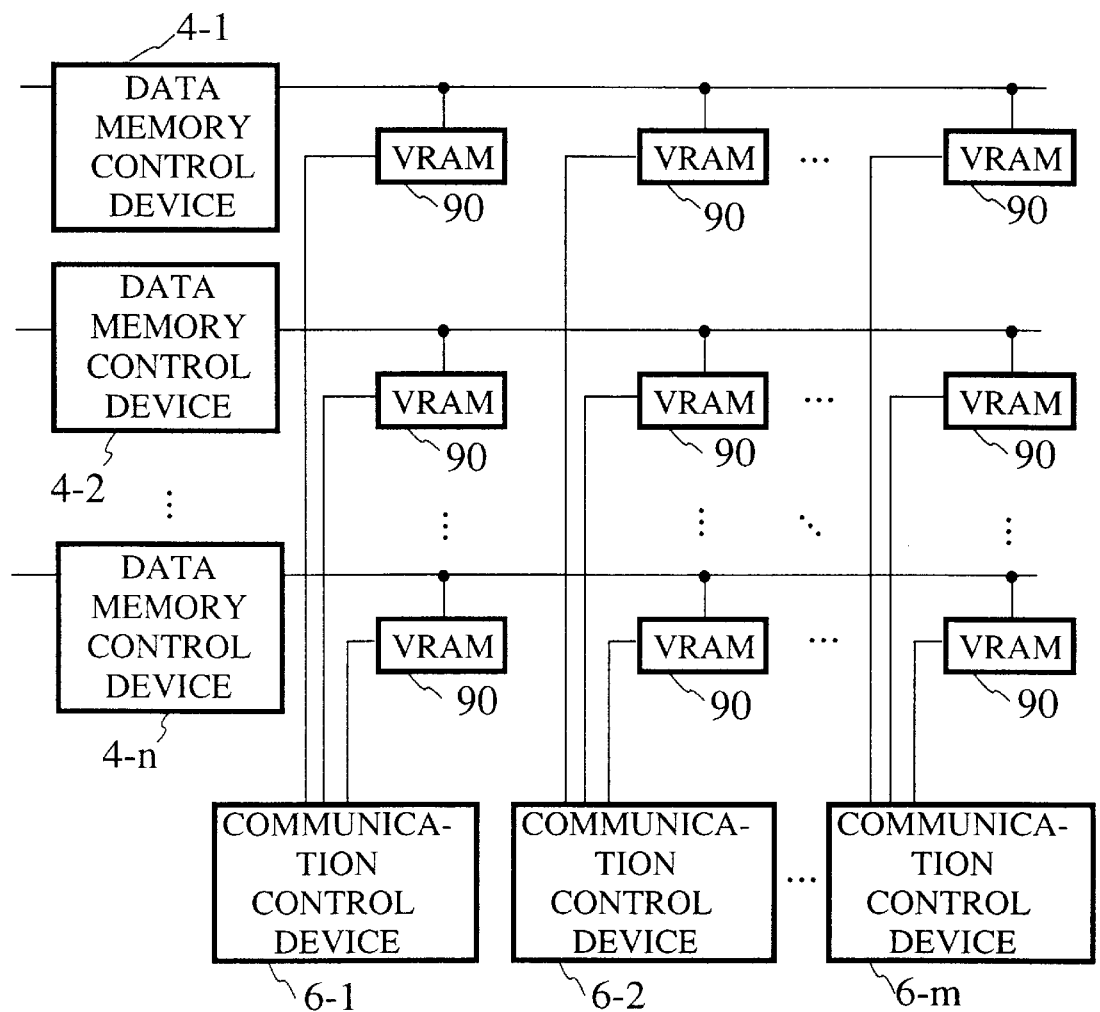
FIG. 28 is a partial block diagram of the continuous data server apparatus of FIG. 5 showing an exemplary configuration in a case of using the VRAM of FIG. 27.

The serial output from each VRAM 90 is connected to the communication control device 6 as shown in FIG. 28, and the communication control device 6 is made to selectively transfer the data from the necessary VRAM 90. In this manner, it is possible to construct the continuous data server apparatus similar to that using the two port memory for the buffer memory device as described above.

Next, an exemplary configuration in which the continuous data server apparatus of this first embodiment is realized using a plurality of existing computers will be described with reference to FIG. 29.

Figure 29:
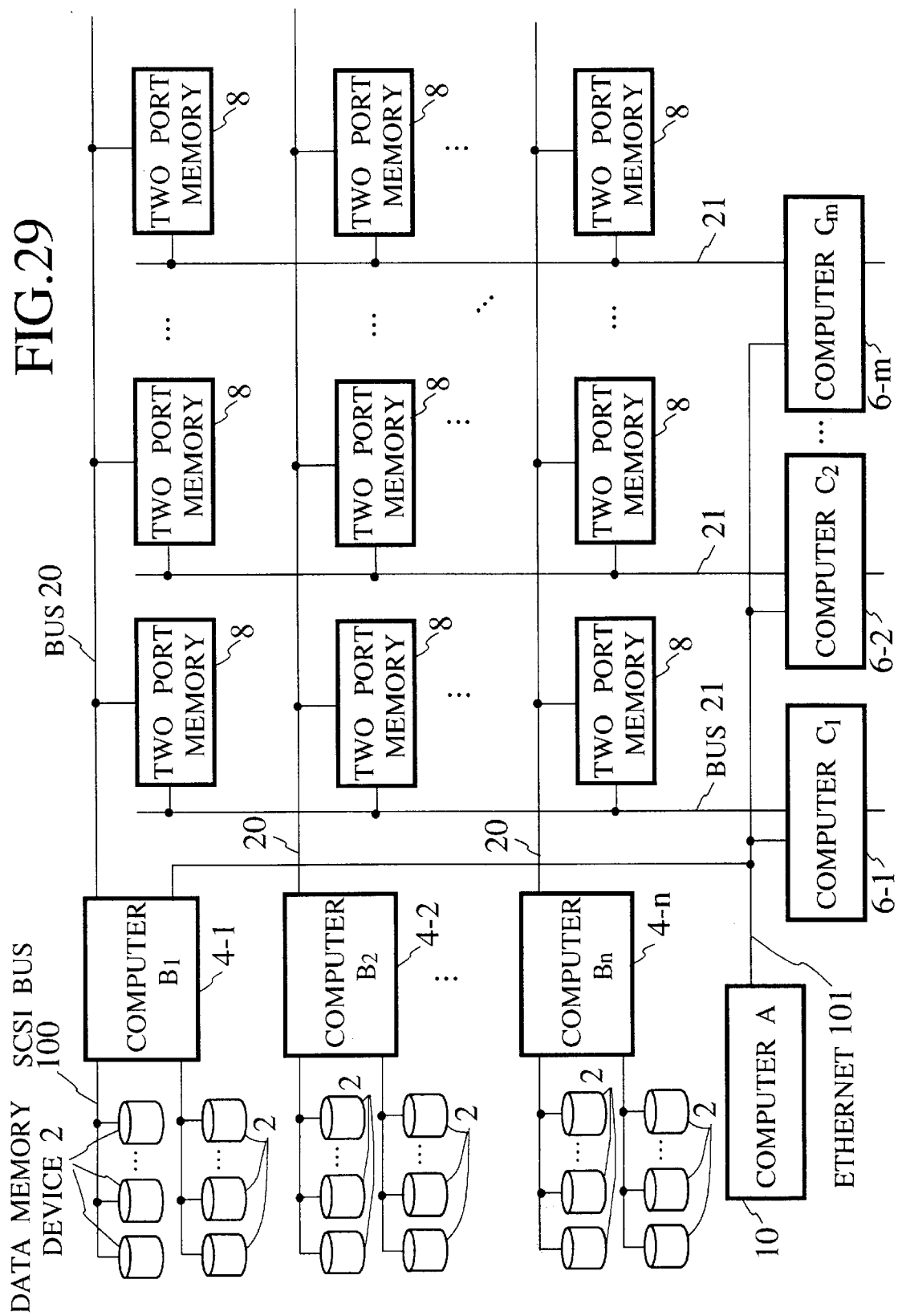
FIG. 29 is a partial block diagram of the continuous data server apparatus of FIG. 5 showing an exemplary configuration in a case of using a plurality of existing computers.

In this exemplary configuration of FIG. 29, a computer A functions as the central control device 10, computers B1, B2, . . . , Bn function as the data memory control devices 4-1 to 4-n, magnetic disks connected to the computers B1, B2, . . . , Bn by the interfaces such as SCSI buses 100 function as the data memory devices 2, computers C1, C2, . . . , Cm function as the communication control devices 6-1 to 6-n, and the transfer of the continuous data is realized by the ATM interfaces provided at the computers C1, C2, . . . , Cm.

For the buffer memory devices 8, the two port memories are used, and each two port memory is placed on the buses 20 and 21 of the corresponding computer Bi and computer Cj. The computer A which functions as the central control device 10 commands the operations to the computers B1, B2, . . . , Bn, C1, C2, . . . , Cm by a bus 101 such as the Ethernet.

The first embodiment described above is effective in a case where the continuous data are stored in a plurality of data memory devices 2 by applying the striping or the RAID in addition, but this first embodiment is also effective even in a case where the striping is not applied because it is possible to increase the data transfer capability of the data path from the data memory control devices 4 reaching to the communication control devices 6.

Note in particular that, in a case of using VRAM for the buffer memory devices 8, it suffices to connect the serial output from each VRAM to the communication control device 6 as shown in FIG. 28 described above, and make the communication control device 6 to selectively transfer the data from the necessary VRAM.

Note also that, by making both the data memory control device 4 and the communication control device 6 to be readable as well as writable with respect to the buffer memory device 8, the data arrived from the network can be received by the communication control device 6 and written into the buffer memory device 2, and then these data can be read out by the data memory control device 4 and written into the data memory device 2.

Referring now to FIG. 30 to FIG. 37, the second embodiment of the data server system realizing the data transfer scheme according to the present invention will be described in detail. In this second embodiment, data to be handled by the data server system are not necessarily limited to the continuous data.

This second embodiment concerns with a case using the RAID for the purpose of dealing with an error occurring at the disk device in the system in which the data are stored distributedly in prescribed units such as block units over a plurality of disk devices and the data are read out from the disk devices in the prescribed units whenever necessary.

As already mentioned above, the RAID technique is a known technique for correcting an error of the disk device (see "A Case for Redundant Arrays of Inexpensive Disks (RAID)", David A. Patterson, Garth Gibson, and Randy H. Katz, ACM SIGMOD, December 1988, vol. 17, No. 3, pp. 109–116, for example). The RAID is a technique for arranging redundant code encoded data distributedly over a plurality of disk devices so as to recover the original data in a case of a malfunction of the disk device. The original data can be recovered using the encoded data, by taking the exclusive OR or exclusive AND of the contents of the respective disks.

As a method for taking the exclusive OR for the purpose of implementing the RAID, there are (1) a method for taking the exclusive OR using a processor, and (2) a method for obtaining a correct solution at a high speed when an error or a malfunction is detected, by entering data from the disks in parallel into the exclusive OR circuit.

This second embodiment employs the dedicated hardware structure for realizing the RAID, which does not interfere with the works of the executing processor unlike the above method (1), and which does not cause any concentration of wirings or complication of the circuitry unlike the above method (2). This second embodiment realizes an apparatus for carrying out the correction with respect to the malfunction of the disk at a high speed by means of a compact hardware structure.

In the following, an exemplary case of using the exclusive OR as the parity will be described, but it should be apparent that a case of using the exclusive AND as the parity can also be realized easily in the same manner.

According to this second embodiment, the data to be stored is divided into n groups, when (n+1) connection ports for the disk devices are to be used in applying the RAID to a certain data. This number (n+1) corresponds to a number of data memory control devices 4 in the configuration of FIG. 5 or FIG. 6, or disk control units 104 in the configuration of FIG. 30, which is four in FIG. 6 as described above and five in FIG. 30 as will be described below. At a time of this grouping, the data is divided into blocks of a fixed data length each.

Then, the blocks to be read out simultaneously from n groups are taken out, one block from each group, and a set of blocks is formed. Next, a result of taking the exclusive OR of n blocks of the same set is added to form a set of (n+1) blocks. Then, these (n+1) blocks are stored in respective ones of (n+1) sets of disk devices connected to the (n+1) connection ports to form a RAID group.

The connection ports to which the (n+1) sets of disk devices are connected are in correspondence with the buffer memories, and a dedicated hardware provided in a form of a calculation unit is connected between the corresponding connection port and buffer memory, while (n+1) sets of the calculation units are connected in series.

Here, when a malfunction or error is detected in some disk device, the data entered from this disk device through the connection port and stored in the corresponding buffer memory can be considered as containing an error. Consequently, in a case of reading the buffer memory corresponding to that disk device, the content of that buffer memory can be considered as incorrect, and therefore the corresponding calculation unit outputs an output of the previous stage calculation unit as it is instead of reading out the data from that buffer memory, and each remaining calculation unit outputs the exclusive OR of the output of the previous stage calculation unit and the value read out from the respectively corresponding buffer memory. The contents of the respective buffer memories are forming a RAID group, so that the exclusive OR of the contents of these buffer memories other than the buffer memory corresponding to the detected malfunction or error, which is calculated by the calculation units, will be outputted as the correct value.

In a case of reading the buffer memory corresponding to the normal disk device without a malfunction or error, the corresponding calculation unit reads out the data from that buffer memory and hand it over to the next stage, and each remaining calculation units outputs the output of the previous stage calculation unit as it is. In this manner, when the data corresponding to the malfunction or error is not entered from the connection port connected to the disk device, the value read out from the desired buffer memory can be outputted.

As described above, when there is an error in the data, the correct data will be outputted by means of the calculation unit, and when there is no error in the data, the correct data will be obtained by bypassing the calculation unit.

In the following, this second embodiment of the data server system will be described in further detail.

Figure 30:
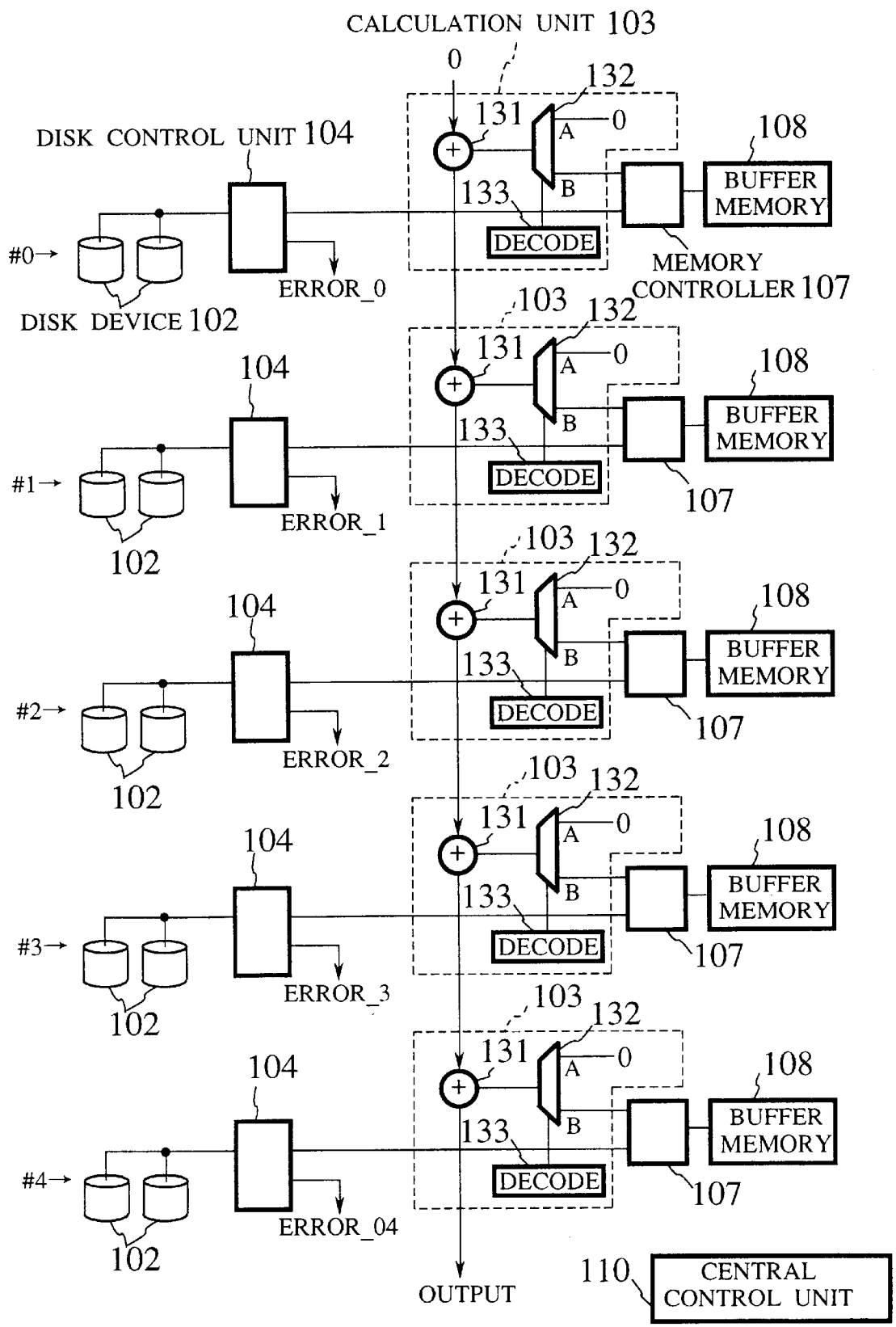
FIG. 30 is a block diagram of the second embodiment of a data server system according to the present invention.
Figure 31:
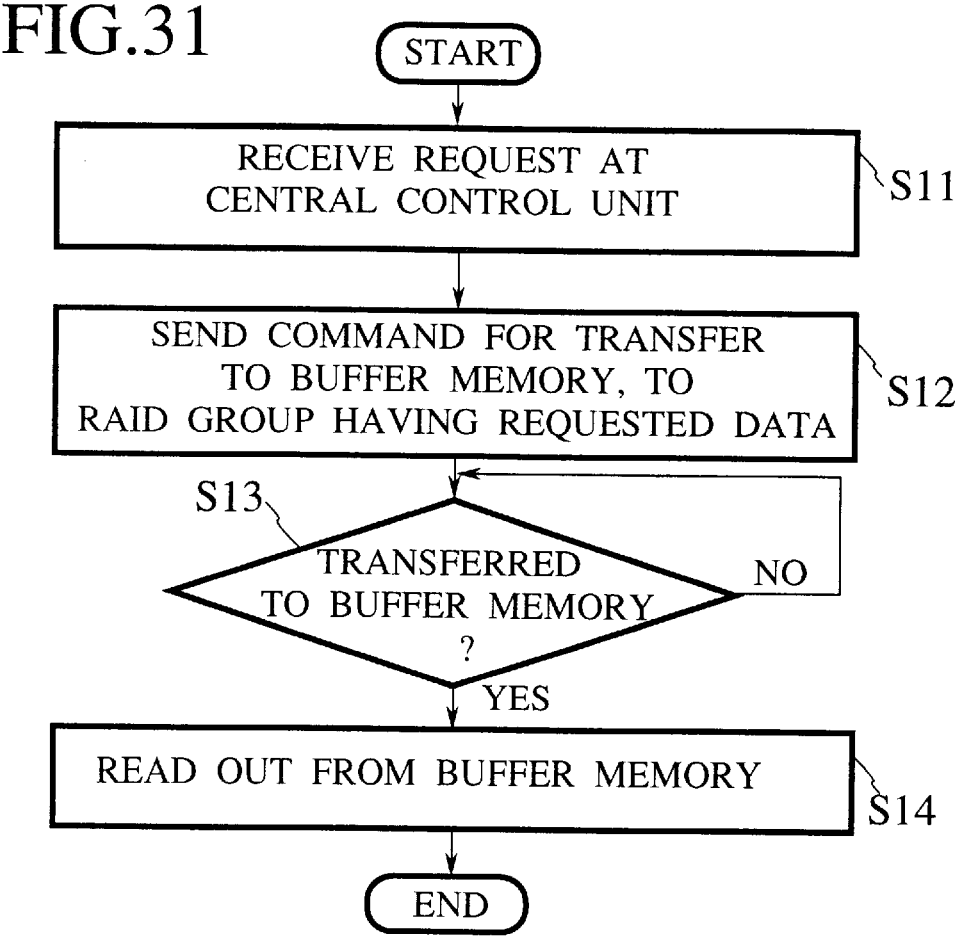
FIG. 31 is a flow chart for the operation of a central control unit in the data server system of FIG. 30.

In this second embodiment, the system has an overall configuration as shown in FIG. 30, and a central control unit 110 in this configuration of FIG. 30 which controls the system as a whole operates according to the flow chart of FIG. 31.

This system of FIG. 30 comprises: disk devices 102 for storing the data which form RAID groups; a plurality of disk control units 104 for reading out the desired data from the disk devices 102; a plurality of buffer memories 108, provided in correspondence to the disk control units 104, for holding the data read out by the respective disk control units 104; a memory controller 107 for each buffer memory 108; a calculation unit 103 connected between each disk control unit 104 and each set of the memory controller 107 and the buffer memory 108; and a central control unit 110 for controlling the system as a whole. The calculation units 103 themselves are connected in series, and each calculation unit 103 comprises an exclusive OR calculation circuit 131, a multiplexer 132, and a decode unit 133.

Note that the disk devices 102 may not necessarily be integral components of the data server system, and can be supplemented by the user according to the need.

This FIG. 30 shows a system having one parity disk with respect to four disks, but a ratio of the parity to the number of disks can be set freely, so that various other configurations are possible, such as a configuration having one parity with respect to eight disks, for example.

To the connection port of the disk control unit 104, it is possible to connect a plurality of disk devices 102. For example, when the SCSI is used as the disk interface, it is possible to connect up to seven devices to a single SCSI. In addition, it is also possible to connect more numerous disk devices 102 by connecting a plurality of SCSIs to the disk control unit 104.

The memory controller 107 stores the data from the calculation unit 103 into a specified address of the buffer memory 108, and gives the data read out from a specified address of the buffer memory 108 to the calculation unit 103.

The disk control unit 104 transfers the data to the buffer memory 108 via the memory controller 107.

The central control unit 110 sends a command to the disk control unit 104 connected with the disk device 102 in which the requested data is present, while sending commands to the corresponding disk control units 104 in order to read out data forming the RAID group from the disk devices 102 which store the data to form the RAID group.

In addition, the central control unit 110 awaits until all the data to form the RAID group are set ready in the buffer memories 108 and starts the operation to read from the buffer memories 108 when all the data to form the RAID group are ready.

At a time of reading from the buffer memories 108, the central control unit 110 turns DECODE_X signals active one by one in synchronization with the read timings of the buffer memories 108 corresponding to the connection ports connected with the respective disk devices 102 which store the necessary data, according to the request.

The disk control unit 104 controls the disk device 102 according to the command issued from the central control unit 110, and when a malfunction or error of the disk device 102 is detected, notifies an ERROR_X signal to the central control unit 110.

Here, it is also possible to construct the system in such a way that, when the reading response from the disk device 102 is not finished within a prescribed period of time, it is regarded as an error of the disk device 102 and the ERROR_X signal is sent to the central control unit 110 similarly, so that the content of the disk device 102 which did not finish reading within the prescribed period of time can be recovered from the data of the other disks.

It is also possible to construct the system in such a way that, when the disk control unit 104 detects its own malfunction, it is regarded as an error of the disk device 102 and the ERROR_X signal is notified to the central control unit 110 similarly.

The ERROR_X signal is provided separately with respect to each disk control unit 104 (ERROR_0 to ERROR_4 in FIG. 30), so that it is possible to identify a connection port for the disk at which a malfunction or error has occurred.

Figure 32:
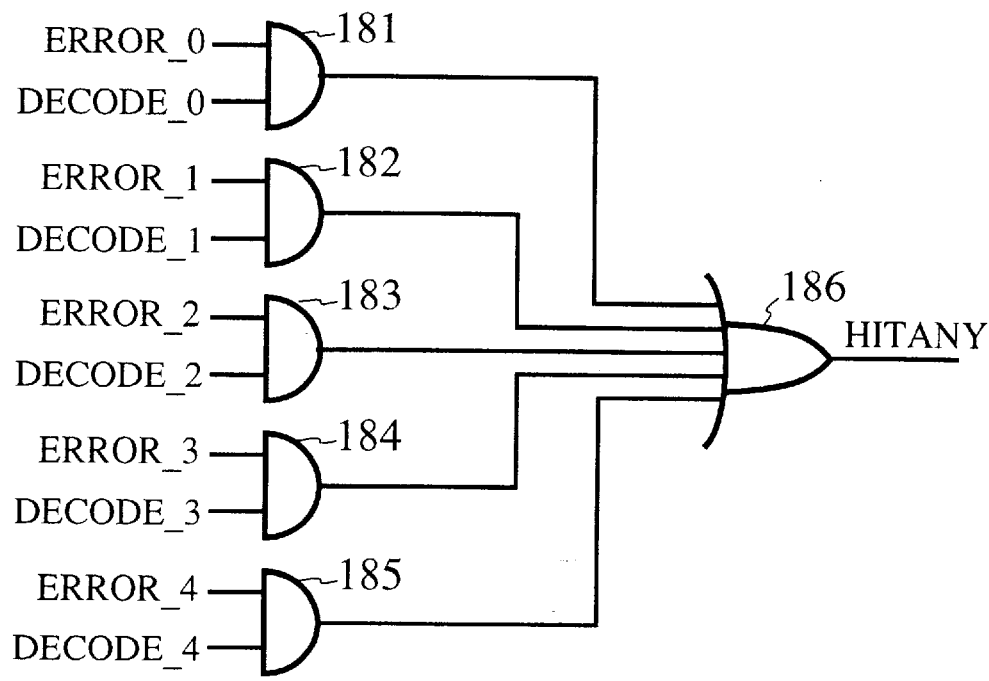
FIG. 32 is a diagram of a circuit for generating a HITANY signal in the data server system of FIG. 30.

FIG. 32 shows a circuit for generating a HITANY signal from the ERROR_X signals and DECODE_X signals. As shown in FIG. 32, this circuit comprises AND circuits 181 to 185, each of which has the corresponding ERROR_X signal and DECODE_X signal as its inputs, and an OR circuit 186 which has outputs of all the AND circuits 181 to 185 as its inputs.

The HITANY signal is a signal which is turned active whenever the buffer memory 108 with data containing an error is accessed, and which indicates a need for the recovery of the data by the RAID.

Figures 33, 34:
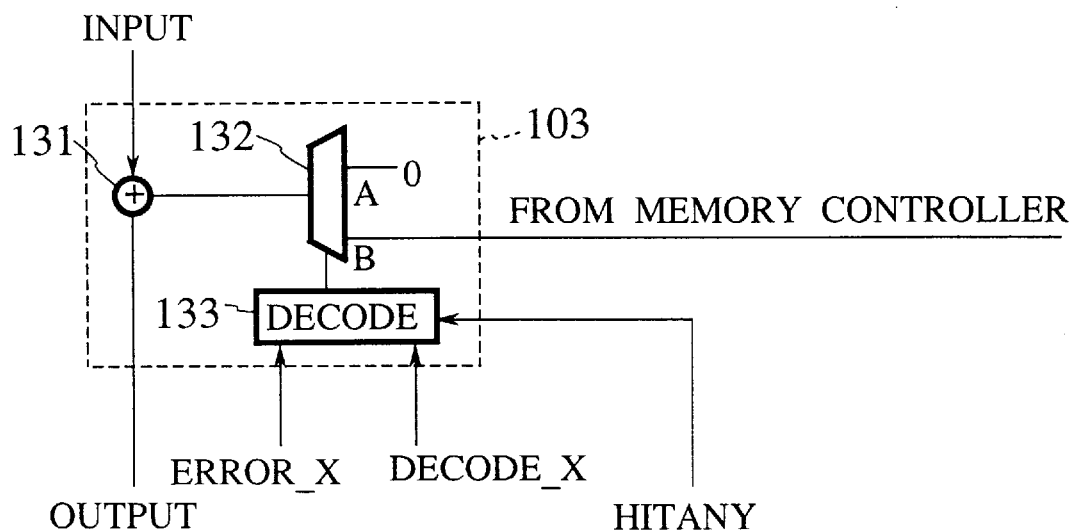
FIG. 33 is a block diagram of an internal configuration of a calculation unit in the data server system of FIG. 30.
FIG. 34 is a table of logic used by a decode unit in the data server system of FIG. 30.

The calculation unit 103 has a detailed configuration as shown in FIG. 33.

The exclusive OR calculation circuit 131 is given with an output from the series connected previous stage calculation unit 103 and an output from the multiplexer 132.

An A input of the multiplexer 132 is given a value 0, while another B input of the multiplexer 132 is given an output of the buffer memory 108 via the memory controller 107, and an output of the multiplexer 132 is switched between the A and B inputs according to a control signal supplied from the decode unit 133.

When the output is switched to the A input, the data from the previous stage calculation unit 103 will be given to the next stage as it is. On the other hand, when the output is switched to the B input, a calculation result of the exclusive OR of the data from the previous stage calculation unit 103 and the data read out from the buffer memory 108 will be given to the next stage.

The decode unit 133 is a circuit for generating a control signal to switch the output of the multiplexer 132 according to values of the ERROR_X, DECODE_X, and HITANY signals, which operates according to the logic shown in FIG. 34.

A case (1) of FIG. 34 is a case in which the data should be read out from the corresponding buffer memory 108, and a malfunction or error in the corresponding disk device 102 is detected, in which case the output of the multiplexer 132 is switched to the A input.

A case (2) of FIG. 34 is a case in which the data are to be read out from another buffer memory 108 not corresponding to it, and no malfunction or error is detected in the disk device 102 corresponding to itself as well as in the disk device 102 corresponding to that another buffer memory 108, in which case the output of the multiplexer 132 is switched to the A input.

A case (3) of FIG. 34 is a case in which the data are to be read out from another buffer memory 108 not corresponding to it, and no malfunction or error is detected in the disk device 102 corresponding to itself but a malfunction or error is detected in the disk device 102 corresponding to that another buffer memory 108, in which case the output of the multiplexer 132 is switched to the B input.

A case (4) of FIG. 34 is a case in which the data should be read out from the corresponding buffer memory 108, and no malfunction or error is detected in the corresponding disk device 102, in which case the output of the multiplexer 132 is switched to the B input.

A case (5) of FIG. 34 is a case in which the data are to be read out from another buffer memory 108 not corresponding to it, and a malfunction or error is detected in the disk device 102 corresponding to itself but no malfunction or error is detected in the disk device 102 corresponding to that another buffer memory 108, in which case the output of the multiplexer 132 is switched to the A input.

As shown in FIG. 30, the first stage calculation unit 103 in the series connection has an input value fixed to 0. On the other hand, the last stage calculation unit 103 in the series connection becomes an output terminal for outputting either the data read out from the corresponding buffer memory 108 or the data recovered by the RAID.

In the above described configuration, the central control unit 110 operates according to the flow chart of FIG. 31 as follows.

When the data read out request is received from the external (step S11), a transfer command to transfer the data to the buffer memory 108 is sent to each disk control unit 104 connected with each disk device 102 in which the data of the RAID group for the requested data is present (step S12). The disk control unit 104 which received the transfer command reads out the data to form the RAID group for the requested data from the disk device 102, and stores it in the corresponding buffer memory 108.

When the data transfer to the buffer memory 108 is completed (step S13 YES), the data reading from the buffer memory 108 is carried out (step S14).

Hereafter, the data reading from the buffer memory 108 at the step S14 will be described in further detail. Here, it is assumed that #0 to #3 levels in FIG. 30 are for the original data and #4 level is for the parity.

The central control unit 110 controls the data reading from the buffer memories 108 in an order, starting from the buffer memory 108 of #0, and moving on to #1, #2 and #3 in this order, for example.

In the data reading from each buffer memory 108, the multiplexer 132 of each calculation unit 103 is switched by the command from the central control unit 110, and the calculation result at each calculation unit 103 is sequentially given to the next stage, such that the final result is outputted from the last stage.

For example, a case of the data reading from the buffer memory 108 of #0 level will be considered. In this case, the DECODE_0 signal is set to 1, and the other DECODE_X signals are set to 0. Here, the central control unit 110 is monitoring the ERROR_X signal sent from each disk control unit 104, and this information is utilized in switching the operation in each calculation unit 103.

In a case where no malfunction or error is detected in the disk device 102 of #0 level, the ERROR_0 signal is going to be 0 so that the HITANY signal also becomes 0.

Consequently, the inputs into the decode unit 133 in the calculation unit 103 of #0 level are going to be the ERROR_0 signal=0, the HITANY signal=0, and the DECODE_0 signal=1, so that this calculation unit 103 of #0 level operates as in the case (4) described above, and outputs the exclusive OR of 0 and the data from the buffer memory 108, i.e., the data from the buffer memory 108 as it is.

On the other hand, the inputs into the decode unit 133 in each calculation unit 103 of the other levels are going to be ERROR_X signal=0, the HITANY signal=0, and the DECODE_X signal=0, so that each calculation unit 103 operates as in the case (2) described above, and passes its input as it is.

In this manner, the data from the buffer memory 108 of #0 level will be outputted in this case.

In contrast, in a case where a malfunction or error is detected in the disk device 102 of #0 level, the ERROR_0 signal is going to be 1 so that the HITANY signal also becomes 1.

Consequently, the inputs into the decode unit 133 in the calculation unit 103 of #0 level are going to be the ERROR_0 signal=1, the HITANY signal=1, and the DECODE_0 signal=1, so that this calculation unit 103 of #0 level operates as in the case (1) described above, and outputs the fixed value 0.

On the other hand, the inputs into the decode unit 133 in each calculation unit 103 of the other levels are going to be ERROR_X signal=0, the HITANY signal=1, and the DECODE_X signal=0, so that each calculation unit 103 operates as in the case (3) described above, and outputs the exclusive OR of the input from the previous stage and the data from the corresponding buffer memory 108, to the next stage.

As a result, the exclusive OR of the data from the buffer memories 108 of #1 to #4 levels will be obtained, and this value will be outputted as the correct data for #0 level.

In the above manner, the data of #0 level to #3 level are read out one by one.

Here, the calculation of the exclusive OR is used, but in a case of using the calculation of the exclusive AND (i.e., a negation of the exclusive OR), the fixed value 1 should be entered into the first stage calculation unit 103 and the A input of the multiplexer 132 of each calculation unit 103, instead of the fixed value 0 in the above description.

In the above description, the calculation unit 103 is described as that of the combinatorial logic, but by arranging pipeline registers between the calculation units 103, the operation at a high speed clock becomes possible for the calculation unit 103.

In the above, a scheme for carrying out the transfer from the disk devices 102 to the buffer memories 108 and the reading from the buffer memories 108 sequentially has been described, but it is also possible for each buffer memory 108 to form the double buffer such that the transfer from the disk device 102 and the reading from the buffer memory 108 can be carried out in parallel.

In addition, in a case where the disk device 102 carries out the retry operation due to a temporal error in the disk reading and the access is not finished within a prescribed period of time, it is also possible for the disk control unit 104 to deal with this case equivalently as a case of the malfunction of the disk device 102 by notifying the active ERROR_X signal to indicate an error in the disk device 102.

Now, as a preferable application of this second embodiment, an exemplary case of using the system of this second embodiment as the server for the multimedia data including the dynamic images will be described with reference to FIG. 35.

As a method for recording the dynamic images as the digital data in the disk devices 102, the method such as the MPEG which stores the dynamic images by compressing them is known. As for the data to be recorded in the disk devices 102, as long as they are recorded in forms of the RAID groups of this second embodiment by means of the striping, the read out data on the buffer memory 108 can be read out without a failure provided that the reproduction of the dynamic images is continuous, so that it will be wasteless as far as the disk reading is concerned.

Hereafter, the reproduction of the striped multimedia data will be described with reference to FIG. 35.

Figure 35:
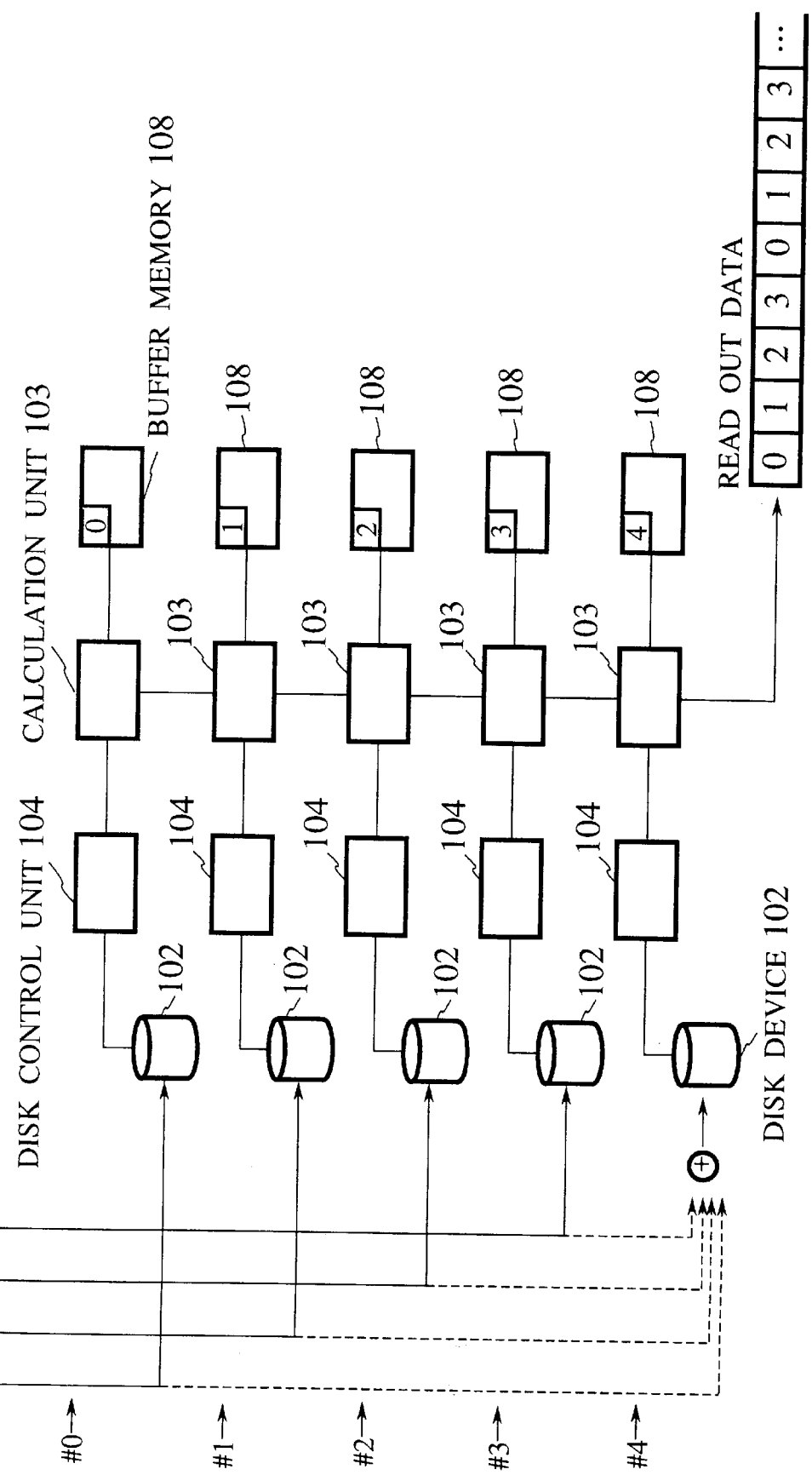
FIG. 35 is a schematic block diagram of the data server system of the second embodiment in an application to the multimedia data server.

Assuming that the original data in FIG. 35 are the video streams of MPEG, these data are divided in units of blocks for reading from the disk devices 102, such as 128 KB units, and the RAID group is formed. In this example, they are divided into four and the RAID group is formed by them. To these blocks, the respective numbers 0 to 3 for a group in a case of division into four are set in correspondence.

In order to form the RAID group, the parity block is produced by taking the exclusive OR of the blocks 0 to 3, and set as the block 4.

When the data are transferred from the disk devices 102 to the buffer memories 108, the data of block 0 is entered into the buffer memory of #0, the data of block 1 is entered into the buffer memory of #1, the data of block 2 is entered into the buffer memory of #2, the data of block 3 is entered into the buffer memory of #3, and the parity data is entered into the buffer memory of #4.

When these data are read out starting from the buffer memory of #0, the calculation units 103 operate as described above, and the read out data will be reproduced as a stream in which the data of blocks 0, 1, 2 and 3 are arranged in this order as shown in FIG. 35.

Next, as another preferable application of this second embodiment, an exemplary case of using the system of this second embodiment as the database server using disks will be described with reference to FIG. 36. Here, a disk array control device 120 shown in FIG. 36 corresponds to a configuration of FIG. 30 with the disk devices 102 omitted.

Figure 36:
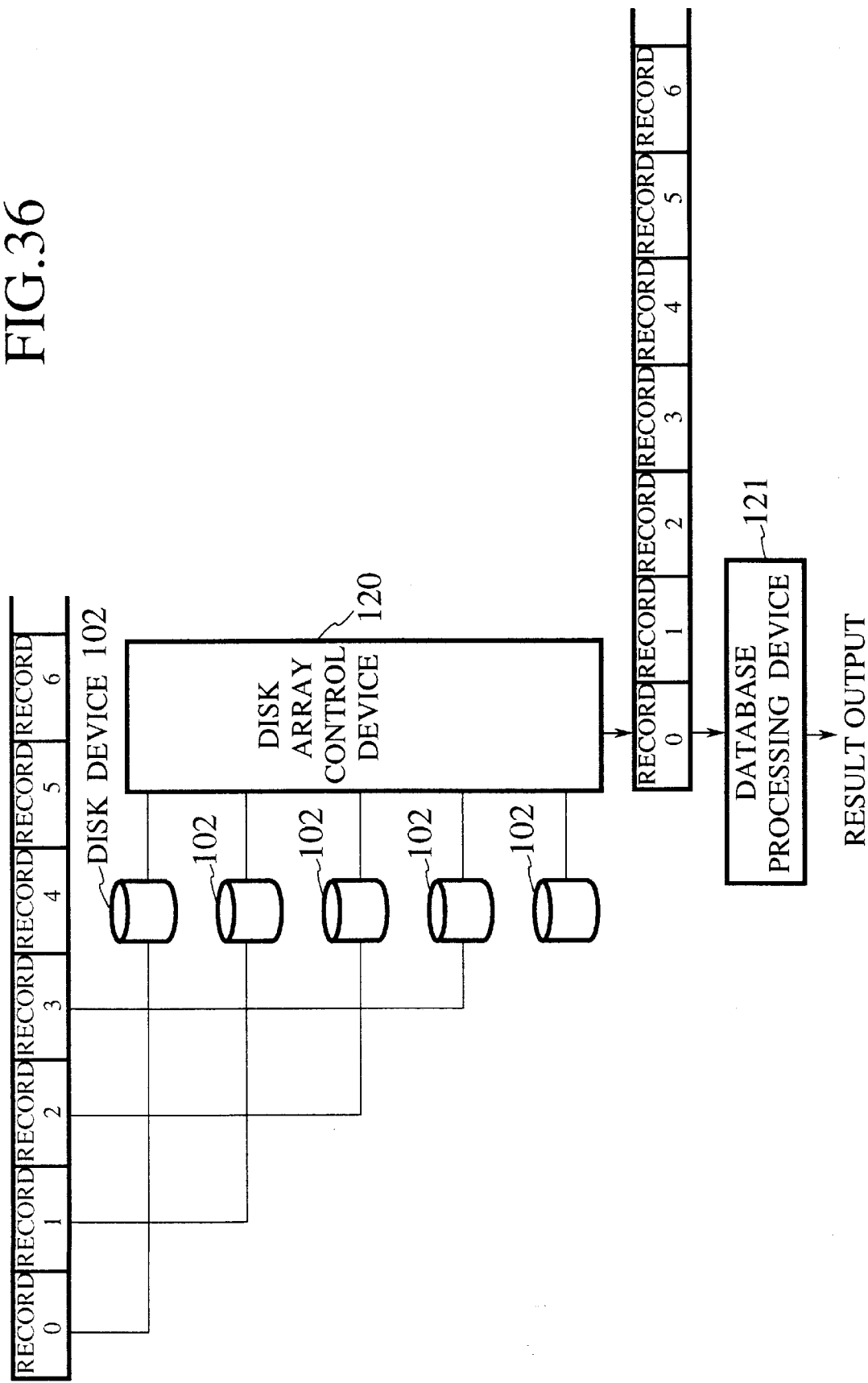
FIG. 36 is a schematic block diagram of the data server system of the second embodiment in an application to the database server.
Figure 37:
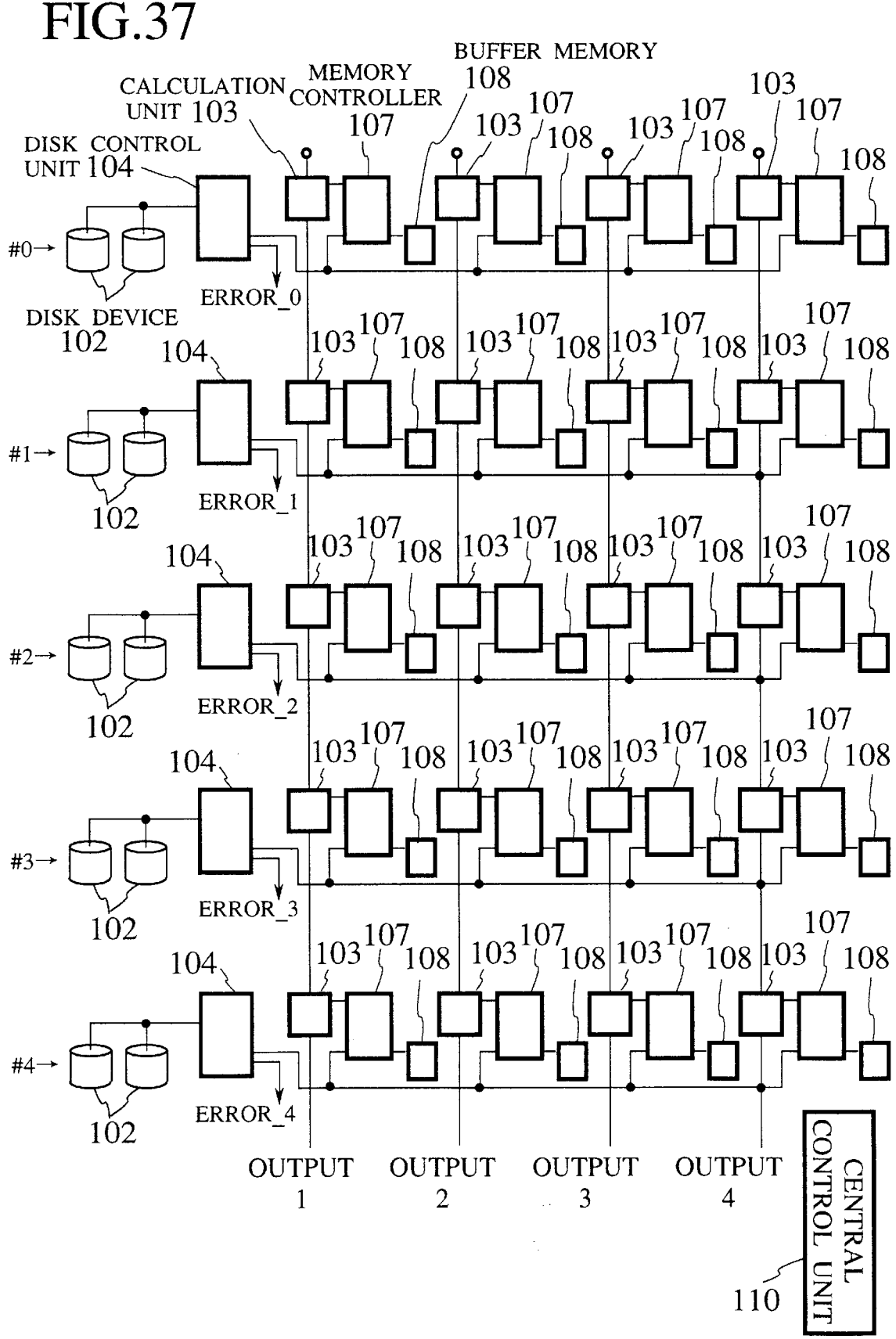
FIG. 37 is a schematic block diagram of the data server system of the second embodiment which is adapted to the first embodiment.

As shown in FIG. 36, one database is distributedly arranged over the disks by dividing it in units of records. In general, the transfer speed of the disk is slower than the processing speed of the CPU, so that in a case of reading the disk devices 102 by the disk array control device 120, it is more effective to read the data in parallel as it becomes possible to make a faster access to the database.

By providing a database processing device 121 for carrying out the database processing at an output of the disk array control device 120, it will be possible to carry out the database processing such as the search and the selection.

As described, according to this second embodiment, it is possible to realize the apparatus for correcting a malfunction of the disk by means of a compact hardware structure. In addition, the high speed processing is possible because of the use of the hardware processing.

It is noted that this second embodiment is applicable to the first embodiment described above. In a case of applying this second embodiment to the system of FIG. 5, the disk devices 102 of FIG. 30 correspond to the data memory devices 2 of FIG. 5, the disk control units 104 of FIG. 30 correspond to the data memory control devices 4 of FIG. 5, and the central control unit 110 of FIG. 30 corresponds to the central control device 10 of FIG. 5. In addition, the buffer memories 108 of FIG. 30 correspond to the buffer memory devices 8 connected to one communication control device 6 in FIG. 5. The calculation unit 103 is to be connected between the data memory control device 4 and one or more of the buffer memory devices 8 corresponding to that data memory control device 4. An exemplary configuration in which this second embodiment is adapted to the first embodiment described above in this manner is shown in FIG. 37.

It is also noted that, in a case of applying this second embodiment to the system of FIG. 15 or FIG. 16, the calculation unit 103 is to be connected between a group of the data memory control units 4 which share the same bus 20 and one or more buffer memory devices 8 corresponding to this group of the data memory control units 4.

Referring now to FIG. 38 to FIG. 50, the third embodiment of the data server system realizing the data transfer scheme according to the present invention will be described in detail. In this third embodiment, data to be handled by the data server system are not necessarily limited to the continuous data.

This third embodiment also concerns with a case using the RAID, and realizes an apparatus for carrying out the generation of the parity to be written into the disk and the generation of the information necessary in recovering the malfunctioned disk at a high speed by means of a compact hardware structure. It should be noted that this third embodiment incorporates within itself the same operations and effects of the second embodiment described above.

Here, again, an exemplary case of using the exclusive OR as the parity will be described, but it should be apparent that a case of using the exclusive AND as the parity can also be realized easily in the same manner.

According to this third embodiment, the data to be stored is divided into n groups, when (n+1) connection ports for the disk devices are to be used in applying the RAID to a certain data. This number (n+1) corresponds to a number of data memory control devices 4 in the configuration of FIG. 5 or FIG. 6, or disk control units 204 in the configuration of FIG. 38, which is four in FIG. 6 as described above and five in FIG. 38 as will be described below. At a time of this grouping, the data is divided into blocks of a fixed data length each.

Then, the blocks to be read out simultaneously from n groups are taken out, one block from each group, and a set of blocks is formed.

Here, as will be described in detail later, the exclusive OR of n blocks of the same set will be taken by the operation of the dedicated hardware according to this third embodiment. The result of taking this exclusive OR is added as a new block to form a set of (n+1) blocks. Then, these (n+1) blocks are stored in respective ones of (n+1) sets of disk devices connected to the (n+1) connection ports to form a RAID group.

The connection ports to which the (n+1) sets of disk devices are connected are in correspondence with the buffer memories, and a dedicated hardware provided in a form of a calculation unit is connected between the corresponding connection port and buffer memory, while (n+1) sets of the calculation units are connected in series.

Each calculation unit to be connected in series has the following functions for the purposes of the parity generation, the data reading, and the data recovery using the parity.

(1) A function for writing the data from the series connected neighbor calculation unit into the buffer memory while taking the exclusive OR.

(2) A function for writing the data from the lower stage into the buffer memory while sending it to the upper stage.

(3) A function for sending the data read out from the buffer memory and the data of the upper stage calculation unit to the lower stage calculation unit while taking the exclusive OR of them.

(4) A function for sending the data read out from the buffer memory and the data of the lower stage calculation unit to the upper stage calculation unit while taking the exclusive OR of them.

(5) A function for sending the data of the upper stage calculation unit to the lower stage by bypassing itself.

(6) A function for sending the data of the lower stage calculation unit to the upper stage by bypassing itself.

(7) A function for writing the data from the connection port for the disk device into the buffer memory.

(8) A function for reading the data from the buffer memory and sending it to the connection port for the disk device.

Each calculation unit is capable of playing any one of these functions according to the need.

At a time of writing the n blocks for data into the disk devices, the first (n−1) blocks for data are written into the respectively corresponding buffer memories in an order from the uppermost stage.

Then, the n-th block for data is written into the lowermost stage. At this point, the calculation unit of each stage from the uppermost stage to the (n−1)-th stage is switched to take the exclusive OR of the data read out from the corresponding buffer memory and the data given from its immediately upper stage and outputs the obtained exclusive OR to its immediately lower stage.

On the other hand, the calculation unit of the lowermost stage is switched to write the n-th block for data into the corresponding buffer memory while sending this n-th block for data to its immediately upper stage, i.e., the n-th stage. The calculation unit of the n-th stage is set to write the exclusive OR of the data from its immediately upper stage and the data from its immediately lower stage into the corresponding buffer memory. In this manner, the parity is generated in the buffer memory of the n-th stage.

Next, the data blocks generated in the (n+1) buffer memories are sent to the disk devices.

When one of the disk devices is malfunctioned, there is a need to exchange this malfunctioned disk device while recovering the data stored in this malfunctioned disk device.

In this third embodiment, the RAID group is formed by the (n+1) data blocks such that the exclusive OR of these (n+1) data blocks becomes 0, so that the content of the data block in the malfunctioned disk device can be recovered from the contents of the other n data blocks.

After the malfunctioned disk device is exchanged, n sets of data which form the RAID group with the data block stored in the malfunctioned disk device are respectively read out from the connection ports other than that connected with the malfunctioned disk device into the corresponding buffer memories.

Then, each calculation at the stage upper to the connection port connected with the malfunctioned disk device is switched to take the exclusive OR of the value read out from the corresponding buffer memory and the output of its immediately upper stage calculation unit and send this exclusive OR to its immediately lower stage, whereas each calculation at the stage lower to the connection port connected with the malfunctioned disk device is switched to take the exclusive OR of the value read out from the corresponding buffer memory and the output of its immediately lower stage calculation unit and send this exclusive OR to its immediately upper stage, while the calculation unit corresponding to the connection port connected with the malfunctioned disk device is switched to take the exclusive OR of the output of its immediately upper stage calculation unit and the output of its immediately lower stage calculation unit and write this exclusive OR into the corresponding buffer memory.

As a result of this operation, the contents of the (n+1) blocks are set such that their exclusive OR becomes 0, so that the block of the malfunctioned disk device can be recovered.

In the following, this third embodiment of the data server system will be described in further detail.

Figure 38:
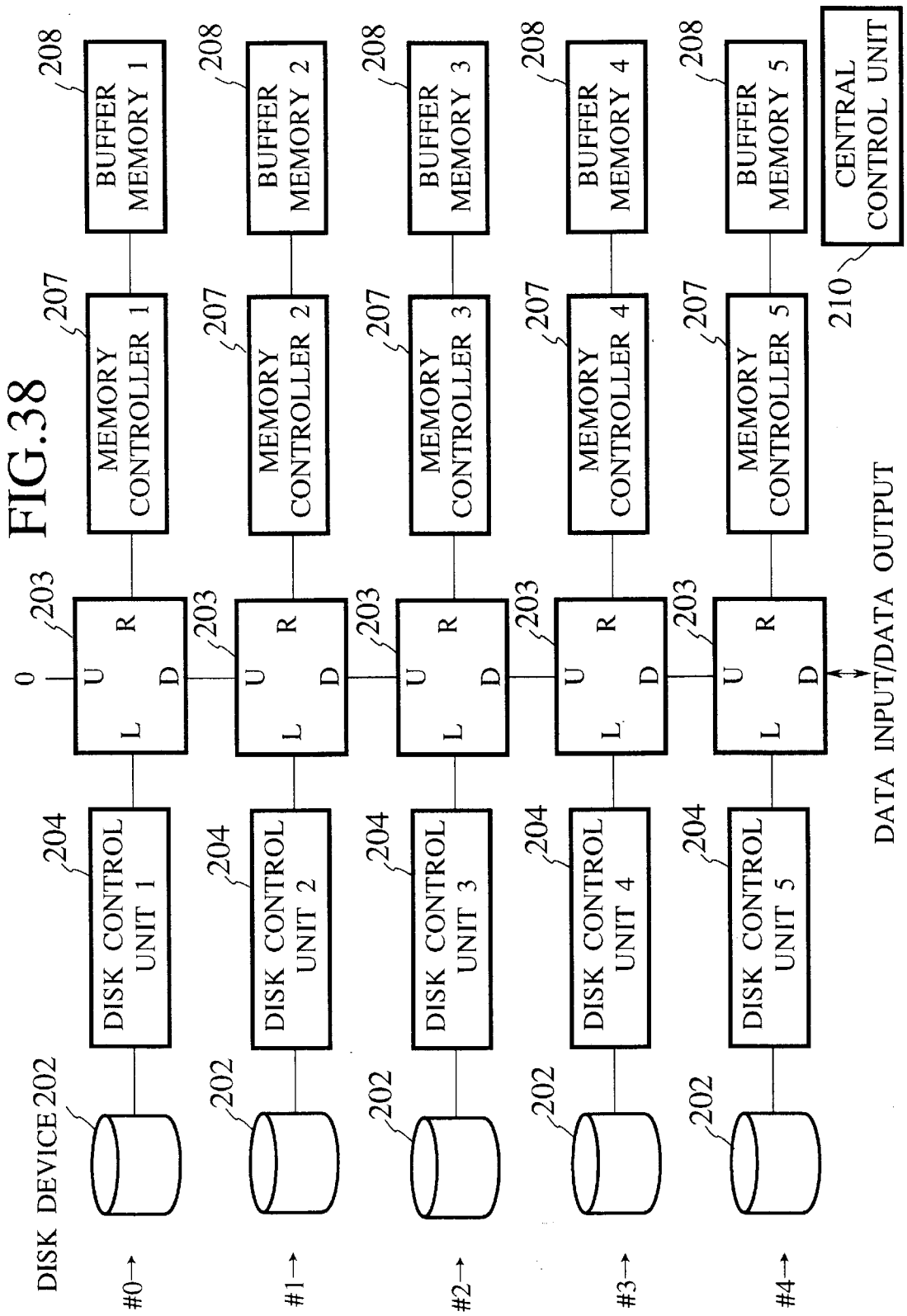
FIG. 38 is a block diagram of the third embodiment of a data server system according to the present invention.

In this third embodiment, the system has an overall configuration as shown in FIG. 38.

This system of FIG. 38 comprises: disk devices 202 for storing the data which form RAID groups; a plurality of disk control units 204 for reading out the desired data from the disk devices 202; a plurality of buffer memories 208, provided in correspondence to the disk control units 204, for holding the data read out by the respective disk control units 204; a memory controller 207 for each buffer memory 208; a calculation unit 203 connected between each disk control unit 204 and each set of the memory controller 207 and the buffer memory 208; and a central control unit 210 for controlling the system as a whole. The calculation units 203 themselves are connected in series.

Note that the disk devices 202 may not necessarily be integral components of the data server system, and can be supplemented by the user according to the need.

This FIG. 38 shows a system having one parity disk with respect to four disks, but a ratio of the parity to the number of disks can be set freely, so that various other configurations are possible, such as a configuration having one parity with respect to eight disks, for example.

To the connection port of the disk control unit 204, it is possible to connect a plurality of disk devices 202. For example, when the SCSI is used as the disk interface, it is possible to connect up to seven devices to a single SCSI. In addition, it is also possible to connect more numerous disk devices 202 by connecting a plurality of SCSIs to the disk control unit 204.

The calculation unit 203 has four terminals including a U terminal, a D terminal, an L terminal, and an R terminal, and connected in series with the upper and lower calculation units 203 by means of the U terminal and the D terminal.

The disk control units 204 is connected with the corresponding calculation unit 203 by means of the L terminal, while the buffer memory 208 is connected with the corresponding calculation unit 203 via the memory controller 207 by means of the R terminal.

The U terminal of the calculation unit 203 at the uppermost stage is fixed to 0, while the D terminal of the calculation unit 203 at the lowermost stage is a data input/data output terminal.

The memory controller 207 stores the data from the calculation unit 203 into a specified address of the buffer memory 208, and gives the data read out from a specified address of the buffer memory 208 to the calculation unit 203.

The disk control unit 204 transfers the data to the buffer memory 208 via the calculation unit 203 and the memory controller 207.

The central control unit 210 receives a data input request, a malfunction signal from the disk, and a signal for indicating a completion of the disk exchange, and carries out the control of the data writing and the data reading with respect to each buffer memory 208, the switching control of the function of each calculation 203, and the output of a command to each disk control unit 204. In addition, in a case of the permanent malfunction of the disk, the central control unit 210 notifies this fact to the external.

Figure 39:
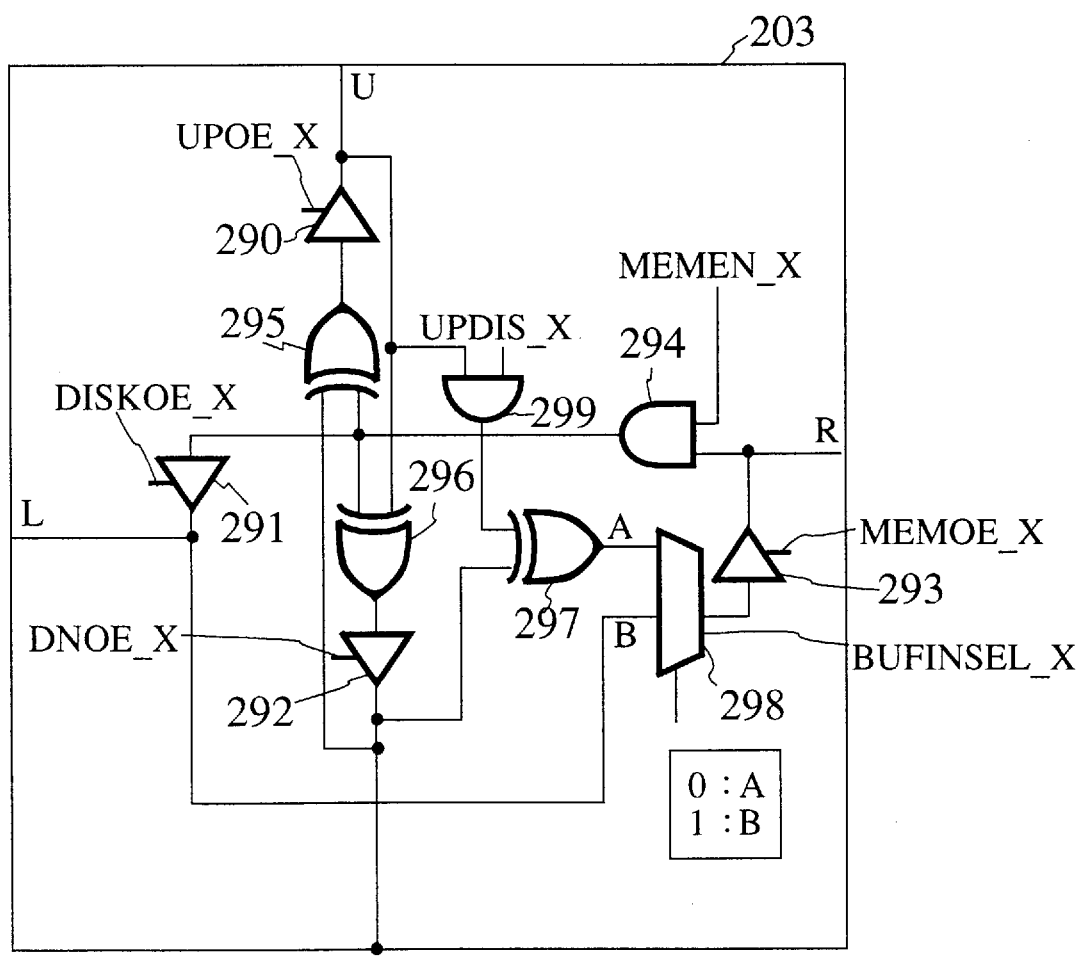
FIG. 39 is a block diagram of an internal configuration of a calculation unit in the data server system of FIG. 38.

FIG. 39 shows an exemplary internal configuration of the calculation unit 203 which has the functions (1) to (8) described above.

As shown in FIG. 39, the calculation unit 203 comprises gate circuits 290 to 293, AND circuits 294 and 299, exclusive OR (EXOR) circuits 295 to 297, and a multiplexer 298.

The gate circuit 290 has a conduction state controlled by a UPOE_X signal, the gate circuit 291 has a conduction state controlled by a DISKOE_X signal, the gate circuit 292 has a conduction state controlled by a DNOE_X signal, and the gate circuit 293 has a conduction state controlled by an MEMOE_X signal.

The AND circuit 294 has two inputs, and an MEMEN_X signal is entered into one of them.

The AND circuit 299 has two inputs, and a UPDIS_X signal is entered into one of them.

The multiplexer 298 has two inputs A and B, and its output is switched to one of them according to a BUFINSEL_X signal.

Each calculation unit 203 carries out the following operations according to values of the various signals in order to realize the parity generation, the reading of the correct data, and the recovery of the data using the parity.

(1) The exclusive OR of the inputs from the U terminal and the D terminal is taken, and outputted from the R terminal (i.e., it is given to the buffer memory 208).

In a case where the data entered from the U terminal is 0, the data entered from the D terminal will be written as it is into the buffer memory 208.

(2) The input from the D terminal is outputted from the R terminal (i.e., it is given to the buffer memory 208) as well as from the U terminal.

(3) The exclusive OR of the data entered from the R terminal (i.e., the data read out from the buffer memory 208) and the data from the U terminal is taken, and outputted from the D terminal.

In a case where the data entered from the U terminal is 0, the data read out from the buffer memory 208 will be outputted as it is to the D terminal.

(4) The exclusive OR of the data entered from the R terminal (i.e., the data read out from the buffer memory 208) and the data from the D terminal is taken, and outputted from the U terminal.

In a case where the data entered from the D terminal is 0, the data read out from the buffer memory 208 will be outputted as it is to the U terminal.

(5) The data entered from the U terminal is outputted from the D terminal by bypassing itself.

(6) The data entered from the D terminal is outputted from the U terminal by bypassing itself.

(7) The data entered from the L terminal is outputted from the R terminal by bypassing itself.

This operation is used at a time of writing the data from the connection port connected with the disk device 202 into the buffer memory 208.

(8) The data entered from the R terminal is outputted from the L terminal by bypassing itself.

This operation is used at a time of sending the data read out from the buffer memory 208 into the connection port connected with the disk device 202.

(9) All the terminals are set to the non-conduction state.

Next, the operation in this third embodiment will be described in further detail with references to FIG. 40 to FIG. 49. Here, FIG. 40, FIG. 42, FIG. 44, FIG. 46 and FIG. 48 show the values of the various signals given to each calculation unit 203 at various stages of the operation, while FIG. 41, FIG. 43, FIG. 45, FIG. 47 and FIG. 49 show the outline of the operation at the various stages of the operation, along with an indication of a state of each calculation unit 203 as one of (1) to (9) described above at the various stages of the operation.

(1) First, the writing into the disk device 202 will be described in detail.

In a case of writing a new data into the disk device 202, the data is divided into n blocks first. Then, the first to (n−1)-th blocks are sequentially written into the buffer memories 208 (operation A), and the n-th block is written into the (n+1)-th buffer memory 208, while the exclusive OR of the first to (n−1)-th blocks written earlier and the n-th block is taken, and the exclusive OR is written into the n-th buffer memory 208 (operation B).

In the following, these operations A and B will be described in further detail.

<Operation A>

The data to be written is divided into four blocks of equal length.

The functions of the calculation units 203 are switched by the central control unit 210 such that the block 0 is written into the buffer memory 208 at #0 level, the block 1 is written into the buffer memory 208 at #1 level, and the block 2 is written into the buffer memory 208 at #2 level, sequentially.

Figures 40, 41:
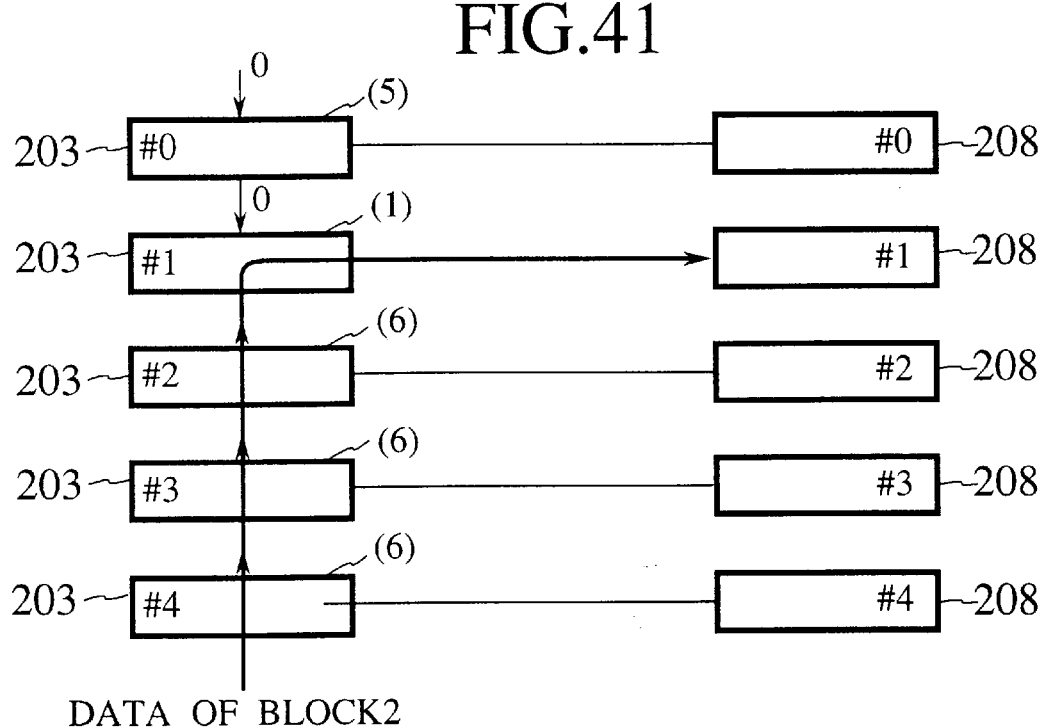
FIG. 40 is a table of signal values given to calculation units at one stage of the operation of the data server system of FIG. 38.
FIG. 41 is a partial block diagram of the data server system of FIG. 38 showing an outline of one stage of the operation of the data server system of FIG. 38.

FIG. 40 shows the signals given to the calculation units 203 in a case of writing into the buffer memory 208 at #1 level, and FIG. 41 shows the data path for the writing into the buffer memory 208 at #1 level.

<Operation B>

Here, the block 3 is written into the buffer memory 208 at #4 level, while the parity is generated and written into the buffer memory 208 at #3 level.

Figures 42, 43:
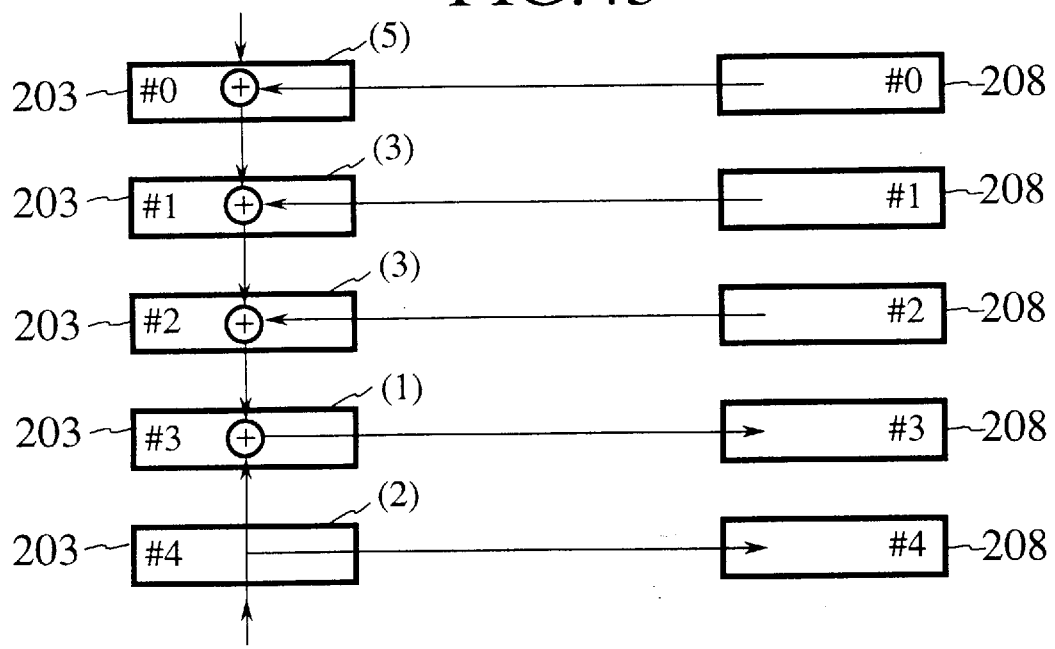
FIG. 42 is a table of signal values given to calculation units at another stage of the operation of the data server system of FIG. 38.
FIG. 43 is a partial block diagram of the data server system of FIG. 38 showing an outline of another stage of the operation of the data server system of FIG. 38.

The signals given to the calculation units 203 at this point are as shown in FIG. 42, and the flow of data and the operation of each calculation unit 203 at this point are as shown in FIG. 43.

The block 3 is written into the buffer memory 208 at #4 level as the calculation unit 203 at #4 level carries out the operation of (2) described above.

Also, at this point, the exclusive OR of the blocks 0 to 2 already stored in the buffer memories 208 at #0 to #2 levels is outputted from the D terminal of the calculation unit 203 at #2 level, and the exclusive OR of this output and the block 3 outputted from the U terminal of the calculation unit 203 at #4 level is written as the parity into the buffer memory 208 at #3 level.

Here, the data written into the buffer memories 208 at #0 to #4 levels, i.e., the block 0, the block 1, the block 2, the parity, and the block 3, respectively, are written into the respectively corresponding disk devices 202 at #0 to #4 levels. In this case, all five calculation units 203 carry out the operation of (8) described above.

Next, the repair operation in a case of the permanent malfunction of the disk device 202 will be described in detail.

At a time of reading from the disk device 202 to the buffer memory 208, when a signal indicating the malfunction of the disk device 202 is entered at the connection port connected with one disk device 202, the central control unit 210 records this disk device 202 corresponding to the malfunction, and notifies the occurrence of the malfunction at this disk device 202 to the external. Then, after the malfunctioned disk device is exchanged, the other data corresponding to the malfunctioned disk device 202 are read out from the connection ports other than that connected with the malfunctioned disk device 202 to the n sets of buffer memories 208 (operation C), and the exclusive OR of the contents of these n sets of buffer memories 208 is taken and written into the remaining one buffer memory 208 (operation D). Then, the command for writing from this buffer memory 208 to the disk device 202 that has been exchanged after the malfunction is issued (operation E).

In the following, these operations C to E will be described in further detail.

<Operation C>

Here, the malfunctioned disk device 202 is assumed to have been connected with the disk control unit 204 at #1 level.

When the signal indicating the malfunction of the disk device 202 is notified from the disk control unit 204 at #1 level for more than a prescribed number of times, the central control unit 210 judges that this disk device 202 is permanently malfunctioned. Then, the central control unit 210 issues the signal to the external in order to notify the need for the exchange of the malfunctioned disk device 202.

After the disk device 202 is exchanged, the central control unit 210 controls the writing of the data from the connection ports connected with the disk devices 202 into the corresponding buffer memories 208, for the purpose of recovering the data originally stored in the malfunctioned disk device 202. At this point, the commands for reading are issued to the disk control units 204 such that the blocks to be read from the disk devices 202 are those blocks for which the exclusive OR of all (n+1) blocks becomes 0.

For example, in this example, the commands for reading the data blocks which form the RAID group with the data block originally stored in the malfunctioned disk device 202 are issued to the disk control units 204 at #0, #2, #3 and #4 levels.

The disk control units 204 at #0, #2, #3 and #4 levels which received these commands then read out the data blocks from the relevant disk devices 202, and write them into the corresponding buffer memories 208 at #0, #2, #3 and #4 levels.

Figures 44, 45:
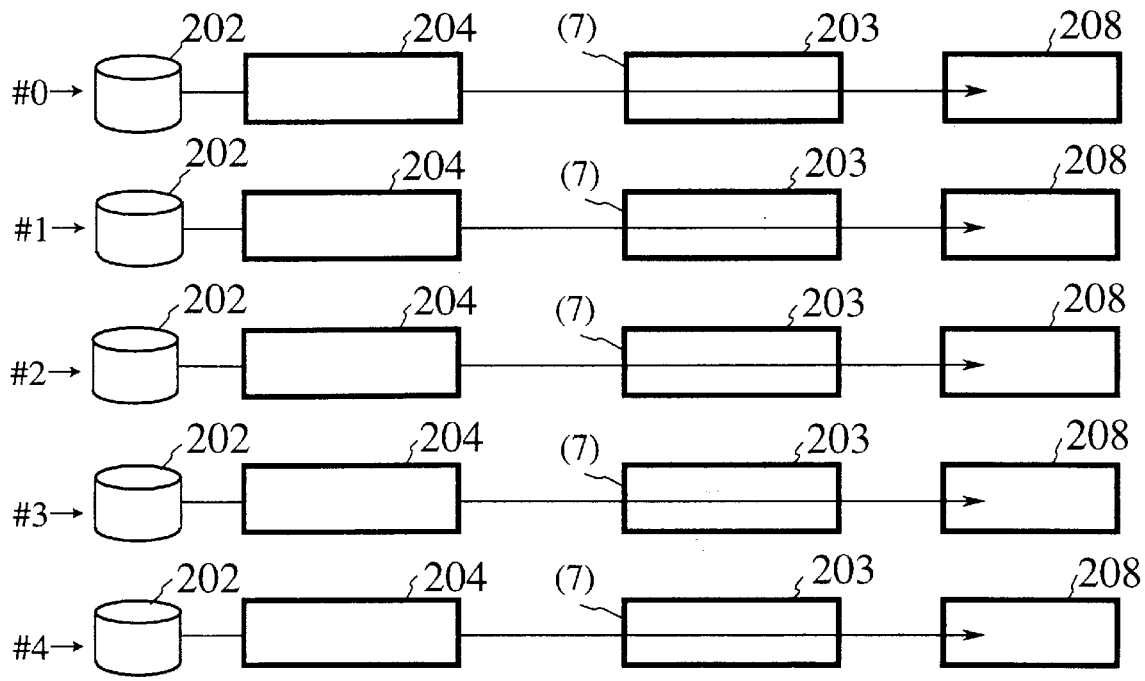
FIG. 44 is a table of signal values given to calculation units at another stage of the operation of the data server system of FIG. 38.
FIG. 45 is a partial block diagram of the data server system of FIG. 38 showing an outline of another stage of the operation of the data server system of FIG. 38.

At this point, the functions of the calculation units 203 are switched by the signals as shown in FIG. 44, and the data path is as shown in FIG. 45. In this case, however, the data block read out to the buffer memory 208 at #1 level will not be used.

<Operation D>

When the data blocks are read out, the recovery data is produced in the buffer memory 208 at #1 level. Namely, the exclusive OR of the data blocks in the buffer memories 208 at #0, #2, #3 and #4 levels is taken and written into the buffer memory 208 at #1 level.

Figures 46, 47:
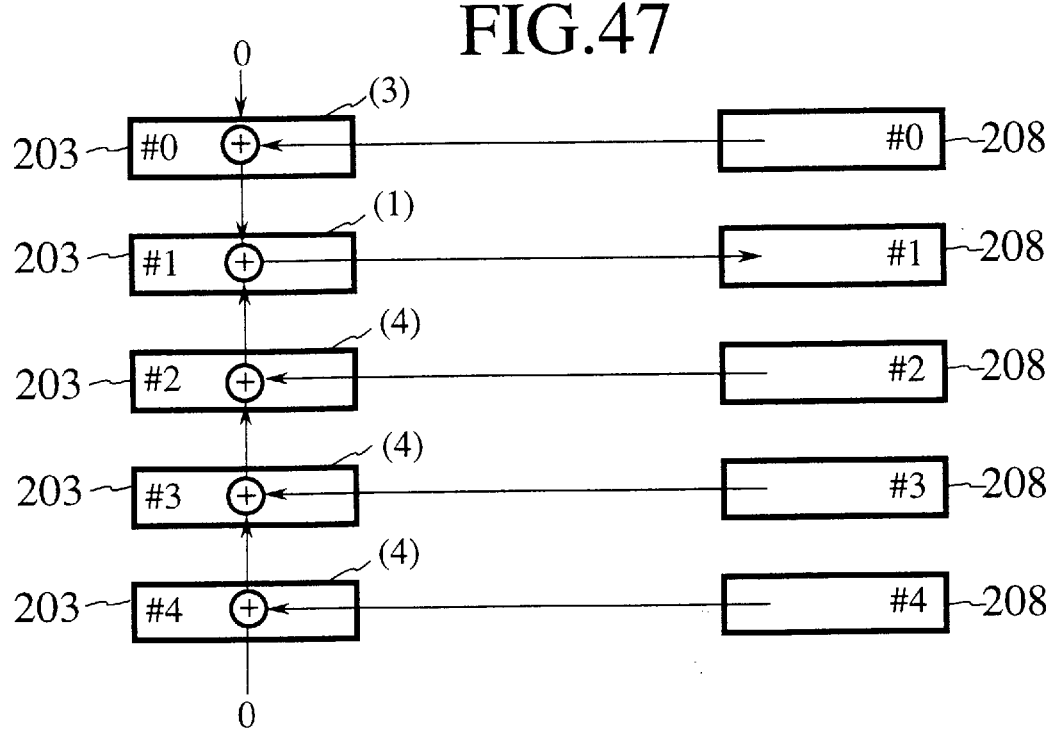
FIG. 46 is a table of signal values given to calculation units at another stage of the operation of the data server system of FIG. 38.
FIG. 47 is a partial block diagram of the data server system of FIG. 38 showing an outline of another stage of the operation of the data server system of FIG. 38.

The signals given to the calculation units 203 at this point are as shown in FIG. 46. Here, the calculation unit 203 at #0 level is given the input 0. The flow of data and the operation of each calculation unit 203 at this point are as shown in FIG. 47.

<Operation E>

When the recovery data is written into the buffer memory 208 at #1 level, this data block is written into the exchanged disk device 202, and the repair operation is completed.

Figures 48, 49:
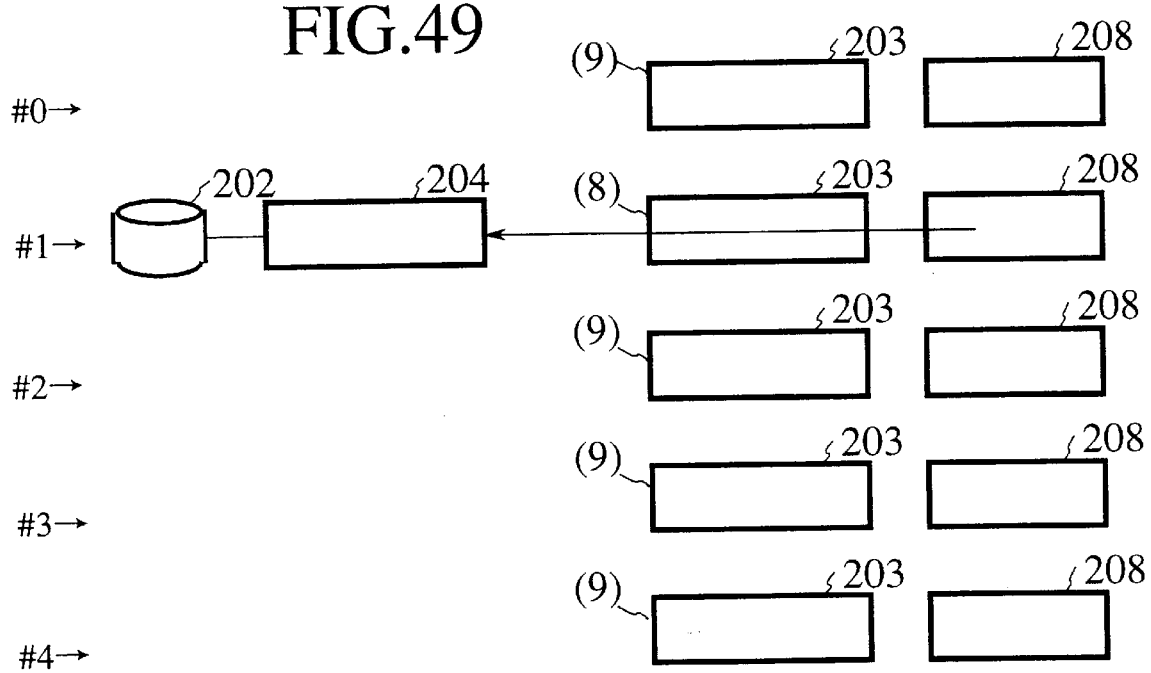
FIG. 48 is a table of signal values given to calculation units at another stage of the operation of the data server system of FIG. 38.
FIG. 49 is a partial block diagram of the data server system of FIG. 38 showing an outline of another stage of the operation of the data server system of FIG. 38.
Figure 50:
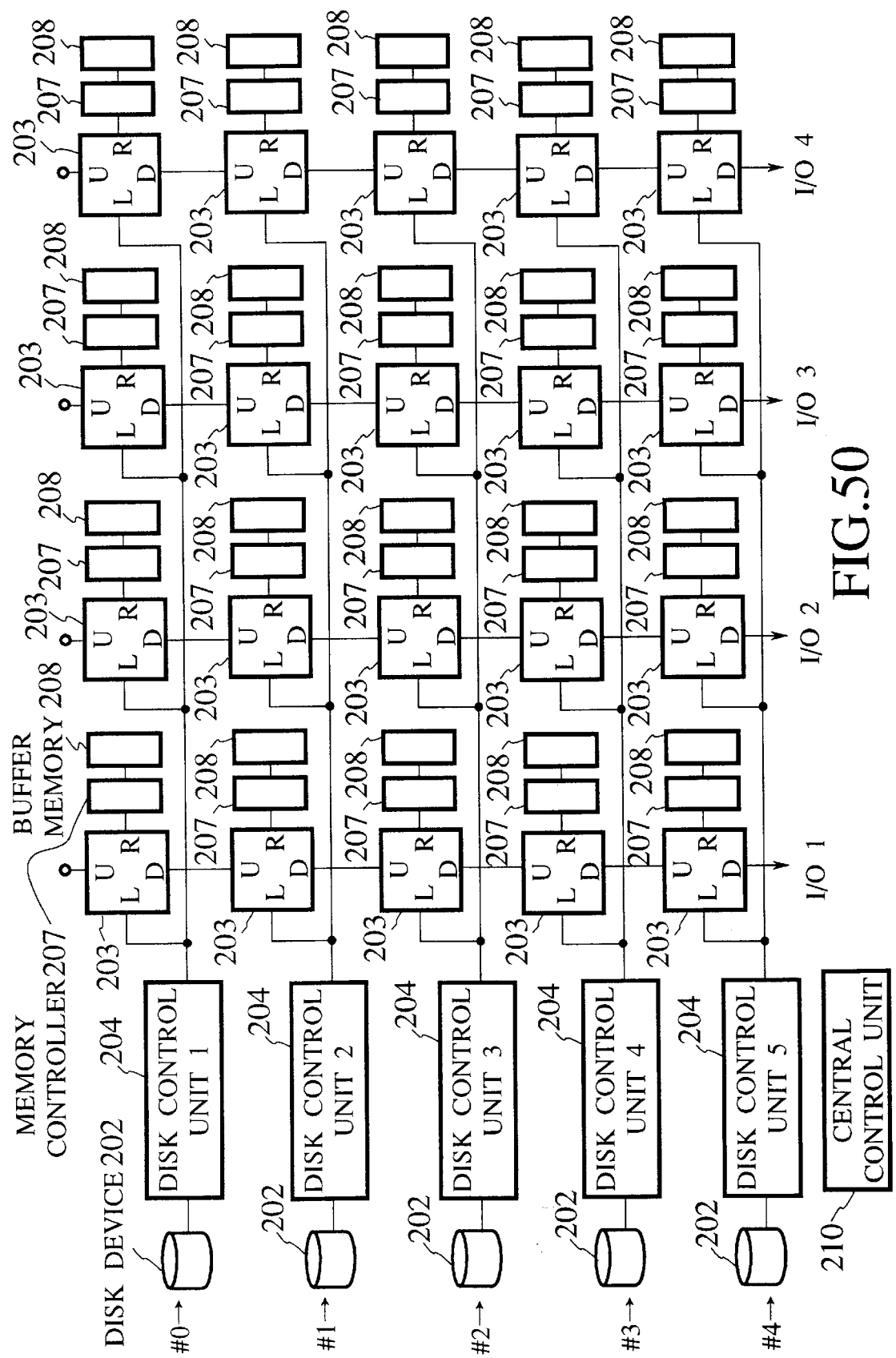
FIG. 50 is a schematic block diagram of the data server system of the third embodiment which is adapted to the first embodiment.

At this point, the functions of the calculation units 203 are switched by the signals as shown in FIG. 48, and the data path is as shown in FIG. 49.

It is to be noted that the capacity of the disk device 202 is usually larger than that of the buffer memory 208, so that in the repair operation at a time of the disk exchange, the capacity of the disk device 202 as a whole is divided into a plurality of data blocks to repair one data block by one repair operation, and the disk device 202 as a whole is repaired by repeating this repair operation for a plurality of times with respect to each of a plurality of data blocks.

As described, according to this third embodiment, it is possible to realize the generation of the parity to be written into the disk and the generation of the information necessary in recovering the malfunctioned disk at a high speed, by means of a compact hardware structure.

In should be apparent that, although a case using the exclusive OR has been described in this third embodiment, a case using the exclusive AND can also be realized easily by simple circuit modifications.

In addition, the calculation units 203 are connected in series in this third embodiment, but it is also possible to add pipeline registers at connecting sections of the calculation units 203 in order to satisfy the timing limitation.

Moreover, in this third embodiment, a scheme for carrying out the transfer from the disk device 202 to the buffer memory 208 and the reading from the buffer memory 208 sequentially has been described, but it is also possible for each buffer memory 208 to form the double buffer such that the transfer from the disk device 202 and the reading from the buffer memory 208 can be carried out in parallel.

In addition, in a case where the disk device 202 carries out the retry operation due to a temporal error in the disk reading and the access is not finished within a prescribed period of time, it is also possible for the disk control unit 204 to deal with this case equivalently as a case of the malfunction of the disk device 202 by notifying the active ERROR_X signal to indicate an error in the disk device 202.

It is also noted that this third embodiment is applicable to the first embodiment described above. In a case of applying this third embodiment to the system of FIG. 5, the disk devices 202 of FIG. 38 correspond to the data memory devices 2 of FIG. 5, the disk control units 204 of FIG. 38 correspond to the data memory control devices 4 of FIG. 5, and the central control unit 210 of FIG. 38 corresponds to the central control device 10 of FIG. 5. In addition, the buffer memories 208 of FIG. 38 correspond to the buffer memory devices 8 connected to one communication control device 6 in FIG. 5. The calculation unit 203 is to be connected between the data memory control device 4 and one or more of the buffer memory devices 8 corresponding to that data memory control device 4. An exemplary configuration in which this third embodiment is adapted to the first embodiment described above in this manner is shown in FIG. 50.

It is also noted that, in a case of applying this this embodiment to the system of FIG. 15 or FIG. 16, the calculation unit 203 is to be connected between a group of the data memory control units 4 which share the same bus 20 and one or more buffer memory devices 8 corresponding to this group of the data memory control units 4.

According to the data server apparatus provided by the second and third embodiments described above, by operating the calculation units appropriately, the following operations can be realized.

(i) Assume that (n+1) data forming a group are stored in the disk devices connected to the disk control units. Then, it is possible to store the data of each disk device into the corresponding buffer memory unit.

This operation can be realized by operating the calculation unit to output the data entered from the disk control unit side directly to the buffer memory unit side.

It is also possible to store the data of the desired disk devices alone in the corresponding buffer memory units.

(ii) It is possible to take out the data stored in the desired buffer memory unit from the lowermost stage calculation unit.

This operation can be realized by operating the calculation unit connected with the desired buffer memory unit to output the data entered from the buffer memory unit side terminal to the lower stage side terminal, and operating each lower stage calculation unit to output the data entered from the upper stage side terminal to the lower stage side terminal.

(iii) It is possible to take out the exclusive OR or the exclusive AND of the data stored in the buffer memory units other than the desired buffer memory unit from the lowermost stage calculation unit.

This operation can be realized by operating the calculation unit connected with the desired buffer memory unit to output the data entered from the upper stage side terminal to the lower stage side terminal, and operating every other calculation unit to output the exclusive OR or the exclusive AND of the data entered from the buffer memory unit side terminal and the data entered from the upper stage side terminal to the lower stage side terminal.

When the data stored in (n+1) buffer memory units are the data forming the RAID group, i.e., when n original data and their parity are available except for one data, the missing data can be recovered, and taken out from the lowermost stage calculation unit.

(iv) The data entered from the lowermost stage calculation unit can be stored into the desired buffer memory unit.

This operation can be realized by operating the calculation unit connected with the desired buffer memory unit to output the data entered from the lower stage side terminal to the buffer memory unit side terminal, and operating each lower stage calculation unit to output the data entered from the lower stage side terminal to the upper stage side terminal.

(v) Assume that (n+1) data forming a group are stored in the buffer memory units. Then, it is possible to store the data of each buffer memory unit into the corresponding disk device.

This operation can be realized by operating the calculation unit to output the data entered from the buffer memory unit side directly to the disk control unit side.

It is also possible to store the data of the desired buffer memory units alone in the corresponding disk devices.

(vi) It is possible to store the data entered at the calculation unit connected with the desired buffer memory unit into the buffer memory unit corresponding to the lowermost stage calculation unit, while storing the exclusive OR or the exclusive AND of the entered data and the data stored in the buffer memory units other than the desired buffer memory unit and the buffer memory unit corresponding to the lowermost stage calculation unit, i.e., the parity of these data, into the desired buffer memory unit.

This operation can be realized by operating the particular calculation unit connected with the desired buffer memory unit to output the exclusive OR or the exclusive AND of the data entered from the upper stage side terminal and the data entered from the lower stage side terminal to the buffer memory unit side terminal, operating every existing calculation unit at the upper stage than the particular calculation unit to output the exclusive OR or the exclusive AND of the data entered from the buffer memory unit side terminal and the data entered from the upper stage side terminal to the lower stage side terminal, operating the lowermost stage calculation unit to output the data entered from the lower stage side terminal to the upper stage side terminal and the buffer memory unit side terminal, operating every other existing calculation unit to output the exclusive OR or the exclusive AND of the data entered from the buffer memory unit side terminal and the data entered from the lower stage side terminal to the upper stage side terminal, and entering 0 for a case of using the exclusive OR or 1 for a case of using the exclusive AND from the upper stage side terminal of the uppermost stage calculation unit.

(vii) It is possible to store the exclusive OR or the exclusive AND of the data stored in the buffer memory units other than the desired buffer memory unit into the desired buffer memory unit.

This operation can be realized by operating the particular calculation unit connected with the desired buffer memory unit to output the exclusive OR or the exclusive AND of the data entered from the upper stage side terminal and the data entered from the lower stage side terminal to the buffer memory unit side terminal, operating every existing calculation unit at the upper stage than the particular calculation unit to output the exclusive OR or the exclusive AND of the data entered from the buffer memory unit side terminal and the data entered from the upper stage side terminal to the lower stage side terminal, operating every existing calculation unit at the lower stage than the particular calculation unit to output the exclusive OR or the exclusive AND of the data entered from the buffer memory unit side terminal and the data entered from the lower stage side terminal to the upper stage side terminal, and entering 0 for a case of using the exclusive OR or 1 for a case of using the exclusive AND from the upper stage side terminal of the uppermost stage calculation unit and the lower stage side terminal of the lowermost stage calculation unit.

When the data stored in (n+1) buffer memory units are the data forming the RAID group, i.e., when n original data and their parity are available except for one data, the data of the desired buffer memory unit which should be the missing data can be recovered, and written into the disk device.

Referring now to FIG. 51 to FIG. 60, the fourth embodiment of the continuous data server system realizing the continuous data transfer scheme according to the present invention will be descried in detail.

The second and third embodiments described above are directed to a case of using RAID4 or RAID5. In these second and third embodiments, the data are arranged in units of some blocks over a plurality of disk control devices.

In contrast, in this fourth embodiment, a case of using RAID3 for the continuous data will be described as an alternative embodiment.

Figure 51:
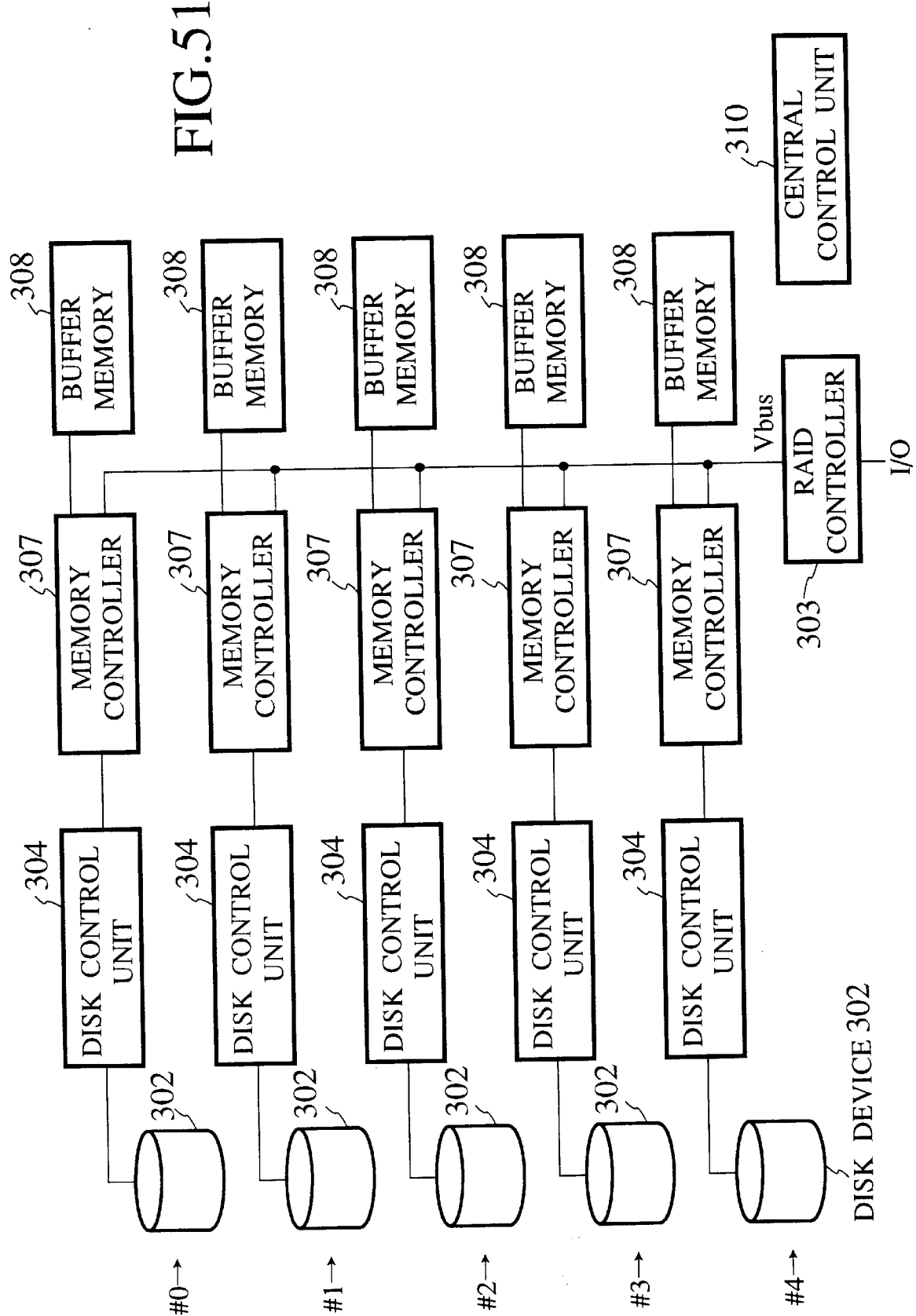
FIG. 51 is a block diagram of the fourth embodiment of a continuous data server system according to the present invention.

In this fourth embodiment, the system has an overall configuration as shown in FIG. 51, in which a plurality of disk control units 304 connected with respective disk devices 302 are connected with respectively corresponding memory controllers 307, and these memory controllers 307 are connected with the corresponding buffer memories 308. The memory controllers 307 are connected to a common bus Vbus, and this Vbus is connected to a RAID controller 303. The RAID controller 303 also has an input/output (I/O) bus on an opposite side to the Vbus, at which the data input/data output is carried out. A central control unit 310 is connected with the disk control devices 304, the memory controllers 307, and the RAID controller 303, to control their operations.

Note that the disk devices 302 may not necessarily be integral components of the continuous data server system, and can be supplemented by the user according to the need.

Note also that, in FIG. 51, the corresponding pair of the memory controller 307 and the buffer memory 308 can be considered as forming a buffer memory unit together.

Before describing the operation of this system of FIG. 51, the arrangement of the data in the disk devices used in the RAID3 will be described with reference to FIG. 52.

First, the continuous data are managed by being divided into blocks of a prescribed length (such as 128 KB, for example) each. The access to the disk is carried out in unit of this block, within a prescribed period of time (such as 100 msec, for example). This prescribed period of time is called a time-slot. The disk devices 302 are divided into groups called RAID groups. The disk devices 302 of one RAID group are read out in parallel at one time-slot.

Figure 52:
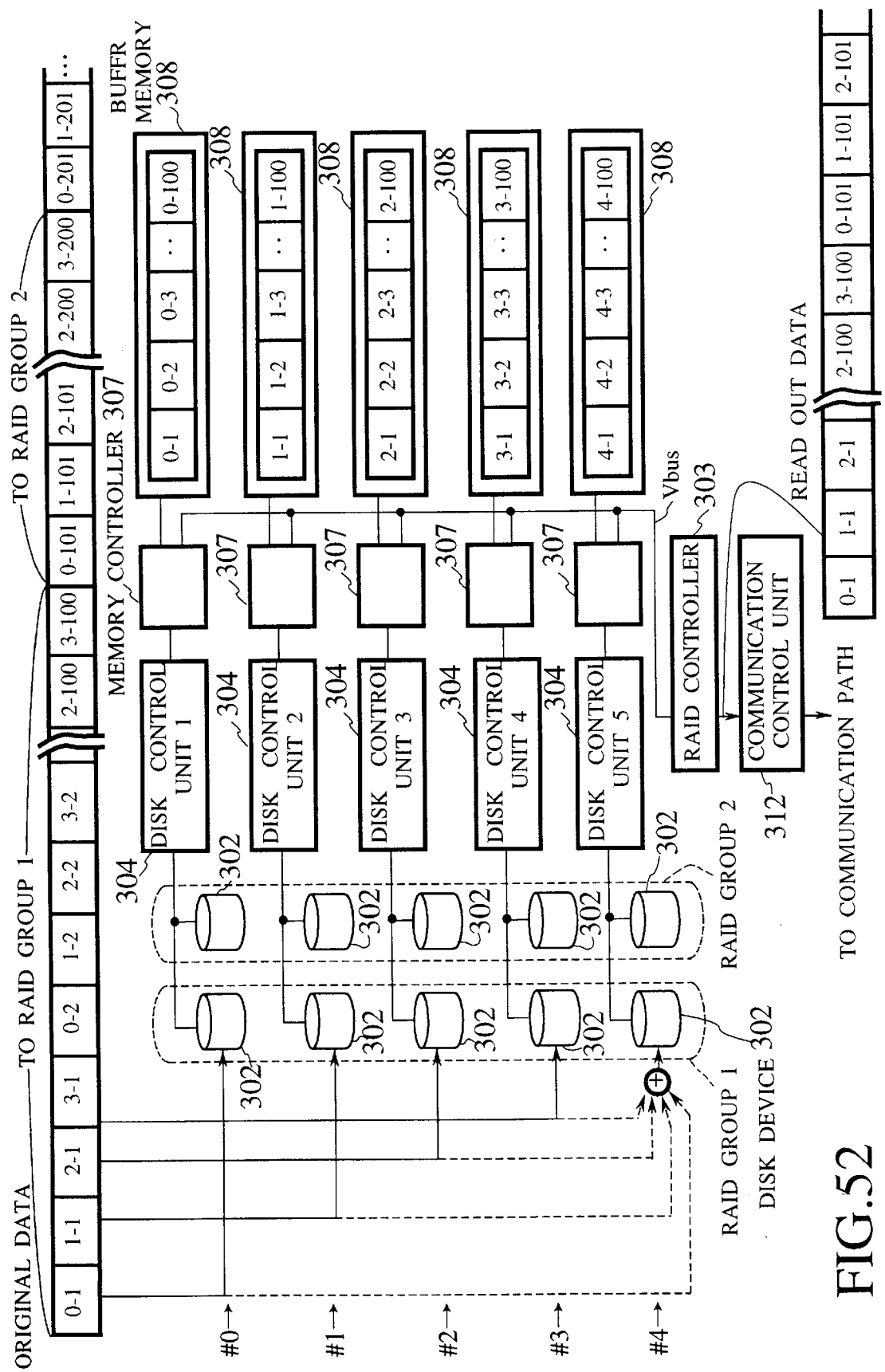
FIG. 52 is a schematic block diagram of the continuous data server system of FIG. 51 showing the arrangement of the data in disk devices used in the fourth embodiment.

In an example shown in FIG. 52, there are two RAID groups, which are accessed alternately. The original data are divided into the RAID groups first, and further, each RAID group is arranged over the disk control units 304 in units of words. For example, when the original data constitute the continuous data formed by data in units of words such as 0-1, 1-1, 2-1, 3-1, 0-2, 1-2, 2-2, 3-2, . . . , the data 0-1 to 3-100, 0-201 to 3-300, . . . are allocated to the RAID group 1, while the data 0-101 to 3-200, 0-301 to 3-400 . . . are allocated to the RAID group 2. Then, the data 0-1 is stored as the first data of the disk device 302 on #0 row, the data 1-1 is stored as the first data of the disk device 302 on #1 row . . . , and the data 0-2 is stored as the second data on the disk device 302 on #0 row, . . . , In other words, the data m-n is stored as the n-th data of the disk device 302 on #m row.

Moreover, in the example of FIG. 52, one parity word is added to four words, so that the exclusive OR of the data 0-x, 1-x, 2-x, and 3-x is entered as the x-th data of the disk device 302 on #4 row.

The data of the RAID group to be read out at one time-slot are written into the buffer memories 308 in block units. Namely, the data m-1, m-2, . . . , m-100 are written into the buffer memory 308 on #m row as the data of one block.

Then, when the data are sequentially read out in word units from the buffer memories 308 on #0, #1, #2, . . . rows, the original data 0-1, 1-1, 2-1, . . . can be read out. In order to read out the data sequentially in word units, it is efficient to use the Vbus in time division.

Thus, in this fourth embodiment, the continuous data stored in the disk devices 302 are arranged over a plurality of disk control units 304 in word units, and the disk control units 304 read out the desired continuous data in block units. Then, the buffer memories 308 store the desired continuous data in block units, and the desired continuous data are obtained by reading out data from the buffer memories 308 sequentially in word units.

In the following, the operation of the system of FIG. 51 will be described in detail, while also describing the detailed configuration of the RAID controller 303.

First, the operation to correct the malfunction at a time of the disk reading will be described with reference to FIG. 53. Here, the operations of the buffer memories 308 and the RAID controller 303 will be mainly described.

When the malfunction of the disk device 302 occurs, the signal is transmitted from the disk control unit 304 to the central control unit 310, and in response, the central control unit 310 determines a manner of controlling the RAID controller 303.

Figure 53:
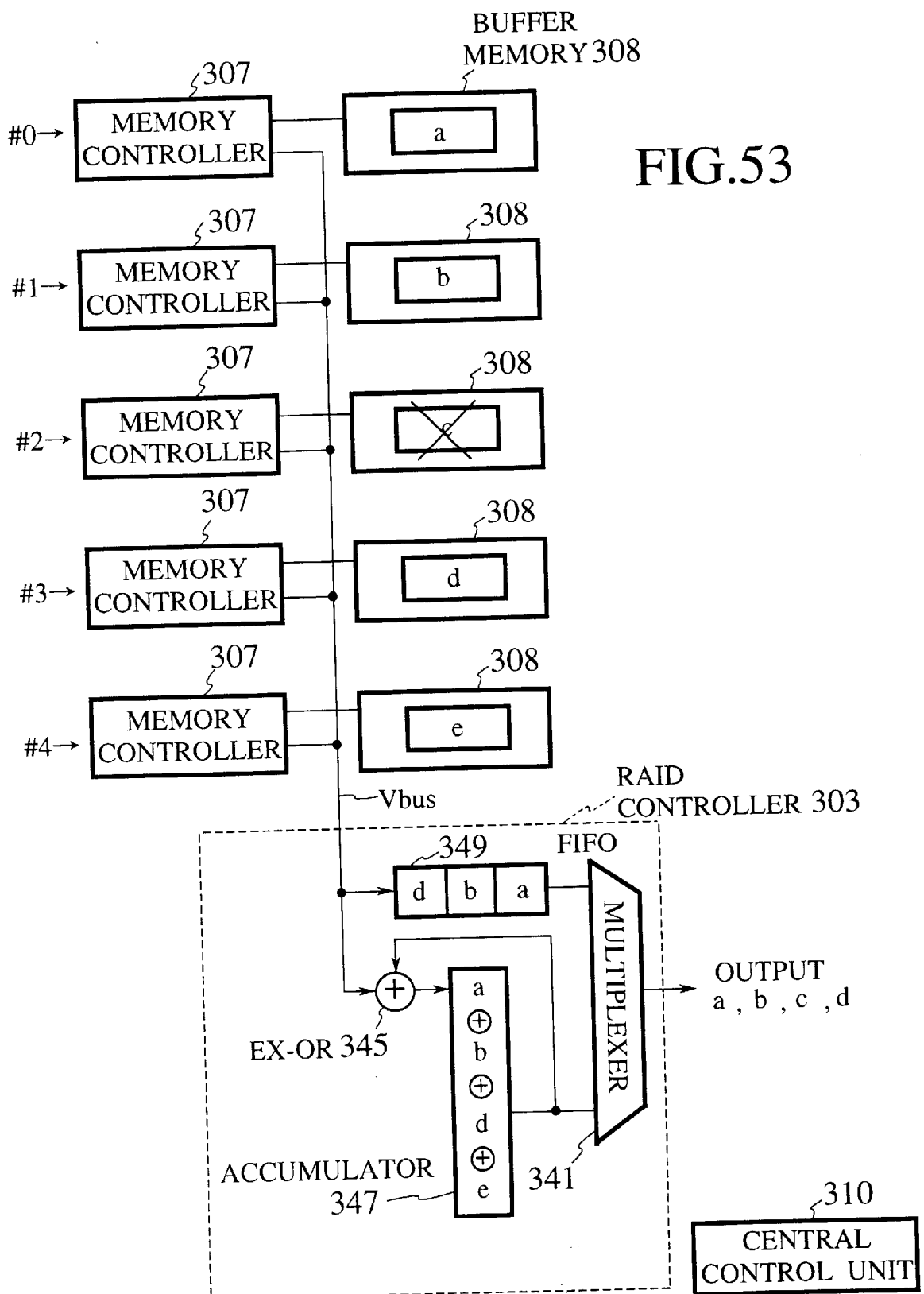
FIG. 53 is a partial block diagram of the continuous data server system of FIG. 51 showing the operation in a case of correcting the malfunction of a disk device.

In FIG. 53, it is assumed that the malfunction has occurred in the disk device 302 on #2 level. In this case, the buffer memory 308 on #2 level has the incorrect value. At a time of read out the data from the buffer memories 308 to the output, the central control unit 310 issues the control signal to use the Vbus in time division from the buffer memories 308 so as to enter the data in an order of "a", "b", "d", and "e" into the RAID controller 303. A FIFO 349 provided within the RAID controller 303 operates to store "a", "b", and "d" among these data according to the command from the central control unit 310.

On the other hand, an accumulator 347 stores the value of the exclusive OR of "a", "b", "d", and "e" which is calculated by an exclusive OR unit 345, i.e., the value "c" stored in the malfunctioned disk device 302. By switching the output of a multiplexer 341 at suitable timings between the values in the FIFO 349 and the value in the accumulator 347 according to the command from the central control unit 310, the data "a", "b", "c", and "d" in this order can be outputted as the output.

Figure 54:
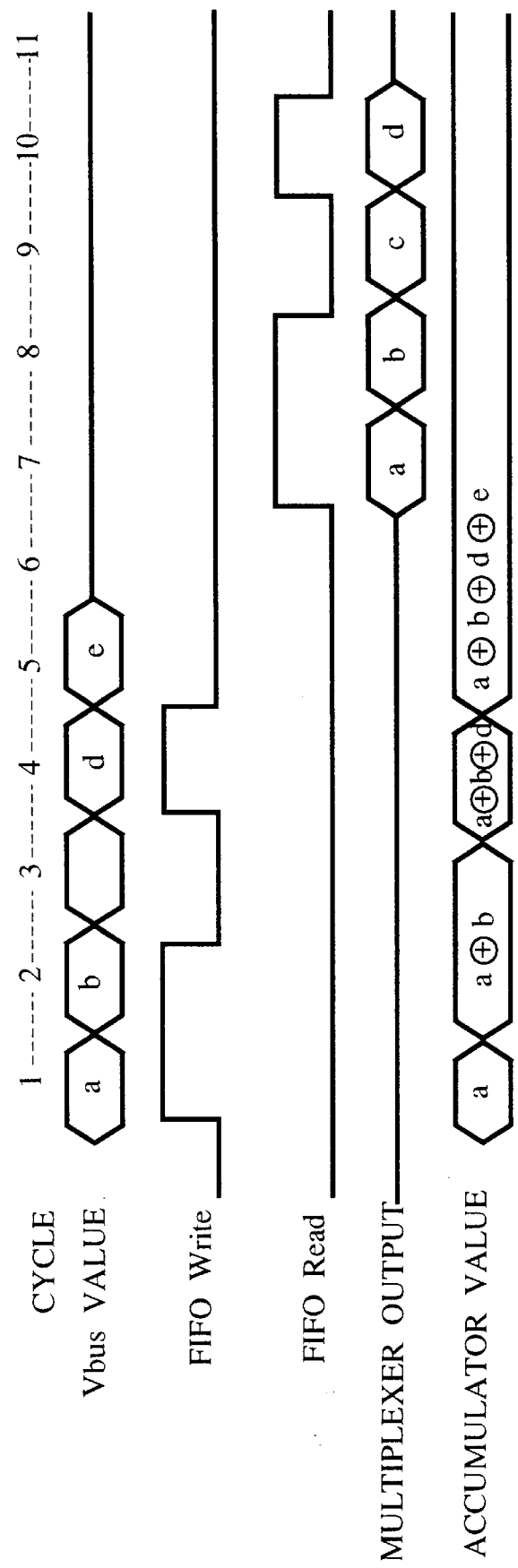
FIG. 54 is a timing chart for the operation in a case of correcting the malfunction of a disk device shown in FIG. 53.

FIG. 54 shows the operation indicated in FIG. 53 in a form of a timing chart. At the cycles 1, 2, 4, and 5, the values of "a", "b", "d", and "e" are read out to the Vbus, and a FIFO Write signal for writing only the values "a", "b", and "d" is given to the FIFO 349 according to the command from the central control unit 310. In addition, a FIFO Read signal is given from the central control unit 310 at the timings other than that for outputting the value "c" from the accumulator 347, so as to read out the data "a", "b", and "d" from the FIFO 349.

In the above example, a case of the malfunction occurring in the disk device 302 on #2 level has been described, but when there is no malfunction, it suffices to control the RAID controller 303 such that the data from the Vbus simply pass through the FIFO 349. Else, even in a case of no malfunction, it is also possible to carry out the control on an assumption that one of a plurality of buffer memories 308 has an incorrect value.

Next, the operation to write the data into the disk device 302 will be described with reference to FIG. 55. The data writing occurs in a case of loading the contents of the movies, etc., into the disk devices 302 in an application to the video server, for example. For this data writing, it is possible to consider a case in which the data are given to the RAID controller 303 from a network via a communication control unit, and a case in which a device such as a tape drive or a video encoder is directly connected to the RAID controller 303.

As the input of the RAID controller 303, the time series data in word units are given in an order of "a", "b", "c", and "d". These data are sequentially given to the Vbus, while the exclusive OR "e" of these data "a", "b", "c", and "d" is calculated by an exclusive OR unit 335 and an accumulator 337 provided within the RAID controller 303. Then, the output of a multiplexer 331 is switched to output the data "e" to the Vbus.

Figure 55:
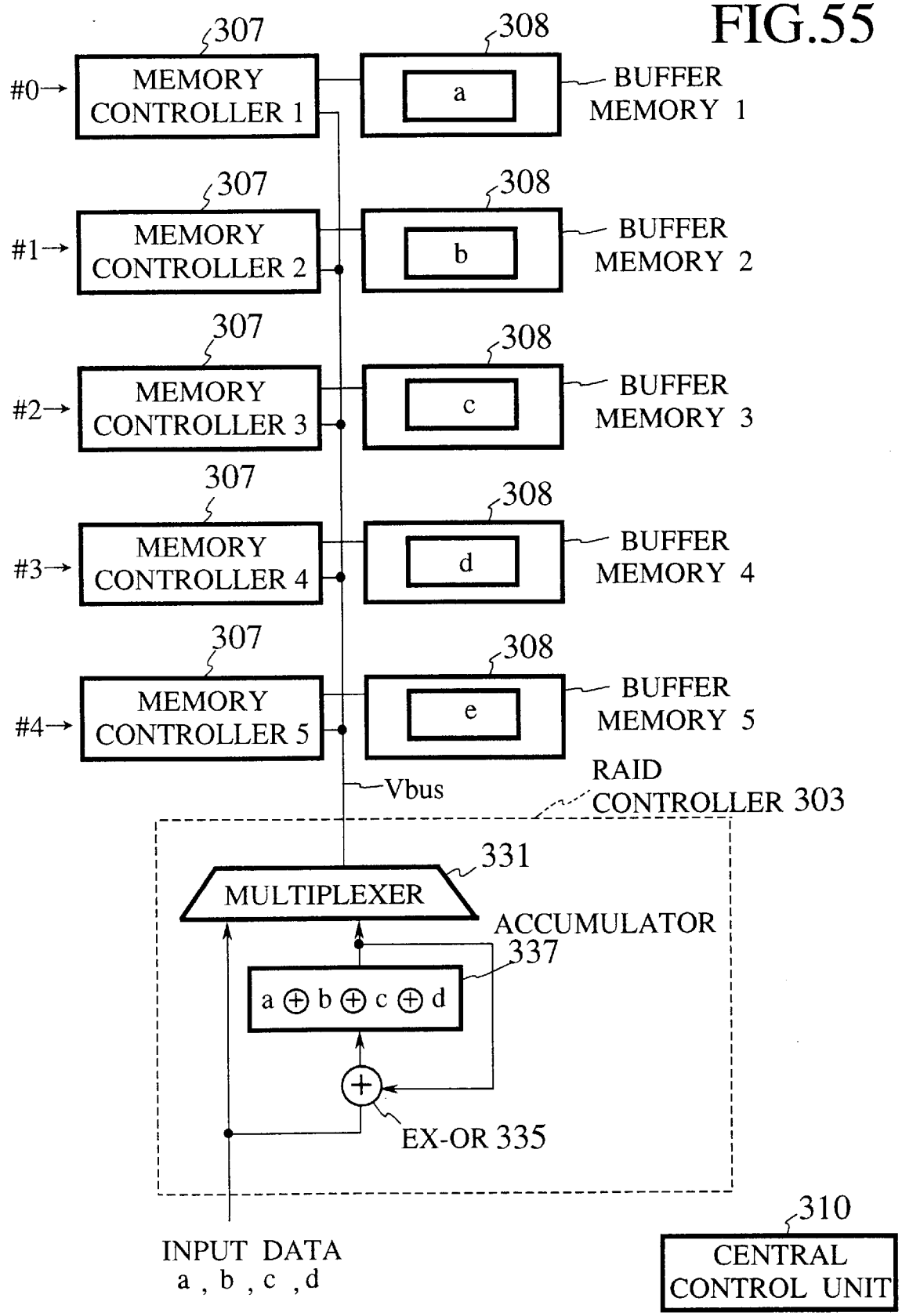
FIG. 55 is a partial block diagram of the continuous data server system of FIG. 51 showing the operation in a case of writing the data into a disk device.
Figure 56:
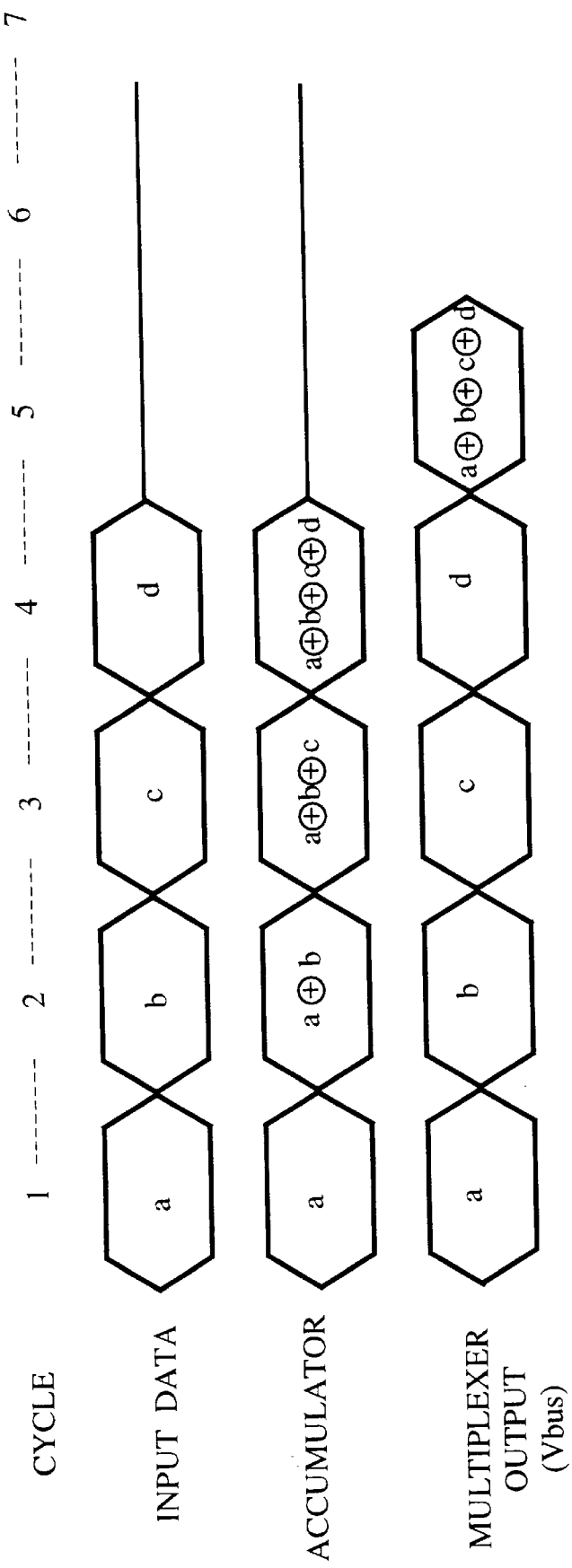
FIG. 56 is a timing chart for the operation in a case of writing the data into a disk device shown in FIG. 55.

FIG. 56 shows a timing chart for this case. To the Vbus, the data "a", "b", "c", "d", and "e" are outputted in this order, and these data are written into the buffer memory (1) to the buffer memory (5) sequentially. When one time-slot part data is stored in the buffer memory 308, the data is written into the disk device 302 from the disk control unit 304 according to the command from the central control unit 310. By means of the operation described in conjunction with FIG. 55, it becomes possible to produce the parity by means of the hardware at a time of writing the data into the disk device 302.

Now, when the malfunction of the disk device occurs in the RAID configuration, there is a need to exchange the malfunctioned disk device, and to recover the data stored in the malfunctioned disk device in the newly exchanged disk device. This operation is realized by exchanging the malfunctioned disk device first, and writing the exclusive OR of the data in the disk devices belonging to the same RAID groups as the malfunctioned disk device into the new disk device. Here, the capacity of the disk device is so large that it cannot be handled within one time-slot, so that the malfunctioned disk device is recovered over a plurality of time-slots.

Figure 57:
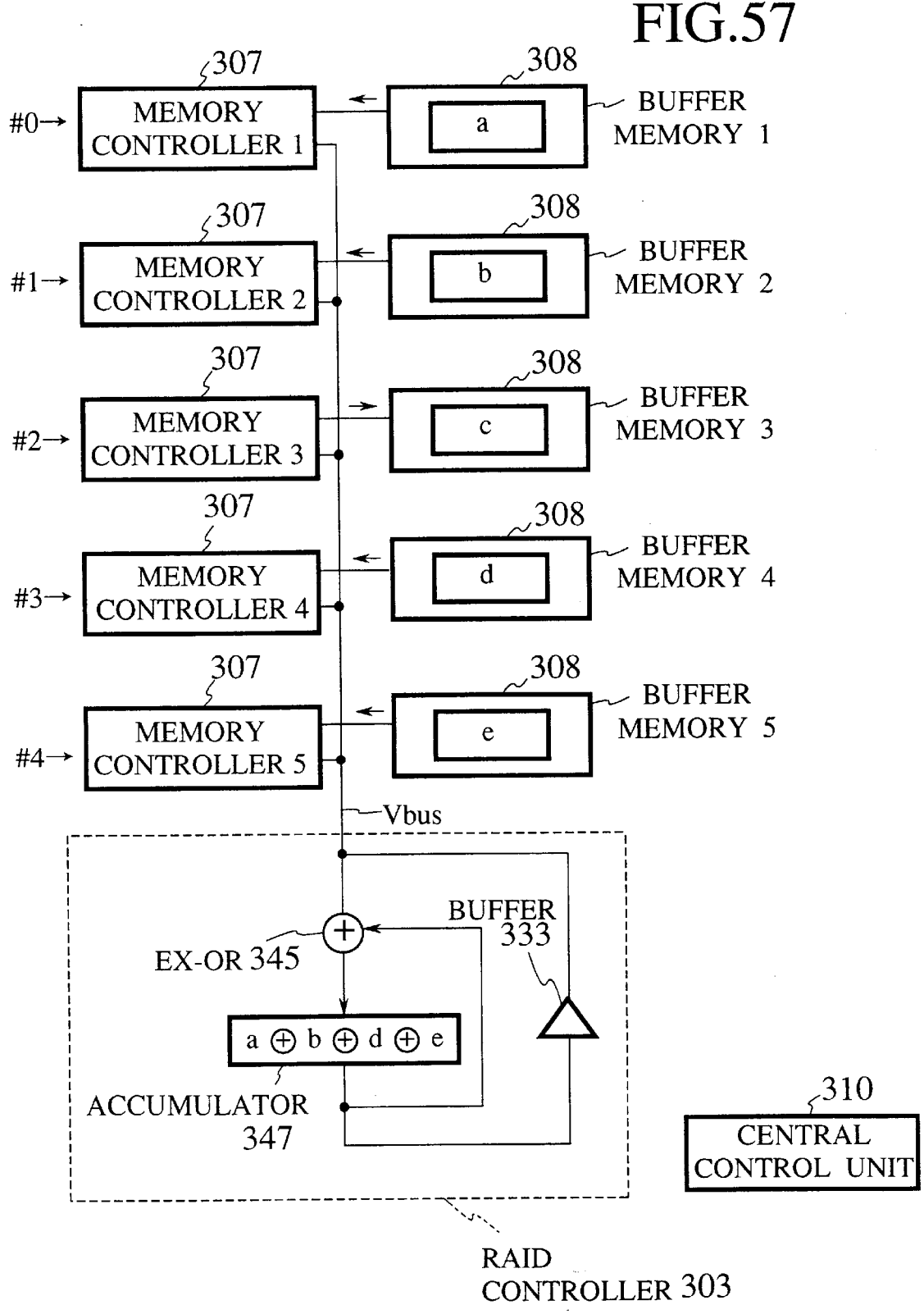
FIG. 57 is a partial block diagram of the continuous data server system of FIG. 51 showing the operation in a case of recovery from the malfunction of a disk device.

FIG. 57 shows this recovery operation, where it is assumed that the disk device 302 connected on #2 level has caused the malfunction and then exchanged. First, to the buffer memory (1), the buffer memory (2), the buffer memory (4), and the buffer memory (5), the one time-slot part data are copied from the disk devices 302 belonging to the same RAID group as the malfunctioned disk device 302.

Next, these data are transferred to the Vbus in word units, in an order of "a", "b", "d", and "e". The RAID controller 303 which received these values from the Vbus calculates the exclusive OR "c" of these values at the exclusive OR unit 345, and stores this value "c" in the accumulator 347. Then, at an appropriate timing, this value "c" is outputted to the Vbus.

Figure 58:
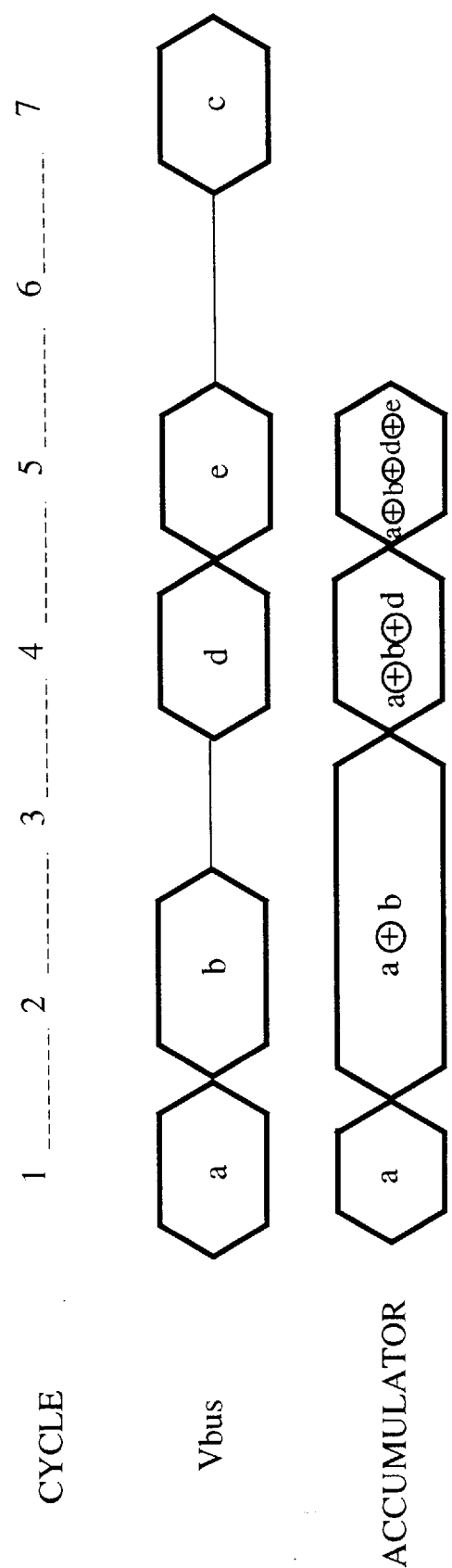
FIG. 58 is a timing chart for the operation in a case of recovery from the malfunction of a disk device shown in FIG. 57.

FIG. 58 shows a timing chart for this case. At the cycles 1, 2, 4, and 5, the values of "a", "b", "d", and "e" are read out, and the exclusive OR "c" obtained at the cycle 5 is written into the buffer memory (3) at the cycle 7. When this operation per word is carried out for the entire one time-slot part data, the data for all the words in one time-slot part are written into the disk device 302 from the buffer memory 308 via the memory controller 307 and the disk control unit 304 according to the command from the central control unit 310. By repeating this operation for all the necessary portion in the exchanged disk device 302, the data stored in the malfunctioned disk device 302 can be recovered in the exchanged disk device 302.

Figure 59:
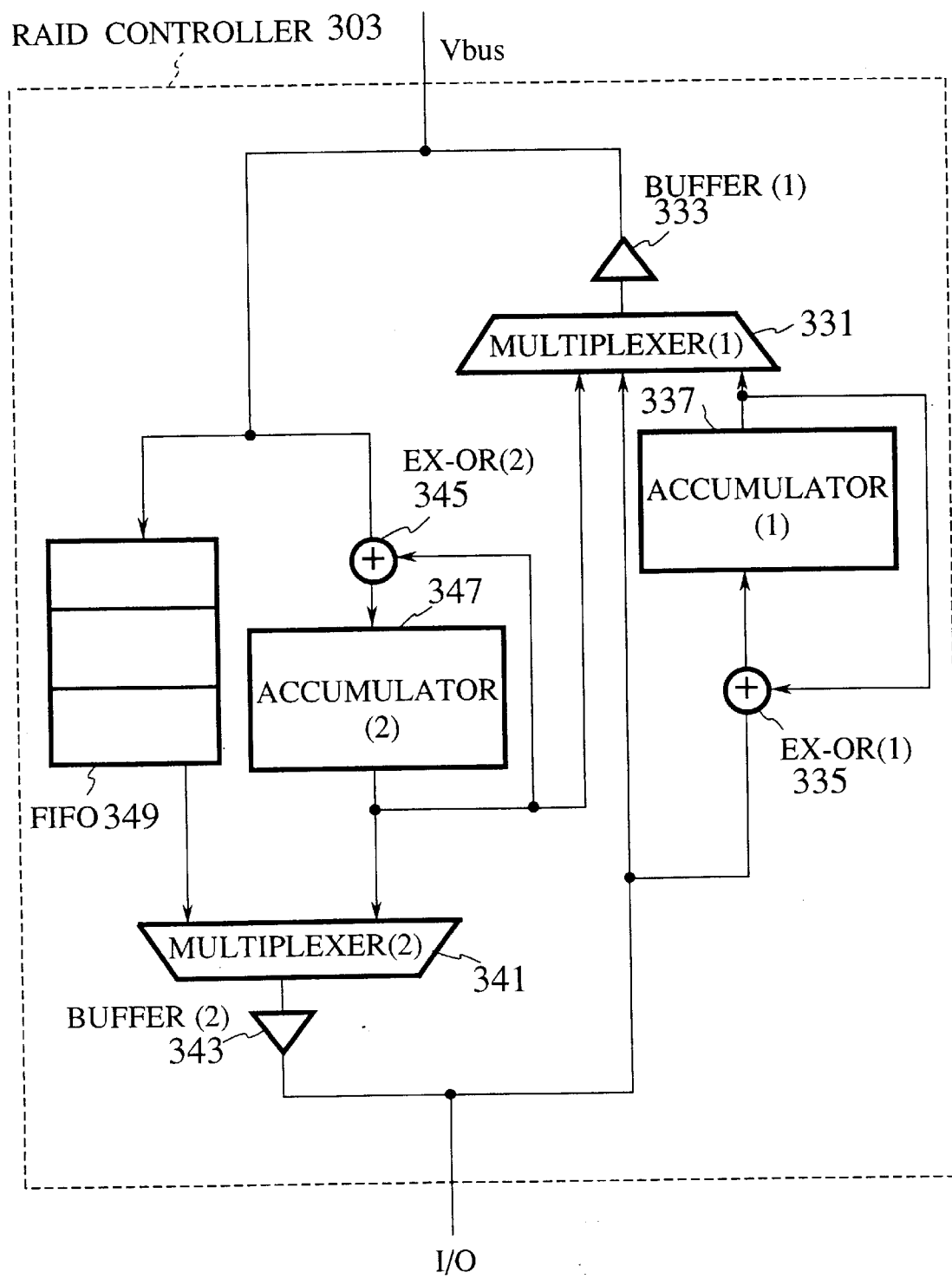
FIG. 59 is a block diagram of an internal configuration of a RAID controller in the continuous data server system of FIG. 51.

FIG. 59 shows the data path within the RAID controller 303. The correspondences between the configuration of FIG. 59 and those shown in FIG. 53, FIG. 55 and FIG. 57 described above are as follows. The multiplexer 341 of FIG. 53 corresponds to the multiplexer (2) 341 shown in FIG. 59, and the buffer (2) 343 shown in FIG. 59 has been omitted in FIG. 53. The exclusive OR unit 345 of FIG. 53 corresponds to the exclusive OR unit (2) 345 shown in FIG. 59, and the accumulator 347 of FIG. 53 corresponds to the accumulator (2) 347 shown in FIG. 59.

The multiplexer 331 of FIG. 55 corresponds to the multiplexer (1) 331 shown in FIG. 59, and the buffer (1) 333 shown in FIG. 59 has been omitted in FIG. 55. The accumulator 337 of FIG. 55 corresponds to the accumulator (1) 337 shown in FIG. 59, and the exclusive OR unit 335 of FIG. 55 corresponds to the exclusive OR unit (1) 335 shown in FIG. 59.

The accumulator 347 and the exclusive OR unit 345 of FIG. 57 are the same as those used at a time of reading from the buffer memory 308, and correspond to the accumulator (2) 347 and the exclusive OR unit (2) 345 shown in FIG. 59. The multiplexer (1) 331 shown in FIG. 59 has been omitted in FIG. 57. The value will be given to the Vbus from this multiplexer (1) 331 via the buffer (1) 333 as shown in FIG. 59.

Figure 60:
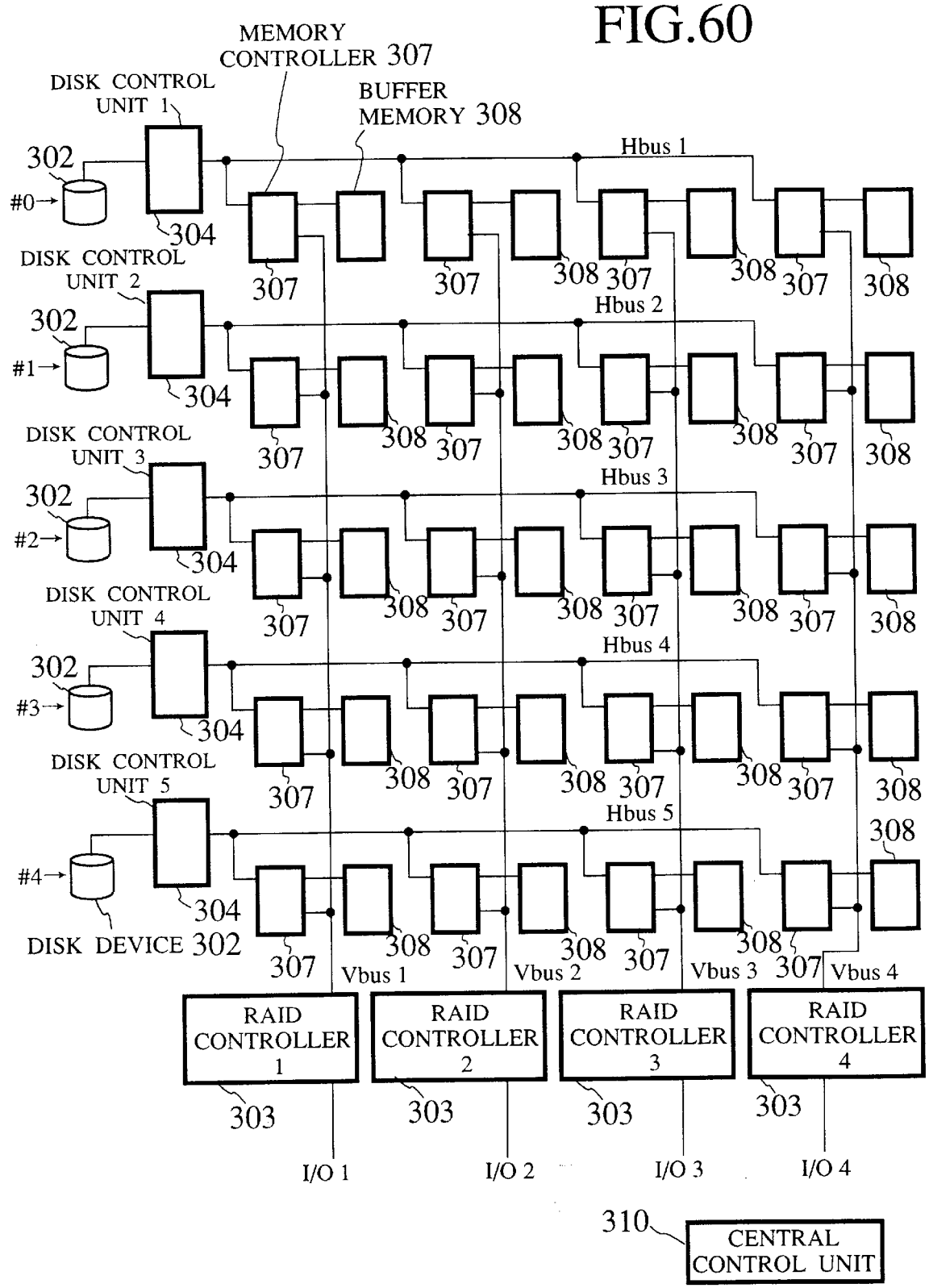
FIG. 60 is a schematic block diagram of the continuous data server system of the fourth embodiment which is adapted to the first embodiment.

FIG. 60 shows an exemplary configuration in a case of applying this fourth embodiment to the continuous data server such as the video server, which effectively corresponds to a case of adapting this fourth embodiment to the first embodiment described above. In this exemplary configuration of FIG. 60, the Vbus is distributed into a plurality of buses, so that it is possible to secure a wide bandwidth for the data input/data output.

The fourth embodiment described above realizes the continuous data server system in which a plurality of buffer memory units are provided in correspondence to a plurality of disk control units, while the continuous data are stored in the disk devices in word units such that the continuous data are arranged over a plurality of disk control units, and the data in block units stored by a plurality of buffer memory units are sequentially read out from a plurality of buffer memory units in word units.

For this reason, it is possible to increase the level of multiplexing for the data path between the disk control units and the buffer memory units, and data constituting the continuous data can be exchanged in block units. Here, in the data of each block, the continuous data are arranged over a plurality of disk control units in word units. Consequently, they do not form the continuous data when they are read into the buffer memory units, but by reading them sequentially in word units at a time of reading them out from a plurality of buffer memory units, the read out data can be set into the continuous data again. In this manner, a plurality of buffer memory units function to rearrange the discontinuous data read out from the disk devices into the continuous data, as well as to enable the accesses at a constant rate with respect to the bursty access patterns of the disk devices.

Consequently, even when the continuous data are arranged over a plurality of disk control units in word units, the continuous data can be supplied to the external eventually. In addition, as the continuous data are arranged over a plurality of disk devices in word units, it also becomes possible to realize the following.

Namely, the data sequentially read out from a plurality of buffer memory units in word units can be entered into the calculation unit, and at this calculation unit, a part of the entered data can be stored while calculating the exclusive OR of the data which are less than the data forming the RAID group by one data (one data corresponding to the malfunctioned disk device will be missing in a case of the malfunction of the disk device), and this calculation result and a part of the entered data stored within the calculation unit can be outputted in a desired order (an order for forming the continuous data). In this manner, at a time of the malfunction of the disk device, even if a part of the data sequentially read out from a plurality of buffer memory units is incorrect one, it is possible to output the correct continuous data. Note that, in this case, a plurality of data constituting the continuous data and their parity will be arranged over a plurality of disk control units in word units.

Here, the data are arranged over a plurality of disk devices in word units, so that an amount of data required to be stored within the calculation unit can be reduced to several words.

Also, the calculation unit can be made to produce the parity by calculating the exclusive OR of the data entered from the external of the apparatus, and transfer the data and the parity sequentially to a plurality of buffer memory units in a desired order (an order in which a plurality of data constituting the continuous data and their parity are arranged over a plurality of disk control units in word units), In this manner, it becomes possible to enter the data from the external and generate the parity, and then write them into the disk devices. In this case, it suffices for the memory capacity within the calculation unit to be only one word for the calculated parity.

In addition, the calculation unit can be made to calculate the exclusive OR of the data which are less than the data sequentially read out from a plurality of buffer memory units (the data forming the RAID group) by one data (one data corresponding to the malfunctioned disk device is missing), and transfer this result for writing into the buffer memory unit corresponding to the malfunctioned disk device. In this manner, it is possible to recover the data before the occurrence of the malfunction in the buffer memory unit corresponding to the malfunctioned and subsequently exchanged disk device.

Moreover, by writing the data recovered in the buffer memory unit into the malfunctioned and subsequently exchanged disk device by means of the corresponding disk control unit, it is possible to recover the content of the disk device. In this case, it also suffices for the memory capacity within the calculation unit to be only one word for the calculated parity.

Furthermore, the data can be sequentially read out from a plurality of buffer memory units in word units, by using the bus for reading the data from a plurality of buffer memory units in time division. In this manner, it is possible to realize the efficient use of the wirings and the reduction of an amount of hardware.

In should be apparent that, although a case using the exclusive OR has been described in this fourth embodiment, a case using the exclusive AND can also be realized easily by simple circuit modifications.

Referring now to FIG. 61 to FIG. 65, the fifth embodiment of the continuous data server apparatus realizing the continuous data transfer scheme according to the present invention will be descried in detail.

In this fifth embodiment, at least one dedicated buffer memory device is provided with respect to a combination of each of a plurality of data memory control devices and the archiving device. Namely, in a case of transferring the continuous data from the archiving device via the data memory control device to the corresponding data memory device, or in a case of transferring the continuous data from some data memory device via the corresponding data memory control device to the archiving device, the dedicated buffer memory device between that data memory control device and the archiving device is used.

In this manner, it is possible to transfer the continuous data between the archiving device and the data memory control device, without using the main memory device, the buffer memory device, or the bus to be used by the other data memory control devices, so that it is possible to eliminate the undesirable influence to the other transfer processing of the continuous data such as the reduction of a number of continuous data (a number of streams) that can be transferred simultaneously. Namely, it becomes possible to realize the transfer of the continuous data between the archiving device and the data memory device which minimizes the influence on the other transfer processing.

In the continuous data server apparatus of this fifth embodiment, the data memory devices for storing the continuous data can be disk devices, to be concrete. As the disk devices, magnetic disk devices are often used, but there are cases which use optical disk devices, or opto-magnetic disk devices instead. Besides the disk devices, the semiconductor memory devices such as RAM, EEPROM, etc. may also be used for the data memory devices.

For the data memory control device, an SCSI controller can be used, to be concrete. To one SCSI controller, a plurality of disk devices having SCSI as the interface can be connected. Besides that, various types of the interface device for connecting the disk device such as the FIBER CHANNEL may also be used for the data memory control device.

For the archiving device, a memory device such as magnetic tapes, optical disks, or opto-magnetic disks for which the recording cost per capacity is low but the access speed is slow can be used, to be concrete. Such a memory device usually has removable tapes or disks for recording the data. Namely, it has a structure in which the recording medium can be freely detached from a driving device for carrying out the data reading and writing, or the data reading only. For this reason, the required recording cost per capacity is only the cost of the recording medium, so that the recording cost becomes lower compared with a memory device such as the magnetic disk device in which the recording medium is not removable. However, when the request for the data is received, the requested data recorded on the recording medium cannot be read out unless the recording medium is loaded into a drive device, so that the access speed is slow.

For the buffer memory devices, the semiconductor memories can be used, to be concrete.

Note that, in parallel to the continuous data transfer between the archiving device and the data memory control device, the continuous data requested by an access request to that continuous data which is issued by a user or an application program are read out from the data memory device by the data memory control device, and after being temporarily stored in the main memory device, they are outputted to the communication path by a communication control device, so that it is preferable to provide a path connecting between the archiving device and the buffer memory device and a path connecting among the data memory control device, the main memory device, and the communication control device, independently from each other. In addition, it is preferable to provide a path for connecting between each data memory control device and the corresponding buffer memory device, independently from each other. In this case, it is preferable to form one buffer memory device by a memory which functionally has two ports so as to be connected to both a path with respect to the corresponding data memory control device and a path with respect to the archiving device.

Figure 61:
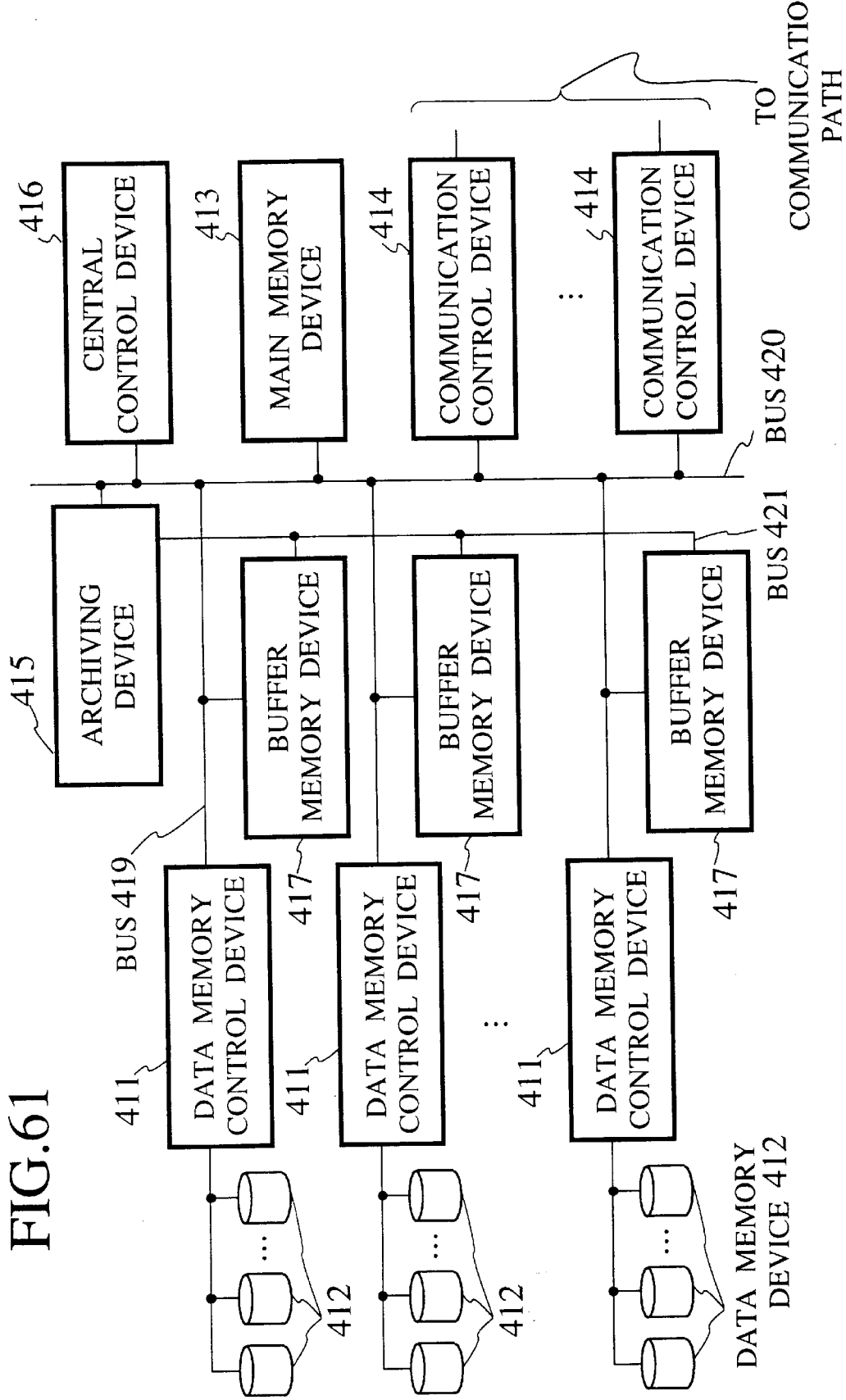
FIG. 61 is a block diagram of the fifth embodiment of a continuous data server apparatus according to the present invention.

In this fifth embodiment, the continuous data server apparatus has an overall configuration as shown in FIG. 61, which comprises: n (n is an integer greater than or equal to 1) sets of data memory control devices 411; a plurality of data memory devices 412, a prescribed number of which are connected to each one of the data memory control devices 411; a main memory device 413; a plurality of communication control devices 414; an archiving device 415; n sets of buffer memory devices 417, each of which is connected to one data memory control device 411 via a bus 419 and the archiving device 415 via a bus 421; and a central control device 416 connected with all of the above elements via a bus 420.

Note that the data memory devices 412 may not necessarily be integral components of the continuous data server apparatus, and can be supplemented by the user according to the need.

Note also that the archiving device 415 also may not necessarily be an integral component of the continuous data server apparatus, and can be supplemented by the user according to the need.

Here, the central control device 416 operates according to the flow chart of FIG. 62 as follows.

When the access request is received (step S20), if the received access request is not for an access to the archiving device 415 (step S21 NO), the central control device 416 commands the data transfer between the data memory control device 411 and the communication control device 414 via the main memory device 413 (step S22).

When the requested continuous data do not exist on the data memory devices 412, i.e., when the received access request is for an access to the archiving device 415 (step S21 YES) and the received access request is the read request (step S23 YES), the requested continuous data are to be read out from the archiving device 415, so that the central control device 416 specifies which portion of which continuous data are to be written into which buffer memory device 417, to the archiving device 415, by selecting the buffer memory device 417 corresponding to the writing target of the read out data (step S24), and commanding the writing into the selected buffer memory device 417 to the archiving device 415 (step S25). In response, the archiving device 415 reads out the specified continuous data, and writes them into the specified buffer memory device 417. When the writing is completed, the archiving device 415 notifies this fact to the central control device 416.

Then, the central control device 416 commands the writing of the data content on the buffer memory device 417 into the specified location in the data memory device 412, to the data memory control device 411 corresponding to the writing target data memory device 412 to which the read out continuous data are to be written (step S26). These steps S25 and S26 will be repeated until the processing for the requested continuous data is completed up to the last one of the requested data (step S30).

Here, in a case where the continuous data are specified according to the access request from the user, the continuous data read out from the archiving device 415 are written into the buffer memory device 417 by the steps S24 and S25, as well as into the main memory device 413, and transferred to the user via the communication control device 414.

When the received access request is for an access to the archiving device 415 (step S21 YES) and the received access request is not the read request (step S23 NO), it is a case of writing the continuous data stored in the data memory device 412 into the archiving device 415.

In this case, the central control device 416 selects the data memory control device 411 for reading the data to be written from the data memory device 412 (step S27), and commands the writing of the data into the corresponding buffer memory device 417, to the selected data memory control device 411 (step S28). Then, the central control device 416 commands the input of the data content on the buffer memory device 417 to the archiving device 415 (step S29). These steps S28 and S29 will be repeated until the processing for the requested continuous data is completed up to the last one of the requested data (step S31).

It is to be noted that each data memory control device 411 in the configuration of FIG. 61 may have a configuration as shown in FIG. 63, in which one data memory control device 411 is formed by a plurality of data memory control units 430 for carrying out the reading and the writing with respect to the corresponding data memory devices 412.

The archiving device 415 has a detailed configuration as shown in FIG. 64, which comprises a storehouse 426 for storing a large number of recording media 427, a plurality of drive devices 424 for carrying out the reading (and the writing if necessary) of the continuous data recorded on the recording media 427, a robot hand device 423 for loading the required recording media 427 from the store house 426 into the drive devices 424, and a control device 425 for controlling the operations of the drive devices 424 and the robot hand device 423. The recording media 427 can be optical disks, opto-magnetic disks, or magnetic tapes, to be concrete.

The control device 425 manages which continuous data are stored in which recording medium 427, determines which recording medium 427 should be read or written by which drive device 424 according to the access request, and commands the robot hand device 423 to load the necessary recording media 427 to the drive devices 424. In addition, the control device 425 also functions to transfer the continuous data read out by the drive devices 424 to the requesting computer via the buses 420 and 421, and to control the drive devices 424 to write the continuous data arrived from the requesting computer via the bus 421.

It is also noted that this fifth embodiment can be adapted to the first embodiment described above, by means of a configuration shown in FIG. 65.

Figure 65:
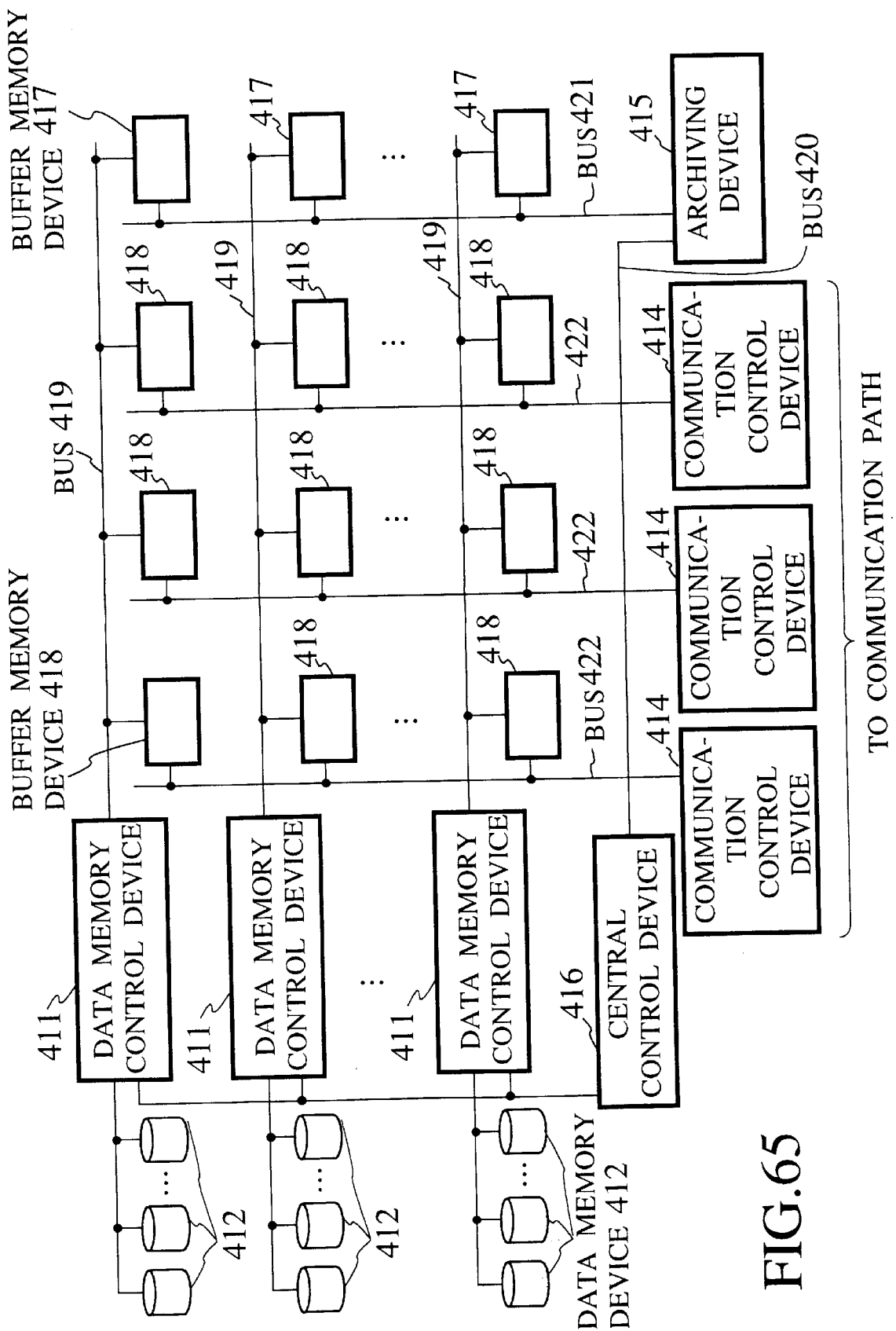
FIG. 65 is a schematic block diagram of the continuous data server apparatus of the fifth embodiment which is adapted to the first embodiment.

In this configuration of FIG. 65, the data memory control devices 411 and the communication control devices 414 are connected with buffer memory devices 418 in such a manner that, for every combination of the data memory control device 411 and the communication control device 414, there is provided a buffer memory device 418 connected with these data memory control device 411 and communication control device 414. A group of the buffer memory devices 418 functions as the main memory device 413 in the configuration of FIG. 61, but with this configuration of FIG. 65, the dedicated buffer memory device 418 is available for the exchange of the continuous data between each data memory control device 411 and each communication control device 414, so that both the data path 419 between the data memory control devices 411 and the buffer memory devices 418 as well as the data path 422 between the buffer memory devices 418 and the communication control devices 414 are multiplexed. Consequently, it is possible to increase the data transfer capability of these data paths 419 and 422, just as in the first embodiment described above.

In addition, this configuration of FIG. 65 also includes the buffer memory devices 417 of this fifth embodiment, which are connected in such a manner that, for every combination of the archiving device 415 and the data memory control device 411, there is a buffer memory device 417 connected with these archiving device 415 and data memory control device 411. With this configuration of FIG. 65, the dedicated buffer memory device 417 is available for the exchange of the continuous data between the archiving device 415 and each data memory control device 411, so that the data path 419 between the archiving device 415 and the data memory control devices 411 can be multiplexed, and consequently, it is possible to increase the data transfer capability of this data path 419. In addition, it becomes possible to transfer the continuous data between the archiving device 415 and the data memory control device 411 without the undesirable influence on the other transfer processing of the continuous data from the communication control devices 414.

Figure 62:
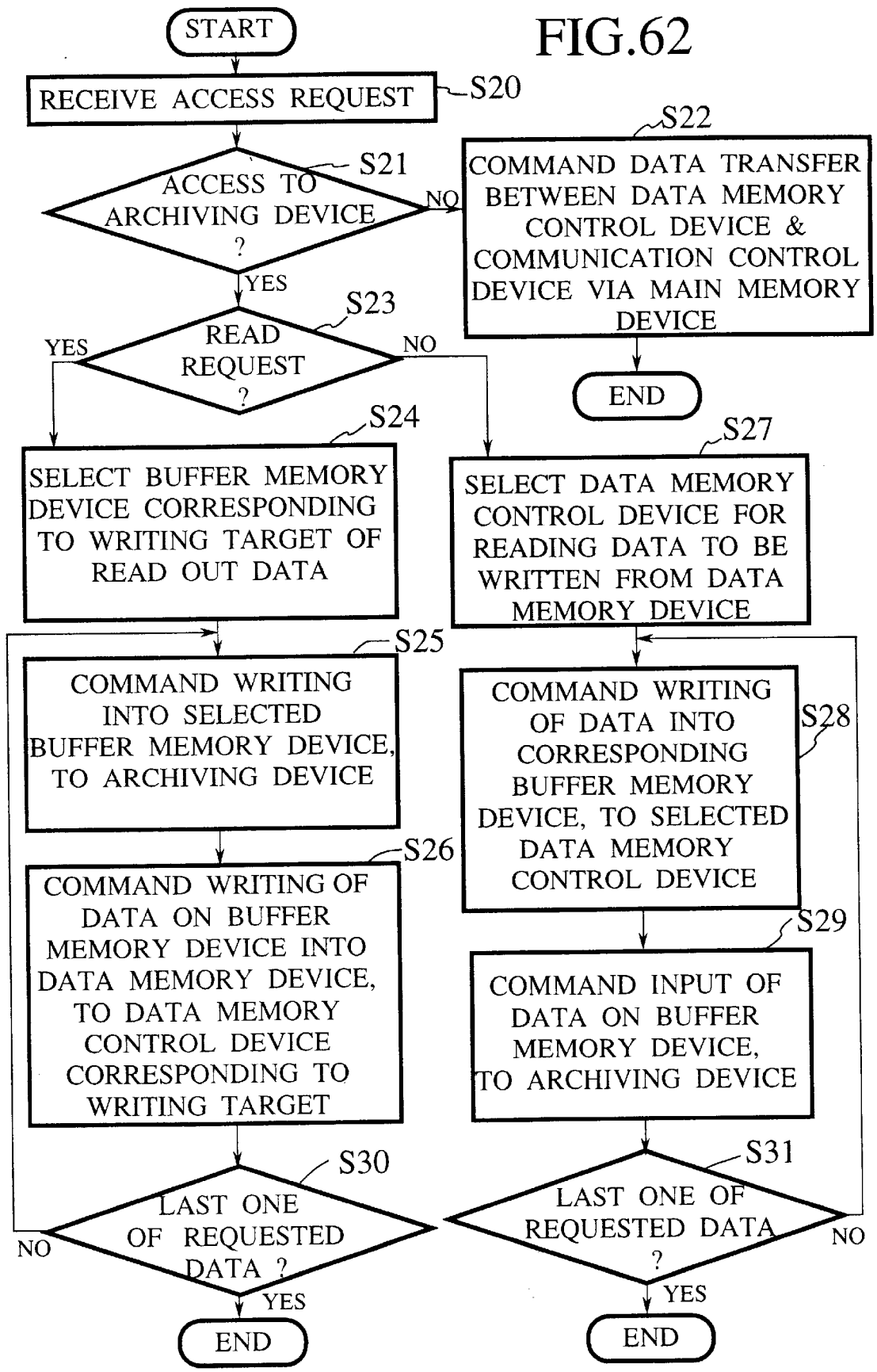
FIG. 62 is a flow chart for the operation of a central control device in the continuous data server apparatus of FIG. 61.

The buffer memory devices 417 in this configuration of FIG. 65 are used in the similar manner according to the flow chart of FIG. 62 described above. Namely, the central control device 416 specifies which portion of which continuous data are to be written into which buffer memory device 417, to the archiving device 415. In response, the archiving device 415 reads out the specified continuous data and writes them into the specified buffer memory device 417. When the writing is completed, the archiving device 415 notifies this fact to the central control device 416. Then, the central control device 416 commands the writing of the data content on the buffer memory device 417 written by the archiving device 415 into the specified location in the writing target data memory device 412, to the data memory control device 411 connected with the writing target data memory device 412 for storing the read out continuous data.

In a case of writing the continuous data stored in the data memory device 412 into the archiving device 415, the flow of the continuous data is opposite to that described above.

The configuration of the archiving device 415 is the same as that shown in FIG. 64 in this configuration of FIG. 65 as well.

As described, according to the continuous data server apparatus of the present invention, for each set of the data memory control unit and the communication control unit, or for each set of a group comprising some data memory control units and a group comprising some communication control units, a buffer memory unit for data exchange between them is provided dedicatedly, and each data memory control unit and each communication control unit are connected only with a part of the buffer memory units containing a buffer memory unit for which there is a need to make accesses from them.

For this reason, the level of multiplexing for the data paths between the data memory control units and the buffer memory units and the data paths between the buffer memory units and the communication control units can be raised, and it becomes possible to increase a number of users who can make accesses to the continuous data simultaneously.

Here, when each data memory control unit and each communication control unit are connected only with the buffer memory units for which there is a need to make accesses from them alone, the level of multiplexing for the data paths can be raised more effectively, and a number of users who can make accesses to the continuous data simultaneously can be increased further. Moreover, each buffer memory unit is connected with one data path connected to one or more data memory control unit and another one data path connected to one or more communication control unit, so that the arbitration with respect to the accesses to the buffer memory unit can be made very simple.

In addition, there is no need to use a bus or a switch having a large transfer rate which requires a high cost as in a conventional case, so that it is possible to increase a number of users who can make accesses to the continuous data simultaneously without causing an increase of cost.

Moreover, when a bus connecting between the data memory control units and the buffer memory units and a bus connecting between the communication control units and the buffer memory units are provided independently from each other, the load on the bus can be distributed over a plurality of buses, and it becomes sufficient for each bus to have a small bandwidth. Furthermore, when buses connecting between the data memory control units and the buffer memory units are provided independently for each data memory control unit, and/or buses connecting between the communication control units and the buffer memory units are provided independently for each communication control device, the load on the bus can be further distributed over more numerous buses, and the bandwidth required for each bus can be made even smaller.

Also, in the continuous data transfer method of the present invention, the data memory control unit connected with the data memory unit which stores the requested continuous data reads out the continuous data, and writes them into the dedicated buffer memory unit connected with this data memory control unit and the communication control unit which accommodates a communication path connected to the transfer destination of that continuous data, and the communication control unit reads out the continuous data written into this buffer memory unit, and transfers them to a prescribed communication path.

For this reason, the level of multiplexing for the data paths between the data memory control units and the buffer memory units and the data paths between the buffer memory units and the communication control units can be raised, and it becomes possible to increase a number of users who can make accesses to the continuous data simultaneously.

Moreover, each buffer memory unit is connected with one data path connected to one or more data memory control unit and another one data path connected to one or more communication control unit, so that the arbitration with respect to the accesses to the buffer memory unit can be made very simple.

In addition, there is no need to raise the transfer capability of the data paths by means of a bus having a large transfer rate which requires a high cost, so that it is possible to increase a number of users who can make accesses to the continuous data simultaneously without causing an increase of cost.

Also, according to the data server system of the present invention, the calculation unit having various functions is dedicatedly provided for each disk device and buffer memory unit to be connected, and the calculation units are connected in series, so that it is possible to realize the data recovery processing and the parity generation for the purpose of dealing with the malfunction of the disk device by means of a compact hardware structure. In addition, it is possible to carry out the processing at a high speed as the processing is carried out by the hardware.

Also, according to the continuous data server apparatus of the present invention, the transfer of the continuous data can be realized, without reducing a number of continuous data that can be transferred simultaneously, even at a time of the reading from the archiving device or the writing into the archiving device.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A continuous data server apparatus for transferring continuous data stored in data memory media, the apparatus comprising:

a plurality of data memory control units for reading out desired continuous data from the data memory media;

at least one communication control unit for transferring the desired continuous data to a communication path; and a plurality of dedicated buffer memory units for storing the desired continuous data read out by the plurality of data memory control units and to be transferred by the at least one communication control unit, wherein per each one of the at least one communication control unit at least one of the plurality of dedicated buffer memory units is provided dedicatedly for one of the plurality of data memory control units and another at least one of the plurality of dedicated buffer memory units is provided dedicatedly for another one of the plurality of data memory control units.

2. The apparatus of claim 1, wherein at least one of the Plurality of data memory control units comprises a plurality of data memory control devices for reading out the continuous data from corresponding data memory media.

3. The apparatus of claim 1, wherein at least one of the at least one communication control unit comprises a plurality of communication control devices for transferring the continuous data to the communication path.

4. The apparatus of claim 1, wherein the plurality of data memory control units read out the desired continuous data which are striped over a plurality of data memory media.

5. The apparatus of claim 4, further comprising a central control unit for controlling reading of the desired continuous data such that each striped portion of the desired continuous data is read out from one data memory medium to a corresponding one of the plurality of dedicated buffer memory units via a corresponding one of the plurality of data memory control units, and for controlling transfer of the desired continuous data from the plurality of dedicated buffer memory units to the at least one communication control unit such that striped portions of the desired continuous data are transferred sequentially in a striped order.

6. The apparatus of claim 1, further comprising a central control unit for controlling reading of the desired continuous data from the data memory media to the plurality of dedicated buffer memory units by the plurality of data memory control units, and transferring of the desired continuous data from the plurality of dedicated buffer memory units by the at least one communication control unit.

7. The apparatus of claim 6, wherein the central control unit further comprises:

a receiver for receiving a plurality of access requests from an exterior of the apparatus; and a scheduler for scheduling timings for reading and transferring the desired continuous data corresponding to said plurality of access requests.

8. The apparatus of claim 1, further comprising:

a first independent data path connecting each of the plurality of data memory control units and a corresponding one of the plurality of dedicated buffer memory units; and a second independent data path connecting each of the at least one communication control unit and a corresponding one of the plurality of dedicated buffer memory units.

9. The apparatus of claim 1, further comprising a plurality of independent data paths independently connecting each of the plurality of data memory control units and a corresponding one of the plurality of dedicated buffer memory units.

10. The apparatus of claim 1, further comprising a plurality of independent data paths independently connecting each of the at least one communication control unit and a corresponding one of the plurality of dedicated buffer memory units.

11. The apparatus of claim 1, further comprising:

a first data path connecting each of the plurality of dedicated buffer memory units and a corresponding one of the plurality of data memory control units; and a second data path connecting said each of the plurality of dedicated buffer memory units and a corresponding one of the at least one communication control unit.

12. The apparatus of claim 11, wherein each buffer memory unit comprises:

a memory controller for arbitrating read/write requests from the first and second data paths, and a memory for storing data.

13. The apparatus of claim 1, further comprising:

a plurality of calculation units connected in series, each calculation unit having four terminals, being connected between each of the plurality of data memory control units and a corresponding one of the plurality of dedicated buffer memory units, carrying out a prescribed calculation according to input from at least one terminal of said four terminals and outputting a calculation result to one of said four terminals which is not said at least one terminal.

14. The apparatus of claim 1, further comprising:

a plurality of calculation units, each calculation unit being connected between each of the plurality of data memory control units and a corresponding one of the plurality of dedicated buffer memory units, for recovering data to be read out by one of the plurality of data memory control units from data read out by remaining ones of the plurality of data memory control units other than said one of the plurality of data memory control units.

15. The apparatus of claim 1, wherein the continuous data stored in the data memory media are arranged over said plurality of data memory control units in sub-block units, the plurality of data memory control units read out the desired continuous data in block units, the plurality of dedicated buffer memory units store the desired continuous data in block units, and the at least one communication control unit transfers the desired continuous data obtained by reading out data from the plurality of dedicated buffer memory units sequentially in sub-block units.

16. The apparatus of claim 15, further comprising:

a calculation unit, connected to said plurality of dedicated buffer memory units corresponding to said plurality of data memory control units, for recovering data to be read out by one of the plurality of data memory control units from data read out by remaining ones of the plurality of data memory control units other than said one of the plurality data memory control units.

17. The apparatus of claim 1, further comprising:

a plurality of data memory units containing the data memory media, the plurality of data memory units connected to said plurality of data memory control units.

18. The apparatus as claimed in claim 1, wherein:

the plurality of data memory control units includes n (where n>1) data memory control units, the at least one communication control unit includes m (where m≧1) communication control units, and the plurality of dedicated buffer memory units includes a number of dedicated memory buffers that is at least as large as a product of n times m.

19. The apparatus as claimed in claim 1, wherein:

the plurality of data memory control units includes n (where n>1) data memory control units in n separate rows of a matrix, the at least one communication control unit includes m (where m≧1) communication control units in m separate columns of the matrix, and the plurality of dedicated buffer memory units includes a number of dedicated memory buffers that is at least as large as a product of n times m, with at least one of the plurality of dedicated memory buffers at each row and column intersection of the matrix.

20. A continuous data server apparatus for transferring continuous data stored in data memory media, the apparatus comprising:

a plurality of data memory control unit groups for reading out desired continuous data from the data memory media, each group of the plurality of data memory control unit groups including at least one data memory control unit;

at least one communication control unit group for transferring the desired continuous data to a communication path each group of the at least one communication control unit group including at least one communication control unit; and a plurality of dedicated buffer memory units for storing the desired continuous data read out by the plurality of data memory control units and to be given to the at least one communication control unit, wherein per each one of the at least one communication control unit group, at least one of the plurality of dedicated buffer memory units is provided dedicatedly for one of the plurality of data memory control unit groups and another at least one of the plurality of dedicated buffer memory units is provided dedicatedly for another one of the plurality of data memory control unit groups.

21. The apparatus of claim 20, wherein each data memory control unit group comprises a plurality of data memory control unit sub-groups, and wherein said at least one of the plurality of dedicated buffer memory units provided for each data memory control unit group comprises a selector means for selecting one of the plurality of data memory control unit sub-groups which contains a one of the plurality of data memory control units corresponding to a one of the data memory media which stores a part of the desired continuous data.

22. The apparatus of claim 20, wherein each data memory control unit group comprises:

a plurality of data memory control unit sub-groups; and an independent data path per data memory control unit sub-group, the independent data path connecting each data memory control unit sub-group and a corresponding one of the plurality of dedicated buffer memory units.

23. The apparatus as claimed in claim 20, wherein:

the plurality of data memory control unit groups includes n (where n>1) data memory control unit groups, the at least one communication control unit group includes m (where m≧1) communication control unit groups, and the plurality of dedicated buffer memory units includes a number of dedicated memory buffers that is at least as large as a product of n times m.

24. The apparatus as claimed in claim 20, wherein:

the plurality of data memory control unit groups includes n (where n>1) data memory control unit groups in n separate rows of a matrix, the at least one communication control unit group includes m (where m≧1) communication control unit groups in m separate columns of the matrix, and the plurality of dedicated buffer memory units includes a number of dedicated memory buffers that is at least as large as a product of n times m, with at least one of the plurality of dedicated memory buffers at each row and column intersection of the matrix.

25. A method for transferring continuous data stored in data memory media to a requested transfer destination in a continuous data server apparatus having a plurality of data memory control units for reading out desired continuous data from the data memory media, at least one communication control unit for transferring the desired continuous data read out from the data memory media to a communication path connected to the requested transfer destination and a plurality of dedicated buffer memory units wherein per each one of the at least one communication control unit, at least one of the plurality of dedicated buffer memory units is provided dedicatedly for one of the plurality of data memory control units and and another at least one of the plurality of dedicated buffer memory units is provided dedicatedly for another one of the plurality of data memory control units, the method comprising the steps of:

a) receiving an access request for the desired continuous data from an exterior of the continuous data server apparatus;

b) selecting corresponding ones of the plurality of data memory control units connected with the data memory media which store the desired continuous data;

c) selecting the at least one communication control unit connected to the communication path;

d) controlling the corresponding ones of the plurality of data memory control units, selected in the selecting step b), to read out the desired continuous data stored in the data memory media, and to write the desired continuous data read out from the data memory media into corresponding ones of the plurality of dedicated buffer memory units; and e) controlling the at least one communication control unit, selected in the selecting step c), to read out the desired continuous data stored in the plurality of dedicated buffer memory units, and to transfer the desired continuous data read out from the plurality of dedicated buffer memory units to the communication path.

26. The method of claim 25, wherein the step d) of controlling the corresponding ones of the plurality of data memory control units comprises controlling at least one of the plurality of data memory control units which include a plurality of data memory control devices for reading out the continuous data from corresponding data memory media, and wherein said controlling step d) comprises controlling each of said plurality of data memory control devices included in the corresponding ones of the plurality of data memory control units, to read from the data memory media, and to write into the corresponding ones of the plurality of dedicated buffer memory units.

27. The method of claim 25, wherein the step e) of controlling the at least one communication control unit comprises controlling at least one of the at least one communication control unit which includes a plurality of communication control devices for transferring the continuous data to the communication path and wherein said controlling step e) comprises controlling each of said plurality of communication control devices, to read from the plurality of dedicated buffer memory units, and to transfer the desired continuous data to the communication path.

28. The method of claim 25, wherein a plurality of access requests are received from the an exterior at the receiving step a), and the method further comprising the step of scheduling timings for reading and transferring the desired continuous data corresponding to said plurality of access requests.

29. The method as claimed in claim 25, wherein:
the plurality of data memory control units includes n (where n>1) data memory control units,
the at least one communication control unit includes m (where m≧1) communication control units, and
the plurality of dedicated buffer memory units includes a number of dedicated memory buffers that is at least as large as a product of n times m.

30. The method as claimed in claim 25, wherein:
the plurality of data memory control units includes n (where n>1) data memory control units in n separate rows of a matrix,
the at least one communication control unit includes m (where m≧1) communication control units in m separate columns of the matrix, and
the plurality of dedicated buffer memory units includes a number of dedicated memory buffers that is at least as large as a product of n times m, with at least one of the plurality of dedicated memory buffers at each row and column intersection of the matrix.

31. An apparatus for making accesses in parallel to a plurality of disk devices, the apparatus comprising:
a plurality of disk control units for reading out desired data from the plurality of disk devices;
a plurality of buffer memory units, provided in correspondence to said plurality of disk control units, for storing the desired data read out by the plurality of disk control units; and
a plurality of calculation units connected in series, each of the plurality of calculation units comprising four terminals, being connected between a corresponding one of the plurality of disk control units and one of the plurality of buffer memory units, and
means for carrying out a prescribed calculation according to input from a first prescribed set of at least one of said four terminals and for outputting a calculation result to a second prescribed set of at least one of said four terminals not in said first prescribed set.

32. The apparatus of claim 31, further comprising:

a plurality of data memory units containing the disk devices, the plurality of data memory units connected with said plurality of disk control units.

33. An apparatus for making accesses in parallel to a plurality of disk devices, the apparatus comprising:
a plurality of connection ports connected with said plurality of disk devices;
a plurality of buffer memory units, provided in correspondence to said plurality of connection ports, for storing the data to be inputted/outputted to/from the connection ports; and
a plurality of calculation units connected in series, each calculation unit having four terminals including an upper stage side terminal, a lower stage side terminal, a buffer memory unit side terminal, and a disk device side terminal, being connected between a corresponding one of the plurality of connection ports and one of the plurality of buffer memory units, each of the plurality of calculation units comprising any one of:
a first function unit for carrying out a prescribed one of an exclusive OR calculation and an exclusive AND calculation according to data entered from the buffer memory unit side terminal and data entered from the upper stage side terminal, and for outputting a calculation result to the lower stage side terminal,
a second function unit for outputting data entered from the upper stage side terminal to the lower stage side terminal, and
a third function unit for outputting data entered from the disk device side terminal to the buffer memory unit side terminal.

34. An apparatus for making accesses in parallel to a plurality of disk devices, the apparatus comprising:
a plurality of connection ports connected with said plurality of disk devices;
a plurality of buffer memory units, provided in correspondence to said plurality of connection ports, for storing the data to be inputted/outputted to/from the connection ports; and
a plurality of calculation units connected in series, each calculation unit having four terminals including an upper stage side terminal, a lower stage side terminal, a buffer memory unit side terminal, and a disk device side terminal, being connected between a corresponding one of the plurality of connection ports and one of the plurality of buffer memory units, each of the plurality of calculation units comprising any one of:
a first function unit for carrying out a prescribed one of an exclusive OR calculation and an exclusive AND calculation according to data entered from the upper stage side terminal and data entered from the lower stage side terminal, and for outputting a calculation result to the buffer memory unit side terminal,
a second function unit for outputting data entered from the lower stage side terminal to the buffer memory unit side terminal and the upper stage side terminal,
a third function unit for carrying out said prescribed one of the exclusive OR calculation and the exclusive AND calculation according to data entered from the buffer memory unit side terminal and the data entered from the upper stage side terminal, and for outputting a calculation result to the lower stage side terminal,
a fourth function unit for carrying out said prescribed one of an exclusive OR calculation and the exclusive AND calculation according to data entered from the buffer memory unit side terminal and the data entered from the lower stage side terminal, and for outputting a calculation result to the upper stage side terminal, a fifth function unit for outputting data entered from the upper stage side terminal to the lower stage side terminal, a sixth function unit for outputting data entered from the lower stage side terminal to the upper stage side terminal, a seventh function unit for outputting data entered from the disk device side terminal to the buffer memory unit side terminal, and an eighth function unit for outputting data entered from the buffer memory unit side terminal to the disk device side terminal.

35. A continuous data server apparatus for making accesses in parallel to a plurality of disk devices, the apparatus comprising:

a plurality of disk control units for reading out desired continuous data from the plurality of disk devices; and a plurality of dedicated buffer memory units, provided in correspondence to said plurality of disk control units, for storing the desired continuous data read out by the plurality of disk control units;

wherein the continuous data stored in the plurality of disk devices are arranged over said plurality of disk control units in sub-block units, the plurality of disk control units read out the desired continuous data in block units, the plurality of dedicated buffer memory units stores the desired continuous data in block units, and the desired continuous data are obtained by reading out data from the plurality of dedicated buffer memory units sequentially in sub-block units.

36. The apparatus of claim 35, further comprising:

a plurality of data memory units including the plurality of disk devices, the plurality of data memory units connected with said plurality of disk control units.

37. The apparatus of claim 35, further comprising:

a calculation unit connected with said plurality of dedicated buffer memory units, said calculation unit comprising:

a first function unit for storing a part of a plurality of data in sub-block units sequentially read out from said plurality of dedicated buffer memory units, a second function unit for calculating a prescribed one of an exclusive OR operation and an exclusive AND operation of a part of said plurality of data in sub-block units, and a third function unit for outputting a calculation result obtained by the second function and said part of said plurality of data in sub-block units stored by the first function unit, in a desired order.

38. The apparatus of claim 37, wherein the calculation unit further comprises:

a fourth function unit for storing the calculation result obtained by the second function, and a fifth function unit for transferring the calculation result stored by the fourth function to one of the plurality of dedicated buffer memory units at a prescribed timing, wherein one disk control unit corresponding to said one of the plurality of dedicated buffer memory units writes the calculation result, transferred by the fifth function and stored in said one of the plurality of dedicated buffer memory units, into the disk device.

39. The apparatus of claim 35, further comprising:

a calculation unit connected with said plurality of dedicated buffer memory units, comprising:

a first function unit for calculating a prescribed one of an exclusive OR and an exclusive AND of a plurality of data in sub-block units entered from an exterior of the apparatus, and a second function unit for transferring a calculation result obtained by the first function and said plurality of data in sub-block units to said plurality of dedicated buffer memory units sequentially in a desired order.

40. The apparatus of claim 35, further comprising:

a bus to be used in time division to read out data from said plurality of dedicated buffer memory units, sequentially in sub-block units.

41. The apparatus of claim 35, further comprising:

a calculation unit connected with said plurality of dedicated buffer memory units, comprising:

a first function unit for calculating aN error correcting sub-block of data from a plurality of data in sub-block units entered from an exterior of the apparatus, and a second function unit for transferring the plurality of data in sub-block units and the error correcting sub-block of data obtained by the first function to said plurality of dedicated buffer memory units sequentially in a desired order.

42. A continuous data server apparatus for transferring desired continuous data between data memory media and an archiving device, the apparatus comprising:

a plurality of data memory control units for reading/writing the desired continuous data from/to the data memory media; and a plurality of dedicated buffer memory units for temporarily storing the desired continuous data to be transferred between the archiving device and the plurality of data memory control units, wherein per the archiving device, at least one of the plurality of dedicated buffer memory units is provided dedicatedly for one of the plurality of data memory control units and another at least one of the plurality of dedicated buffer memory units is provided dedicatedly for another one of the plurality of data memory control units.

43. The apparatus of claim 42, further comprising:

at least one communication control unit for transferring the desired continuous data to a communication path; and at least one buffer for storing the desired continuous data read out by the plurality of data memory control units and to be transferred by the communication control unit.

44. The apparatus of claim 43, further comprising:

a first independent data path connecting the archiving device and said plurality of dedicated buffer memory units; and a second independent data path connecting said at least one communication control unit and said at least one buffer, wherein the first and second independent data paths are provided independently from each other.

45. The apparatus of claim 42, wherein said at least one of the plurality of dedicated buffer memory units stores the desired continuous data read out from the archiving device, while a corresponding one of the plurality of data memory control units reads out the desired continuous data stored in said at least one of the plurality of dedicated buffer memory units and writes the desired continuous data read out from said at least one of the plurality of dedicated buffer memory units into the data memory media.

46. The apparatus of claim 42, wherein one of the plurality of data memory control units reads out the desired continuous data from the data memory media, while said at least one of the plurality of dedicated buffer memory units stores the desired continuous data read out by said one of the plurality of data memory control units, and the archiving device reads out and stores the desired continuous data stored in said at least one of the plurality of dedicated buffer memory units.

47. A method for transferring desired continuous data between data memory media and an archiving device, the method being performed in a continuous data server apparatus including a plurality of data memory control units for reading/writing the desired continuous data from/to the data memory media and further including a plurality of dedicated buffer memory units, wherein per the archiving device, at least one of the plurality of dedicated buffer memory units is provided dedicatedly for one of the plurality of data memory control units and another at least one of the plurality of dedicated buffer memory units is provided dedicatedly for another one of the plurality of data memory control units, the method comprising the steps of:

receiving an access request with respect to the archiving device for the desired continuous data;

selecting one of the plurality of data memory control units which is connected with the data memory media relevant to the desired continuous data; and transferring the desired continuous data between the archiving device and one of the plurality of data memory control units by temporarily storing the desired continuous data in at least one of the plurality of dedicated buffer memory units.

48. The method of claim 47, wherein the step of receiving the access request comprises receiving a read request; and wherein said step of transferring comprises the concurrently executed sub-steps of:

reading the desired continuous data from the archiving device and writing the desired continuous data into said at least one dedicated buffer memory unit; and reading out, by said one data memory control unit, the desired continuous data stored in said at least one dedicated buffer memory unit and writing the desired continuous data read out from said at least one dedicated buffer memory unit into the data memory media.

49. The method of claim 47, wherein the step of receiving the access request comprises receiving a write request; and wherein the said step of transferring comprises the concurrently executed sub-steps of:

reading out, by said one data memory control unit, the desired continuous data from the data memory media and writing the desired continuous data into said at least one buffer memory unit and reading out, by the archiving device, the desired continuous data stored in said at least one buffer memory unit, and writing the desired continuous data to the archiving device.

50. A continuous data server apparatus for transferring continuous data stored in data memory media, the apparatus comprising:

a plurality of data memory control units for reading out desired continuous data from the data memory media;

at least one communication control unit for transferring the desired continuous data to a communication path; and a plurality of dedicated buffer memory units for storing the desired continuous data read out by the plurality of data memory control units and to be transferred by the at least one communication control unit, wherein at least one of the plurality of dedicated buffer memory units is provided dedicatedly per each and every combination of each one of the plurality of data memory control units with each one of the at least one communication control unit.

51. A continuous data server apparatus for transferring continuous data stored in data memory media, the apparatus comprising:

a plurality of data memory control unit groups for reading out desired continuous data from the data memory media, each group of the plurality of data memory control unit groups including at least one data memory control unit;

at least one communication control unit group for transferring the desired continuous data to a communication path, each group of the at least one communication control unit group including at least one communication control unit; and a plurality of dedicated buffer memory units for storing the desired continuous data read out by the plurality of data memory control units and to be given to the at least one communication control unit, wherein at least one of the plurality of dedicated buffer memory units is provided dedicatedly per each and every combination of each one of the plurality of data memory control unit groups with each one of the at least one communication control unit group.

52. A method for transferring continuous data stored in data memory media to a requested transfer destination in a continuous data server apparatus having a plurality of data memory control units for reading out desired continuous data from the data memory media, at least one communication control unit for transferring the desired continuous data read out from the data memory media to a communication path connected to the requested transfer destination and a plurality of dedicated buffer memory units, wherein at least one of the plurality of dedicated buffer memory units is provided dedicatedly per each and every combination of each one of the plurality of data memory control units with each one of the at least one communication control unit, the method comprising the steps of:

a) receiving an access request for the desired continuous data from an exterior of the continuous data server apparatus;

b) selecting corresponding ones of the plurality of data memory control units connected with the data memory media which store the desired continuous data;

c) selecting the at least one communication control unit connected to the communication path;

d) controlling the corresponding ones of the plurality of data memory control units, selected in the selecting step b), to read out the desired continuous data stored in the data memory media, and to write the desired continuous data read out from the data memory media into corresponding ones of the plurality of dedicated buffer memory units; and e) controlling the at least one communication control unit, selected in the selecting step c), to read out the desired continuous data stored in the plurality of dedicated buffer memory units, and to transfer the desired continuous data read out from the plurality of dedicated buffer memory units to the communication path.

53. A continuous data server apparatus for transferring desired continuous data between data memory media and an archiving device, the apparatus comprising:
- a plurality of data memory control units for reading/writing the desired continuous data from/to the data memory media; and
- a plurality of dedicated buffer memory units for temporarily storing the desired continuous data to be transferred between the archiving device and the plurality of data memory control units, wherein at least one of the plurality of dedicated buffer memory units is provided dedicatedly per each and every combination of each one of the plurality of data memory control units with the archiving device.

54. A method for transferring desired continuous data between data memory media and an archiving device, the method being performed in a continuous data server apparatus including a plurality of data memory control units for reading/writing the desired continuous data from/to the data memory media and further including a plurality of dedicated buffer memory units, wherein at least one of the plurality of dedicated buffer memory units is provided dedicatedly per each and every combination of each one of the plurality of data memory control units with the archiving device, the method comprising the steps of:
- receiving an access request with respect to the archiving device for the desired continuous data;
- selecting one of the plurality of data memory control units which is connected with the data memory media relevant to the desired continuous data; and
- transferring the desired continuous data between the archiving device and one of the plurality of data memory control units by temporarily storing the desired continuous data in at least one of the plurality of dedicated buffer memory units.

* * * * *